(12) United States Patent
Richard et al.

(10) Patent No.: US 10,783,723 B2
(45) Date of Patent: Sep. 22, 2020

(54) SYSTEMS AND METHODS FOR MONITORING A TRACK SYSTEM FOR TRACTION OF A VEHICLE

(71) Applicant: CAMSO INC., Magog (CA)

(72) Inventors: Simon Richard, Sherbrooke (CA); Matthieu Bergeron, Sherbrooke (CA); Ghislain Laperle, Sherbrooke (CA); Patrice Boily, Ste-Catherine-de-Hatley (CA)

( * ) Notice: Subject to any disclaimer, the term of this patent is extended or adjusted under 35 U.S.C. 154(b) by 275 days.

(21) Appl. No.: 15/740,976

(22) PCT Filed: Jun. 28, 2016

(86) PCT No.: PCT/CA2016/050760
§ 371 (c)(1),
(2) Date: Dec. 29, 2017

(87) PCT Pub. No.: WO2017/000068
PCT Pub. Date: Jan. 5, 2017

(65) Prior Publication Data
US 2018/0190045 A1     Jul. 5, 2018

Related U.S. Application Data

(60) Provisional application No. 62/185,995, filed on Jun. 29, 2015.

(51) Int. Cl.
*G07C 5/08* (2006.01)
*B62D 55/24* (2006.01)
(Continued)

(52) U.S. Cl.
CPC ........... *G07C 5/0808* (2013.01); *B62D 55/14* (2013.01); *B62D 55/244* (2013.01); *B62D 55/26* (2013.01);
(Continued)

(58) Field of Classification Search
None
See application file for complete search history.

(56) References Cited

U.S. PATENT DOCUMENTS

| 2,040,696 A | 5/1936 | Johnston |
| 2,369,130 A | 2/1945 | Benson |

(Continued)

FOREIGN PATENT DOCUMENTS

| CA | 2606039 | 4/2009 |
| CA | 2838935 | 1/2013 |

(Continued)

OTHER PUBLICATIONS

Examiner's report dated Aug. 28, 2018 in connection with Canadian Patent application No. 2,991,072, 4 pages.

(Continued)

*Primary Examiner* — Jonathan M Dager
*Assistant Examiner* — Garrett F Evans
(74) *Attorney, Agent, or Firm* — Smart & Biggar LLP

(57) ABSTRACT

A track system of a vehicle can be monitored (e.g., during operation of the vehicle) to obtain information about the track system which can be used for various purposes, such as, for example, to convey the information about the track system to a user (e.g., an operator of the vehicle) and/or to control the vehicle, for instance, by controlling a speed of the vehicle depending on a state (e.g., a temperature and/or one or more other physical characteristics) of the track system. This may be useful, for example, to gain knowledge about a track of the track system, to help prevent rapid wear or other deterioration of the track of the track system (e.g., blowout), and/or to adapt how fast or slow the vehicle moves in order to protect the track of the track system while (Continued)

permitting the speed of the vehicle to be greater over short periods (e.g., when travelling on or crossing roads or other particular areas).

40 Claims, 30 Drawing Sheets

(51) Int. Cl.
　　*B62D 55/14* (2006.01)
　　*B62D 55/32* (2006.01)
　　*G01M 17/03* (2006.01)
　　*B62D 55/26* (2006.01)
　　*G07C 5/00* (2006.01)

(52) U.S. Cl.
　　CPC ............ *B62D 55/32* (2013.01); *G01M 17/03* (2013.01); *G07C 5/008* (2013.01); *G07C 5/0816* (2013.01)

(56) References Cited

U.S. PATENT DOCUMENTS

| | | |
|---|---|---|
| 2,461,150 A | 2/1949 | Flynn et al. |
| 2,523,182 A | 9/1950 | Battaglia |
| 2,562,264 A | 7/1951 | Ford |
| 2,596,919 A | 5/1952 | Smith |
| 2,854,294 A | 9/1958 | Bannister |
| 3,019,061 A | 1/1962 | Schomers |
| 3,118,709 A | 1/1964 | Case |
| 3,464,476 A | 9/1969 | Scheuba Norbert et al. |
| 3,582,154 A | 1/1971 | Russ, Sr. |
| 3,612,626 A | 10/1971 | Fuchs |
| 3,747,995 A | 7/1973 | Russ, Sr. |
| 3,747,996 A | 7/1973 | Huber |
| 3,767,275 A | 10/1973 | Russ |
| 3,781,067 A | 12/1973 | Dodson et al. |
| 3,858,948 A | 1/1975 | Johnson et al. |
| 3,887,244 A | 6/1975 | Haslett et al. |
| 3,914,990 A | 10/1975 | Borg |
| 3,944,006 A | 3/1976 | Lassanske |
| 4,059,313 A | 11/1977 | Beyers et al. |
| RE29,718 E | 8/1978 | Reinsma et al. |
| 4,150,858 A | 4/1979 | Fox et al. |
| 4,218,101 A | 8/1980 | Thompson |
| 4,279,449 A | 7/1981 | Martin et al. |
| 4,538,860 A | 9/1985 | Edwards et al. |
| 4,583,791 A | 4/1986 | Nagata et al. |
| 4,586,757 A | 5/1986 | Bloechlinger |
| 4,587,280 A | 5/1986 | Guha et al. |
| 4,607,892 A | 8/1986 | Payne et al. |
| 4,614,508 A | 9/1986 | Kerivan |
| 4,696,520 A | 9/1987 | Henke et al. |
| 4,721,498 A | 1/1988 | Grob |
| D298,018 S | 10/1988 | Cartwright |
| 4,843,114 A | 6/1989 | Touchet et al. |
| 4,844,561 A | 7/1989 | Savage et al. |
| 4,880,283 A | 11/1989 | Savage et al. |
| 4,953,921 A | 9/1990 | Burns |
| 4,981,188 A | 1/1991 | Kadela |
| 5,018,591 A | 5/1991 | Price |
| 5,050,710 A | 9/1991 | Bargfrede |
| 5,145,242 A | 9/1992 | Togashi |
| 5,190,363 A | 3/1993 | Brittain et al. |
| 5,299,860 A | 4/1994 | Anderson |
| 5,320,585 A | 6/1994 | Kato |
| 5,352,029 A | 10/1994 | Nagorcka |
| 5,362,142 A | 11/1994 | Katoh |
| 5,368,115 A | 11/1994 | Crabb |
| 5,380,076 A | 1/1995 | Hori |
| 5,447,365 A | 9/1995 | Muramatsu et al. |
| 5,482,364 A | 1/1996 | Edwards et al. |
| 5,498,188 A | 3/1996 | Deahr |
| 5,511,869 A | 4/1996 | Edwards et al. |
| 5,513,683 A | 5/1996 | Causa et al. |
| 5,529,267 A | 6/1996 | Giras |
| 5,540,489 A | 7/1996 | Muramatsu et al. |
| 5,632,537 A | 5/1997 | Yoshimura et al. |
| 5,707,123 A | 1/1998 | Grob |
| 5,722,745 A | 3/1998 | Courtemanche et al. |
| 5,813,733 A | 9/1998 | Hori et al. |
| 5,866,265 A | 2/1999 | Reilly et al. |
| 5,894,900 A | 4/1999 | Yamamoto et al. |
| 5,904,217 A | 5/1999 | Yamamoto et al. |
| 5,984,438 A | 11/1999 | Tsunoda et al. |
| 5,997,109 A | 12/1999 | Kautsch |
| 6,000,766 A | 12/1999 | Takeuchi et al. |
| 6,024,183 A | 2/2000 | Dietz et al. |
| 6,030,057 A | 2/2000 | Fikse |
| 6,056,656 A | 5/2000 | Kitano et al. |
| 6,065,818 A | 5/2000 | Fischer |
| 6,068,354 A | 5/2000 | Akiyama et al. |
| 6,074,025 A | 6/2000 | Juncker et al. |
| 6,079,802 A | 6/2000 | Nishimura et al. |
| 6,095,275 A | 8/2000 | Shaw |
| 6,120,405 A | 9/2000 | Oertley et al. |
| 6,129,426 A | 10/2000 | Tucker |
| 6,139,121 A | 10/2000 | Muramatsu |
| 6,153,686 A | 11/2000 | Granatowicz et al. |
| 6,170,925 B1 | 1/2001 | Ono |
| 6,176,557 B1 | 1/2001 | Ono |
| 6,186,604 B1 | 2/2001 | Fikse |
| 6,193,335 B1 | 2/2001 | Edwards |
| 6,206,492 B1 | 3/2001 | Moser |
| 6,224,172 B1 | 5/2001 | Goodwin |
| 6,241,327 B1 | 6/2001 | Gleasman et al. |
| 6,259,361 B1 | 7/2001 | Robillard et al. |
| 6,296,329 B1 | 10/2001 | Rodgers et al. |
| 6,299,264 B1 | 10/2001 | Kautsch et al. |
| 6,300,396 B1 | 10/2001 | Tsunoda et al. |
| 6,352,320 B1 | 3/2002 | Bonko et al. |
| 6,386,652 B1 | 5/2002 | Bonko |
| 6,386,653 B1 | 5/2002 | Brandenburger |
| 6,386,654 B1 | 5/2002 | Singer et al. |
| 6,416,142 B1 | 7/2002 | Oertley |
| 6,474,756 B2 | 11/2002 | Hori et al. |
| 6,494,548 B2 | 12/2002 | Courtemanche |
| 6,536,852 B2 | 3/2003 | Katayama et al. |
| 6,536,853 B2 | 3/2003 | Katayama et al. |
| 6,568,769 B1 | 5/2003 | Watanabe et al. |
| 6,581,449 B1 | 6/2003 | Brown et al. |
| D476,599 S | 7/2003 | Whittington |
| 6,588,862 B1 | 7/2003 | Pringiers |
| 6,637,276 B2 | 10/2003 | Adderton et al. |
| 6,652,043 B2 | 11/2003 | Oertley |
| 6,671,609 B2 | 12/2003 | Nantz et al. |
| 6,698,850 B2 | 3/2004 | Ueno |
| D488,171 S | 4/2004 | Juncker et al. |
| 6,716,012 B2 | 4/2004 | Yovichin et al. |
| 6,733,091 B2 | 5/2004 | Deland et al. |
| 6,733,093 B2 | 5/2004 | Deland et al. |
| 6,769,746 B2 | 8/2004 | Rodgers et al. |
| 6,800,236 B1 | 10/2004 | Kurata et al. |
| 6,848,757 B2 | 2/2005 | Ueno |
| 6,874,586 B2 | 2/2005 | Ueno |
| D505,136 S | 5/2005 | Brazier |
| 6,904,986 B2 | 6/2005 | Brazier |
| 6,913,329 B1 | 7/2005 | Rodgers et al. |
| 6,921,197 B2 | 7/2005 | Aubel et al. |
| 6,923,515 B2 | 8/2005 | Konickson et al. |
| 6,932,442 B2 | 8/2005 | Hori |
| 6,935,708 B2 | 8/2005 | Courtemanche |
| 6,948,784 B2 | 9/2005 | Wodrich et al. |
| 6,962,222 B2 | 11/2005 | Kirihara |
| 6,964,462 B2 | 11/2005 | Katoh et al. |
| 6,974,196 B2 | 12/2005 | Gagne et al. |
| 7,001,294 B2 | 2/2006 | Fukuda |
| 7,032,636 B2 | 4/2006 | Salakari |
| 7,077,216 B2 | 7/2006 | Juncker |
| D528,133 S | 9/2006 | Brazier |
| 7,114,788 B2 | 10/2006 | Deland et al. |
| 7,131,508 B2 | 11/2006 | Brazier |
| 7,137,675 B1 | 11/2006 | Simula et al. |
| 7,197,922 B2 | 4/2007 | Rimkus et al. |

(56) References Cited

U.S. PATENT DOCUMENTS

| | | |
|---|---|---|
| 7,202,777 B2 | 4/2007 | Tsuji et al. |
| 7,222,924 B2 | 5/2007 | Christianson |
| 7,229,141 B2 | 6/2007 | Dandurand et al. |
| 7,252,348 B2 | 8/2007 | Gingras |
| 7,293,844 B2 | 11/2007 | Uchiyama |
| D556,791 S | 12/2007 | Brazier |
| 7,316,251 B2 | 1/2008 | Kogure et al. |
| 7,325,888 B2 | 2/2008 | Fujita et al. |
| 7,367,637 B2 | 5/2008 | Gleasman |
| 7,407,236 B2 | 8/2008 | Fukushima |
| 7,413,268 B2 | 8/2008 | Kato et al. |
| 7,416,266 B2 | 8/2008 | Soucy et al. |
| 7,497,530 B2 | 3/2009 | Bessette |
| 7,567,171 B2 | 7/2009 | Dufournier |
| 7,597,161 B2 | 10/2009 | Brazier |
| D603,880 S | 11/2009 | Brazier |
| 7,625,050 B2 | 12/2009 | Bair |
| 7,676,307 B2 | 3/2010 | Schmitt et al. |
| 7,708,092 B2 | 5/2010 | Despres |
| 7,729,823 B2 | 6/2010 | Ruoppolo |
| 7,740,094 B2 | 6/2010 | Pelletier |
| 7,798,260 B2 | 6/2010 | Albright et al. |
| 7,778,741 B2 | 8/2010 | Rao et al. |
| 7,779,947 B2 | 8/2010 | Stratton |
| 7,784,884 B2 | 8/2010 | Soucy et al. |
| 7,823,987 B2 | 11/2010 | Dandurand et al. |
| 7,914,088 B2 | 3/2011 | Bair |
| 7,914,089 B2 | 3/2011 | Bair |
| D644,670 S | 9/2011 | Barrelmeyer |
| 8,122,581 B1 | 2/2012 | Hurst et al. |
| 8,327,960 B2 | 12/2012 | Couture et al. |
| 8,342,257 B2 | 1/2013 | Rosenboom |
| D680,561 S | 4/2013 | Zuchoski et al. |
| D681,071 S | 4/2013 | Zuchoski et al. |
| D683,371 S | 5/2013 | Aube |
| D683,769 S | 6/2013 | Aube |
| 8,567,876 B2 | 10/2013 | Wellman |
| 8,628,152 B2 * | 1/2014 | Delisle .................. B29C 35/049 305/165 |
| D711,928 S | 8/2014 | Brazier |
| 8,985,250 B1 * | 3/2015 | Lussier ................ B62D 11/003 180/9.1 |
| 9,033,431 B1 | 5/2015 | Zuchoski et al. |
| 9,067,631 B1 | 6/2015 | Lussier et al. |
| 9,334,001 B2 | 5/2016 | Lussier et al. |
| 9,855,843 B2 | 1/2018 | Vik et al. |
| 9,880,075 B2 | 1/2018 | Finch et al. |
| 9,975,554 B2 | 5/2018 | Lussier et al. |
| 10,006,836 B2 | 6/2018 | Monty et al. |
| 10,272,959 B2 | 4/2019 | Zuchoski et al. |
| 10,328,982 B2 | 6/2019 | Lussier et al. |
| 2002/0070607 A1 | 6/2002 | Edwards |
| 2002/0140288 A1 | 10/2002 | Herberger et al. |
| 2002/0145335 A1 | 10/2002 | Soucy et al. |
| 2003/0019133 A1 | 1/2003 | Hori |
| 2003/0034189 A1 | 2/2003 | Lemke et al. |
| 2003/0034690 A1 | 2/2003 | Kazutoshi |
| 2003/0080618 A1 | 5/2003 | Krishnan et al. |
| 2003/0089534 A1 | 5/2003 | Kanzler et al. |
| 2004/0004395 A1 | 1/2004 | Soucy et al. |
| 2004/0070273 A1 | 4/2004 | Safe et al. |
| 2004/0084962 A1 | 5/2004 | Soucy et al. |
| 2004/0130212 A1 | 7/2004 | Ishibashi |
| 2004/0135433 A1 | 7/2004 | Inaoka et al. |
| 2005/0035654 A1 | 2/2005 | Tamaru et al. |
| 2005/0056468 A1 | 3/2005 | Tucker |
| 2005/0103540 A1 | 5/2005 | Lavoie |
| 2005/0104449 A1 | 5/2005 | Lavoie et al. |
| 2005/0104450 A1 | 5/2005 | Gagne et al. |
| 2005/0168069 A1 | 8/2005 | Ueno |
| 2006/0060395 A1 | 3/2006 | Boivin et al. |
| 2006/0090558 A1 * | 5/2006 | Raskas .................... B60C 11/24 73/146 |
| 2006/0103236 A1 | 5/2006 | Soucy et al. |
| 2006/0124366 A1 | 6/2006 | LeMasne De Chermont |
| 2006/0144480 A1 | 7/2006 | Takayama |
| 2006/0175108 A1 | 8/2006 | Kubota |
| 2006/0220456 A1 | 10/2006 | Sugahara |
| 2006/0248484 A1 | 11/2006 | Baumgartner et al. |
| 2006/0273660 A1 | 12/2006 | Dandurand et al. |
| 2007/0046100 A1 | 3/2007 | McGilvrey et al. |
| 2007/0075456 A1 | 4/2007 | Feldmann |
| 2007/0126286 A1 | 6/2007 | Feldmann et al. |
| 2007/0159004 A1 | 7/2007 | St-Amant |
| 2007/0251621 A1 | 11/2007 | Prost |
| 2007/0252433 A1 | 11/2007 | Fujita |
| 2008/0007118 A1 | 1/2008 | Fujita |
| 2008/0073971 A1 | 3/2008 | Paradis et al. |
| 2008/0084111 A1 | 4/2008 | Rainer |
| 2008/0100134 A1 | 5/2008 | Soucy et al. |
| 2008/0136255 A1 | 6/2008 | Feldmann et al. |
| 2008/0169147 A1 | 7/2008 | Brazier |
| 2008/0179124 A1 | 7/2008 | Stratton |
| 2008/0203813 A1 | 8/2008 | Doyle |
| 2008/0211300 A1 | 9/2008 | Matsuo et al. |
| 2008/0211301 A1 | 9/2008 | Jee et al. |
| 2009/0085398 A1 | 4/2009 | Maltais |
| 2009/0102283 A1 | 4/2009 | Choi |
| 2009/0166101 A1 | 7/2009 | Wenger et al. |
| 2009/0195062 A1 | 8/2009 | Uchida |
| 2009/0302676 A1 | 12/2009 | Brazier |
| 2009/0302677 A1 | 12/2009 | Sugihara |
| 2009/0309415 A1 | 12/2009 | Shimozono |
| 2010/0012399 A1 | 1/2010 | Hansen |
| 2010/0033010 A1 | 2/2010 | Shimozono |
| 2010/0095506 A1 | 4/2010 | Bair |
| 2010/0096915 A1 | 4/2010 | Hagio |
| 2010/0096917 A1 | 4/2010 | Bair |
| 2010/0121644 A1 | 5/2010 | Wellman |
| 2010/0133019 A1 | 6/2010 | Muemken |
| 2010/0139994 A1 | 6/2010 | Hansen |
| 2010/0191417 A1 | 7/2010 | Murahashi et al. |
| 2010/0194553 A1 | 8/2010 | Mizutani et al. |
| 2010/0230185 A1 | 9/2010 | Mallette et al. |
| 2010/0253138 A1 | 10/2010 | Despres |
| 2010/0256946 A1 | 10/2010 | Carresjo et al. |
| 2010/0283317 A1 | 11/2010 | Soucy et al. |
| 2011/0068620 A1 | 3/2011 | Delisle et al. |
| 2011/0121644 A1 | 5/2011 | Wellman |
| 2011/0148189 A1 | 6/2011 | Courtemanche et al. |
| 2011/0301825 A1 | 12/2011 | Grajkowski et al. |
| 2011/0315459 A1 | 12/2011 | Zuchoski et al. |
| 2012/0001478 A1 | 1/2012 | Zuchoski et al. |
| 2012/0056473 A1 | 3/2012 | Hashimoto et al. |
| 2012/0104840 A1 | 5/2012 | Zuchoski et al. |
| 2012/0242142 A1 | 9/2012 | Kautsch et al. |
| 2012/0242143 A1 | 9/2012 | Feldmann |
| 2012/0253590 A1 | 10/2012 | Fink |
| 2012/0306916 A1 | 12/2012 | Marumoto |
| 2013/0033271 A1 * | 2/2013 | Woodard .................. G01L 1/14 324/629 |
| 2013/0073157 A1 | 3/2013 | Person et al. |
| 2013/0082846 A1 * | 4/2013 | McKinley ................ G07C 3/08 340/870.01 |
| 2013/0126196 A1 | 5/2013 | Rosenboom |
| 2013/0134772 A1 | 5/2013 | Dandurand et al. |
| 2013/0134773 A1 | 5/2013 | Dandurand et al. |
| 2013/0162016 A1 | 6/2013 | Lajoie et al. |
| 2013/0245911 A1 | 9/2013 | Nakajima et al. |
| 2013/0255354 A1 | 10/2013 | Hawkins et al. |
| 2013/0325266 A1 | 12/2013 | Padilla et al. |
| 2014/0105481 A1 | 4/2014 | Hasselbusch et al. |
| 2014/0125117 A1 | 5/2014 | Weeks et al. |
| 2014/0180534 A1 | 6/2014 | Son |
| 2014/0182960 A1 | 7/2014 | Bedard et al. |
| 2014/0288763 A1 | 9/2014 | Bennett et al. |
| 2014/0324301 A1 | 10/2014 | Rebinsky |
| 2015/0042152 A1 | 2/2015 | Lussier et al. |
| 2015/0042153 A1 | 2/2015 | Lussier et al. |
| 2015/0191173 A1 | 7/2015 | Lussier et al. |
| 2016/0059779 A1 | 3/2016 | Vandendriessche |
| 2016/0121945 A1 | 5/2016 | Rust et al. |
| 2016/0332682 A1 | 11/2016 | Lussier et al. |
| 2017/0087987 A1 | 3/2017 | Vik et al. |

(56) References Cited

U.S. PATENT DOCUMENTS

| | | | |
|---|---|---|---|
| 2017/0174277 A1 | 6/2017 | Zuchoski et al. |
| 2017/0177011 A1 | 6/2017 | Garvin et al. |
| 2018/0043949 A1 | 2/2018 | Boily |
| 2018/0093724 A1 | 4/2018 | Boily |
| 2018/0172556 A1 | 6/2018 | Ghidotti Piovan et al. |
| 2018/0190045 A1 | 7/2018 | Richard et al. |
| 2018/0237020 A1 | 8/2018 | Lussier et al. |
| 2018/0265145 A1 | 9/2018 | Todd |
| 2018/0364744 A1 | 12/2018 | Garvin et al. |

FOREIGN PATENT DOCUMENTS

| | | |
|---|---|---|
| CA | 2947575 | 5/2017 |
| DE | 20207342 | 8/2002 |
| EP | 0578504 | 1/1994 |
| EP | 1008509 | 6/2000 |
| EP | 1211169 | 5/2002 |
| EP | 1260429 | 11/2002 |
| EP | 1273504 | 1/2003 |
| EP | 1283152 | 2/2003 |
| EP | 1325820 | 9/2004 |
| EP | 1506913 | 2/2005 |
| EP | 1882627 | 1/2008 |
| EP | 1953070 | 8/2008 |
| EP | 2014542 | 1/2009 |
| EP | 2119620 | 11/2009 |
| JP | H0274476 | 3/1990 |
| JP | H11129946 | 5/1999 |
| JP | 2000053037 | 2/2000 |
| JP | 2003011860 | 1/2003 |
| JP | 2003089366 | 3/2003 |
| JP | 2004330830 | 11/2004 |
| JP | 2006103482 | 4/2006 |
| JP | 2007022304 | 2/2007 |
| JP | 2009061829 | 3/2009 |
| JP | 2009248924 | 10/2009 |
| JP | 2010018091 | 1/2010 |
| JP | 2010047040 | 3/2010 |
| JP | 2010089729 | 4/2010 |
| KR | 20120055071 | 5/2012 |
| SU | 1446017 | 12/1988 |
| WO | WP 2008108439 | 9/2008 |
| WO | WO 2009105892 | 9/2009 |
| WO | WO 2009106617 | 9/2009 |
| WO | WO2013002781 | 1/2013 |
| WO | WO 2014056089 | 4/2014 |
| WO | WO2014168851 | 10/2014 |
| WO | WO 2016138592 | 9/2016 |
| WO | WO 2017000068 A1 | 1/2017 |
| WO | 2020041899 | 3/2020 |

OTHER PUBLICATIONS

Office Action dated Sep. 11, 2018 in connection with U.S. Appl. No. 15/139,572, 7 pages.
Final Office Action dated Aug. 24, 2018 in connection with U.S. Appl. No. 15/454,881, 30 pages.
Interview Summary dated Nov. 2, 2018 in connection with U.S. Appl. No. 15/454,881, 3 pages.
Notice of Allowance dated Dec. 17, 2018 in connection with U.S. Appl. No. 15/454,881, 5 pages.
Interview Summary dated Dec. 10, 2018 in connection with U.S. Appl. No. 15/139,572, 3 pages.
Supplementary Search Report dated Jan. 2, 2019 in connection with the European Patent Application No. 16816886, 1 page.
Communication pursuant to Rule 63(1) EPC dated Nov. 8, 2018 in connection with European Patent Application No. 16758408.5, 4 pages.
Final Office Action dated Dec. 23, 2014 in connection with U.S. Appl. No. 13/326,132, 15 pages.
Final Office Action dated Dec. 31, 2015 in connection with U.S. Appl. No. 13/326,132, 15 pages.
Final Office Action dated Mar. 27, 2014 in connection with U.S. Appl. No. 13/170,753, 16 pages.
Non-Final Office Action dated Jul. 10, 2014 in connection with U.S. Appl. No. 13/326,110, 16 pages.
Non-Final Office Action dated Jun. 24, 2015 in connection with U.S. Appl. No. 13/326,132, 17 pages.
Non-Final Office Action dated Oct. 2, 2013 in connection with U.S. Appl. No. 13/170,753, 15 pages.
Notice of Allowance dated Oct. 24, 2014 in connection with U.S. Appl. No. 13/170,753, 5 pages.
Notice of Allowance dated Jan. 21, 2015 in connection with U.S. Appl. No. 13/326,110, 5 pages.
Examiner's Report dated Feb. 1, 2018 in connection with Canadian Patent Application No. 2,991,072, 3 pages.
Examiner's Report dated Jan. 11, 2018 in connection with Canadian Patent Application No. 2,978,482, 3 pages.
Final Office Action dated Jan. 12, 2017 in connection with U.S. Appl. No. 14/665,075, 11 pages.
Final Office Action dated Jun. 26, 2015 in connection with U.S. Appl. No. 13/326,278, 14 pages.
Final Office Action dated Sep. 8, 2017 in connection with U.S. Appl. No. 15/139,572, 14 pages.
International Search Report & Written Opinion dated Sep. 29, 2016 in connection with PCT/CA2016/050760, 3 pages.
Non-Final Office Action dated Apr. 5, 2016 in connection with U.S. Appl. No. 14/665,075, 5 pages.
Non-Final Office Action dated Dec. 1, 2016 in connection with U.S. Appl. No. 15/139,572, 5 pages.
Non-Final Office Action dated Jun. 12, 2017 in connection with U.S. Appl. No. 14/665,075, 9 pages.
Non-Final Office Action dated Jun. 2, 2014 in connection with U.S. Appl. No. 13/326,010, 6 pages.
Non-Final Office Action dated Mar. 20, 2018 in connection with U.S. Appl. No. 15/139,572, 7 pages.
Non-Final Office Action dated Mar. 6, 2015 in connection with U.S. Appl. No. 13/326,278, 16 pages.
Non-Final Office Action dated May 17, 2018 in connection with U.S. Appl. No. 15/454,881, 8 pages.
Non-Final Office Action dated Oct. 11, 2017 in connection with U.S. Appl. No. 14/665,075, 6 pages.
Notice of Allowance dated Jan. 11, 2016 in connection with U.S. Appl. No. 13/326,278, 7 pages.
Notice of Allowance dated May 30, 2018 in connection with U.S. Appl. No. 15/139,572, 10 pages.
Notice of Allowance dated Nov. 14, 2014 in connection with U.S. Appl. No. 13/326,010, 7 pages.
Restriction Requirement dated Jan. 27, 2014 in connection with U.S. Appl. No. 13/326,010, 5 pages.
Restriction Requirement dated Jun. 9, 2014 in connection with U.S. Appl. No. 13/326,278, 7 pages.
Written Opinion dated Mar. 5, 2019 in connection with International PCT application No. PCT/CA2018/051567, 6 pages.
Examiner's report dated Jan. 16, 2019 in connection with Canadian Patent Application No. 2,991,072, 3 pages.
Notice of Allowance dated Feb. 15, 2019 in connection with U.S. Appl. No. 15/139,572, 7 pages.
Restriction Requirement dated Sep. 26, 2013 in connection with U.S. Appl. No. 13/326,010, 6 pages.
Extended European Search Report dated Jan. 9, 2019 in connection with European Patent Application No. 16816886.2, 7 pages.
Extended European Search Report and Written Opinion dated Sep. 13, 2013 in connection, with European Patent Application No. 10835318.6, 8 pages.
Extended European Search Report dated Mar. 20, 2019 in connection with European Patent Application No. 16758408.5, 8 pages.
Final Office Action dated Mar. 5, 2015 in connection with U.S. Appl. No. 13/325,796, 33 pages.
Office Action dated Nov. 9, 2012, in connection with U.S. Appl. No. 29/405,417, 10 pages.
Interview Summary Report dated Sep. 12, 2015 in connection with U.S. Appl. No. 13/326,278, 3 pages.
Non-Final Office Action dated Feb. 21, 2017 in connection with U.S. Appl. No. 14/721,326, 12 pages.

(56) References Cited

OTHER PUBLICATIONS

Non-Final Office Action dated Jan. 11, 2017 in connection with U.S. Appl. No. 14/886,327, 11 pages.
Non-Final Office Action dated Jul. 10, 2014 in connection with U.S. Appl. No. 13/424,459, 11 pages.
Non-Final Office Action dated Jul. 14, 2014 in connection with U.S. Appl. No. 13/112,840, 16 pages.
Non-Final Office Action dated Sep. 22, 2014 in connection with U.S. Appl. No. 13/325,796, 25 pages.
Non-Final Office Action dated Sep. 29, 2014 in connection with U.S. Appl. No. 13/325,783, 27 pages.
Office Action dated Nov. 9, 2012, in connection with U.S. Appl. No. 29/405,416, 9 pages.
Notice of Allowance dated Jan. 19, 2018 in connection with U.S. Appl. No. 14/665,075, 8 pages.
Notice of Allowance dated Mar. 4, 2015 in connection with U.S. Appl. No. 13/325,783, 13 pages.
Office Action dated Nov. 9, 2012, in connection with U.S. Appl. No. 29/405,414, 9 pages.
Non-Final Office Action dated Apr. 9, 2019 in connection with U.S. Appl. No. 15/724,733, 56 pages.
Ex Parte Quayle Action dated Sep. 11, 2018 in connection with U.S. Appl. No. 15/139,572, 7 pages.
Communication pursuant to Article 94 (3) EPC dated Aug. 22, 2019 in connection with European Patent Application No. 16816886.2-1013, 4 pages.
Final Office Action dated Aug. 19, 2019 in connection with U.S. Appl. No. 15/724,733, 18 pages.
International Search Report dated Mar. 5, 2019 in connection with International PCT application No. PCT/CA2018/051567, 4 pages.
International Search Report and Written Opinion dated Oct. 29, 2019 in connection with International PCT Application No. PCT/CA2019/051219, 9 pages.
International Search Report and Written Opinion dated Nov. 12, 2019 in connection with International PCT Application No. PCT/CA2019/051217, 7 pages.
Restriction Requirement dated Oct. 25, 2019 in connection with U.S. Appl. No. 15/555,148, 7 pages.
Office Action dated Jan. 24, 2020 in connection with U.S. Appl. No. 15/555,148, 57 pages.
Bair Products, Inc. "Larry Lugs—Patented Bolt-On-Replacement Drive Lugs", http://www.bairproductsinc.com/products/larry_lugs.html, Jan. 1, 2011, 2 pages.
Bridgestone Industrial Products America Inc. "Stay on the Right Track. New Generation Features Rubber Tracks for Excavators", Brochure 2009, 12 pages.
Bridgestone Industrial Products America Inc., "Stay on the Right Track. Rubber Tracks for Track Loaders", Brochure 2009, 6 pages.
Camoplast Inc. "ATV/UTV Track Systems", 2009-2010 Catalog, 8 pages.
CAN-AM BRP, "Parts & Accessories—Track Systems", Parts, Accessories & Riding Gear Catalogue, p. 66 (2011).
Red Roo Solutions PTY LTD—World Class Solutions fof the Earth Moving Industry, "Save tousands of dollars and add thousands of hours to you tracks with Larry Lugs", http://www.redroosolutions.com.au/larrylugs.html, Jun. 8, 2009, 3 pages.
Story by Staff, BRP upgrades Apache ATV track system for Outlander—Apache system features larger footprint and power steering mode, ATV.com, http://www.atc.com/newsbrp-upgrades-apache-atv-track-system-for-outlander-1481.html 2 pages (Nov. 24, 2009).
Communication under Rule 71(3) EPC dated Mar. 16, 2020 in connection with European Patent Application 16758408.5, 7 pages.

\* cited by examiner

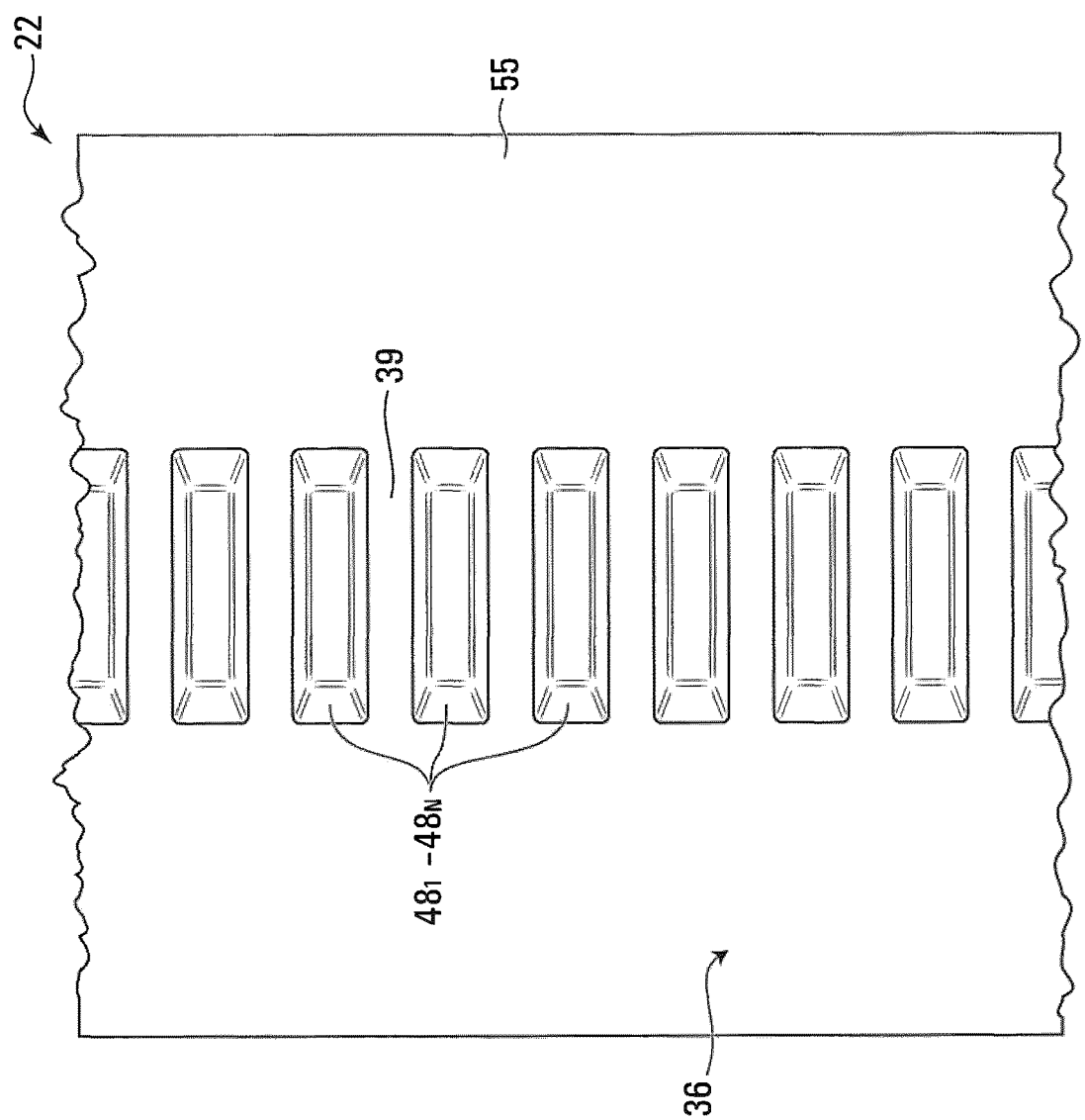

SYSTEMS AND METHODS FOR MONITORING A TRACK SYSTEM FOR TRACTION OF A VEHICLE

CROSS-REFERENCE TO RELATED APPLICATIONS

This application is a National Phase Entry of International PCT Application No. PCT/CA2016/050760 filed on Jun. 28, 2016, designating the United States and which claims priority from U.S. Provisional Patent Application No. 62/185,995 filed on Jun. 29, 2015. The contents of these applications are incorporated herein by reference.

FIELD

The invention relates generally to off-road vehicles comprising track systems (e.g., agricultural vehicles, industrial vehicles, etc.) and, more particularly, to monitoring track systems for traction of vehicles.

BACKGROUND

Certain off-road vehicles, such as agricultural vehicles (e.g., tractors, harvesters, combines, etc.), industrial vehicles such as construction vehicles (e.g., loaders, bulldozers, excavators, etc.) and forestry vehicles (e.g., feller-bunchers, tree chippers, knuckleboom loaders, etc.), military vehicles (e.g., combat engineering vehicles (CEVs), etc.), all-terrain vehicles (ATVs), and snowmobiles, to name a few, may be equipped with elastomeric tracks which enhance their traction and floatation on soft, slippery and/or irregular grounds (e.g., soil, mud, sand, ice, snow, etc.) on which they operate.

A track comprises a ground-engaging outer side including a plurality of traction projections, sometimes referred to as "traction lugs", "tread bars" or "tread blocks", which are distributed in its longitudinal direction to enhance traction on the ground. Deterioration of the traction projections during use may sometimes become significant enough to force replacement of the track even though the track's carcass is still in acceptable condition. For example, the traction projections may sometimes "blowout", i.e., explode, under repeated loads as heat buildup within them increases their internal temperature such that part of their internal elastomeric material decomposes and generates a volatile product which increases internal pressure until they burst. This may become more prominent, in some cases, where there is more roading of the track on hard road surfaces (e.g., in an agricultural vehicle travelling on paved roads between fields or other agricultural sites).

This type of track also comprises an inner side which may include a plurality of drive/guide projections, commonly referred to as "drive/guide lugs", which are spaced apart along its longitudinal direction and used for driving and/or guiding the track. Wear or other deterioration of the drive/guide lugs during operation of a vehicle comprising the track (e.g., as they come into contact with one or more of wheels) often also reduces the track's useful life.

Various other situations may exist where it may be useful to have certain information about track systems for traction of vehicles.

For these and other reasons, there is a need for improvements directed to track systems for traction of vehicles.

SUMMARY

According to various aspects of the invention, a track system of a vehicle can be monitored (e.g., during operation of the vehicle) to obtain information about the track system which can be used for various purposes, such as, for example, to convey the information about the track system to a user (e.g., an operator of the vehicle) and/or to control the vehicle, for instance, by controlling a speed of the vehicle depending on a state (e.g., a temperature and/or one or more other physical characteristics) of the track system. This may be useful, for example, to gain knowledge about a track of the track system, to help prevent rapid wear or other deterioration of the track (e.g., blowout), and/or to adapt how fast or slow the vehicle moves in order to protect the track while permitting the speed of the vehicle to be greater over short periods (e.g., when travelling on or crossing roads or other particular areas).

For example, according to an aspect of the invention, there is provided a system for controlling a vehicle that comprises a track system for traction of the vehicle. The track system comprises a track and a track-engaging assembly to move the track around the track-engaging assembly. The track-engaging assembly comprises a plurality of wheels engaging the track. The track is elastomeric to flex around the track-engaging assembly and comprises an inner surface for facing the track-engaging assembly, a ground-engaging outer surface for engaging the ground, and a plurality of traction projections projecting from the ground-engaging outer surface and distributed in a longitudinal direction of the track. The system comprises a sensor configured to monitor the track system and issue a signal relating to the track system, and a processing entity configured to process the signal relating to the track system and issue a signal relating to operation of the vehicle.

According to another aspect of the invention, there is provided a system for controlling a vehicle that comprises a track system for traction of the vehicle. The track system comprises a track and a track-engaging assembly to move the track around the track-engaging assembly. The track-engaging assembly comprises a plurality of wheels engaging the track. The track is elastomeric to flex around the track-engaging assembly and comprises an inner surface for facing the track-engaging assembly, a ground-engaging outer surface for engaging the ground, and a plurality of traction projections projecting from the ground-engaging outer surface and distributed in a longitudinal direction of the track. The system comprises a temperature sensor configured to sense a temperature of the track and issue a signal relating to the temperature of the track, and a processing entity configured to process the signal relating to the temperature of the track and issue a signal relating to operation of the vehicle.

According to another aspect of the invention, there is provided a method for controlling a vehicle that comprises a track system for traction of the vehicle. The track system comprises a track and a track-engaging assembly to move the track around the track-engaging assembly. The track-engaging assembly comprises a plurality of wheels engaging the track. The track is elastomeric to flex around the track-engaging assembly and comprises an inner surface for facing the track-engaging assembly, a ground-engaging outer surface for engaging the ground, and a plurality of traction projections projecting from the ground-engaging outer surface and distributed in a longitudinal direction of the track. The method comprises providing a sensor to monitor the track system and issue a signal relating to the track system, and providing a processing entity to process the signal relating to the track system and issue a signal relating to operation of the vehicle.

According to another aspect of the invention, there is provided a method for controlling a vehicle that comprises a track system for traction of the vehicle. The track system comprises a track and a track-engaging assembly to move the track around the track-engaging assembly. The track-engaging assembly comprises a plurality of wheels engaging the track. The track is elastomeric to flex around the track-engaging assembly and comprises an inner surface for facing the track-engaging assembly, a ground-engaging outer surface for engaging the ground, and a plurality of traction projections projecting from the ground-engaging outer surface and distributed in a longitudinal direction of the track. The method comprises providing a sensor to sense a temperature of the track and issue a signal relating to the temperature of the track, and providing a processing entity to process the signal relating to the temperature of the track and issue a signal relating to operation of the vehicle.

According to another aspect of the invention, there is provided a system for monitoring a track system for traction of a vehicle. The track system comprises a track and a track-engaging assembly to move the track around the track-engaging assembly. The track-engaging assembly comprises a plurality of wheels engaging the track. The track is elastomeric to flex around the track-engaging assembly. The track comprises an inner surface for facing the track-engaging assembly, a ground-engaging outer surface for engaging the ground, and a plurality of traction projections projecting from the ground-engaging outer surface and distributed in a longitudinal direction of the track. The system comprises a sensor configured to monitor the track system and issue a signal relating to the track system. The system also comprises a processing entity configured to process the signal relating to the track system.

According to another aspect of the invention, there is provided a system for monitoring a track system for traction of a vehicle. The track system comprises a track and a track-engaging assembly to move the track around the track-engaging assembly. The track-engaging assembly comprises a plurality of wheels engaging the track. The track is elastomeric to flex around the track-engaging assembly. The track comprises an inner surface for facing the track-engaging assembly, a ground-engaging outer surface for engaging the ground, and a plurality of traction projections projecting from the ground-engaging outer surface and distributed in a longitudinal direction of the track. The system comprises a temperature sensor configured to sense a temperature of the track and issue a signal relating to the temperature of the track, and a processing entity configured to process the signal relating to the temperature of the track.

According to another aspect of the invention, there is provided a method for monitoring a track system for traction of a vehicle. The track system comprises a track and a track-engaging assembly to move the track around the track-engaging assembly. The track-engaging assembly comprises a plurality of wheels engaging the track. The track is elastomeric to flex around the track-engaging assembly. The track comprises an inner surface for facing the track-engaging assembly, a ground-engaging outer surface for engaging the ground, and a plurality of traction projections projecting from the ground-engaging outer surface and distributed in a longitudinal direction of the track. The method comprises providing a sensor to monitor the track system and issue a signal relating to the track system, and providing a processing entity to process the signal relating to the track system.

According to another aspect of the invention, there is provided a method for monitoring a track system for traction of a vehicle. The track system comprises a track and a track-engaging assembly to move the track around the track-engaging assembly. The track-engaging assembly comprises a plurality of wheels engaging the track. The track is elastomeric to flex around the track-engaging assembly. The track comprises an inner surface for facing the track-engaging assembly, a ground-engaging outer surface for engaging the ground, and a plurality of traction projections projecting from the ground-engaging outer surface and distributed in a longitudinal direction of the track. The method comprises providing a sensor to sense a temperature of the track and issue a signal relating to the temperature of the track, and providing a processing entity to process the signal relating to the temperature of the track.

According to another aspect of the invention, there is provided a track for traction of a vehicle. The track is mountable around a track-engaging assembly to move around the track-engaging assembly. The track-engaging assembly comprises a plurality of wheels for engaging the track. The track is elastomeric to flex around the track-engaging assembly. The track comprises: an inner surface for facing the track-engaging assembly; a ground-engaging outer surface for engaging the ground; a plurality of traction projections projecting from the ground-engaging outer surface and distributed in a longitudinal direction of the track; and a sensor configured to monitor the track and issue a signal relating to the track.

According to another aspect of the invention, there is provided a method of manufacturing a track for traction of a vehicle. The track is mountable around a track-engaging assembly to move around the track-engaging assembly. The track-engaging assembly comprises a plurality of wheels for engaging the track. The track comprises: an inner surface for facing the track-engaging assembly; a ground-engaging outer surface for engaging the ground; and a plurality of traction projections projecting from the ground-engaging outer surface and distributed in a longitudinal direction of the track. The method comprises: forming the track; and providing a sensor in the track that is configured to monitor the track and issue a signal relating to the track.

According to another aspect of the invention, there is provided a device for monitoring a track system for traction of a vehicle. The track system comprises a track and a track-engaging assembly to move the track around the track-engaging assembly. The track-engaging assembly comprises a plurality of wheels engaging the track. The track is elastomeric to flex around the track-engaging assembly. The track comprises an inner surface for facing the track-engaging assembly, a ground-engaging outer surface for engaging the ground, and a plurality of traction projections projecting from the ground-engaging outer surface and distributed in a longitudinal direction of the track. The track system comprising a sensor configured to monitor the track system. The device comprises: an input for receiving a signal based on monitoring of the track system by the sensor, a processing entity configured to process the signal to derive information about the track system, and an output for outputting the information about the track system.

According to another aspect of the invention, there is provided a computer-readable storage medium storing a program executable by a communication device for monitoring a track system for traction of a vehicle. The track system comprises a track and a track-engaging assembly to move the track around the track-engaging assembly. The track-engaging assembly comprises a plurality of wheels engaging the track. The track is elastomeric to flex around the track-engaging assembly. The track comprises an inner surface for facing the track-engaging assembly, a ground-engaging outer surface for engaging the ground, and a plurality of traction projections projecting from the ground-engaging outer surface and distributed in a longitudinal direction of the track. The track system comprises a sensor configured to monitor the track system. The program comprises instructions executable by the communication device to cause the communication device to: receive a signal based on monitoring of the track system by the sensor; process the signal to derive information about the track system; and output the information about the track system.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIG. 4 shows an inside view of the track;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
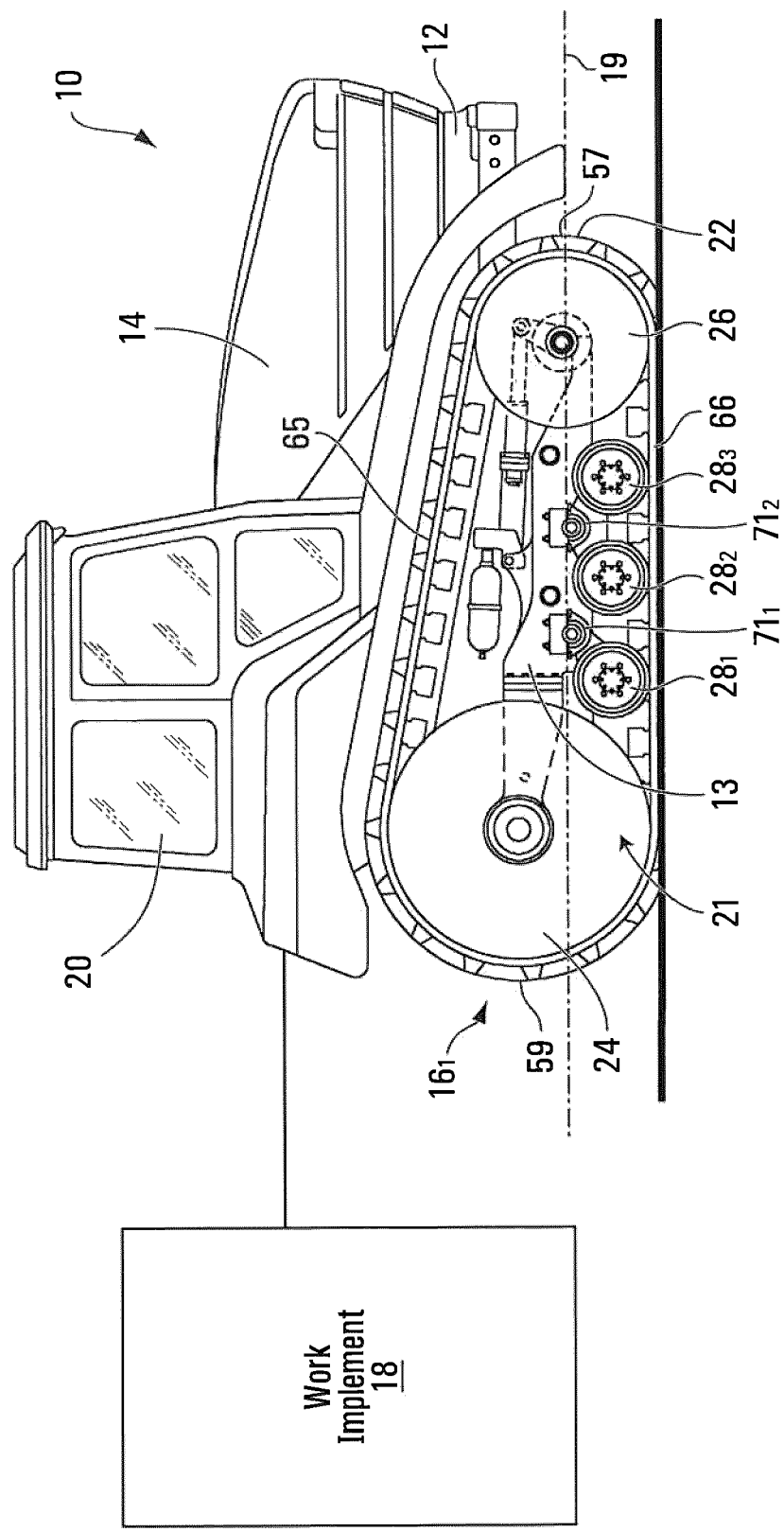
FIG. 1 shows an example of a tracked vehicle comprising a track system in accordance with an embodiment of the invention.
Figure 3:
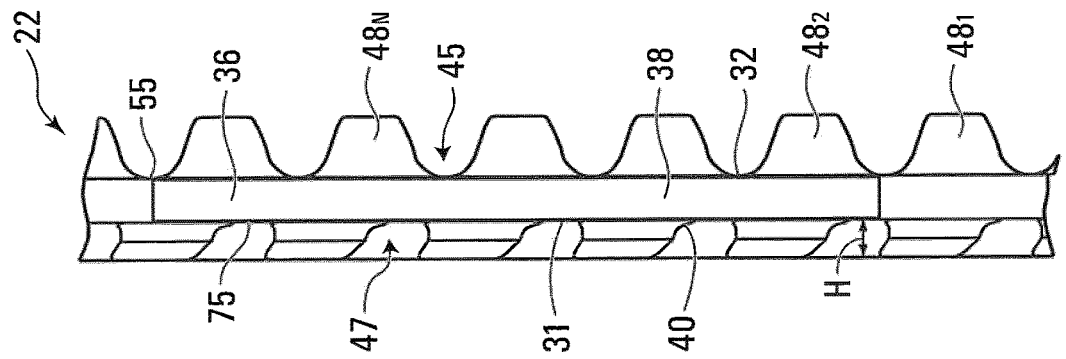
FIGS. 2 and 3 show a plan view and a side view of a track of the track system.
Figure 2:
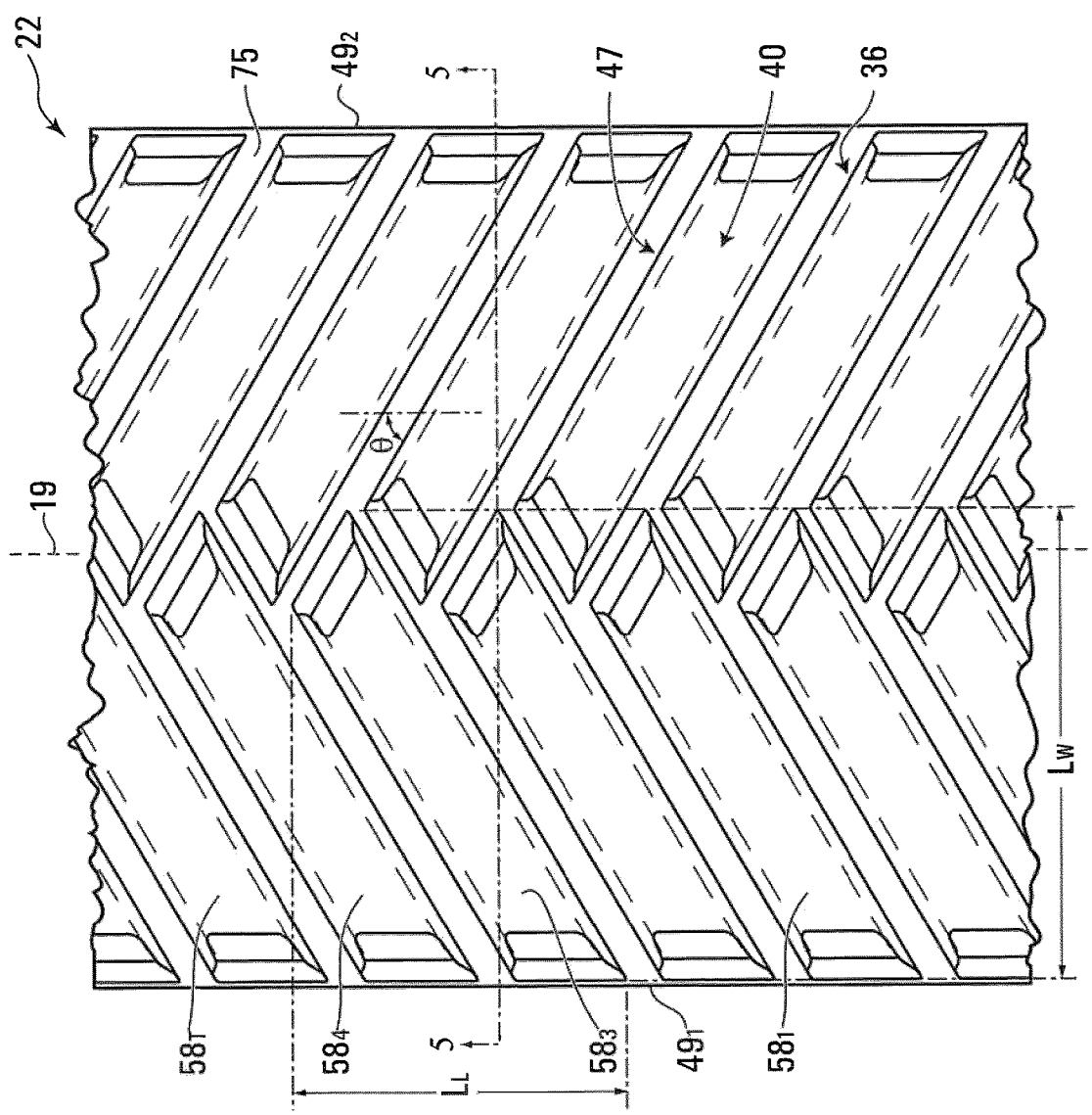
Figure 5:
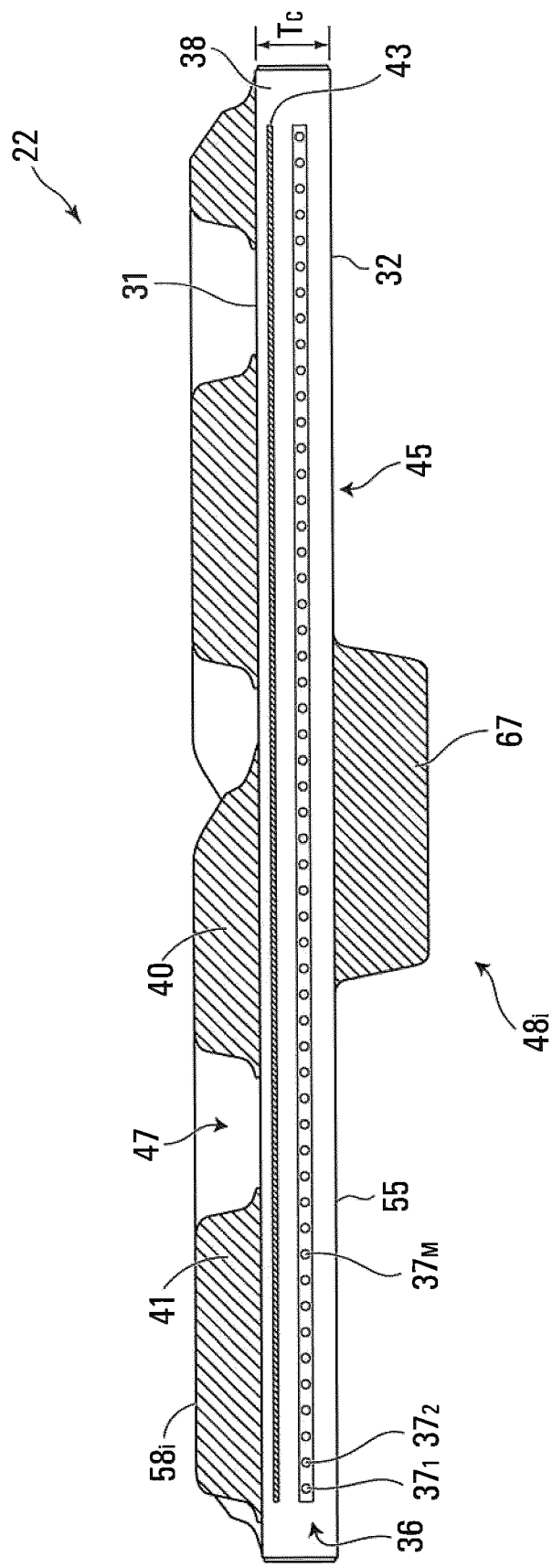
FIG. 5 shows a cross-sectional view of the track.

FIG. 1 shows an example of an off-road tracked vehicle 10 in accordance with an embodiment of the invention. In this embodiment, the vehicle 10 is a heavy-duty work vehicle for performing agricultural work, construction or other industrial work, or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12, a powertrain 15, a steering system 17, a plurality of track systems $16_1$, $16_2$ (which can be referred to as "undercarriages"), and an operator cabin 20 that enable an operator to move the agricultural vehicle 10 on the ground to perform agricultural work possibly using a work implement 18.

As further discussed later, in this embodiment, the track systems $16_1$, $16_2$ can be monitored (e.g., during operation of the agricultural vehicle 10) to obtain information about the track systems $16_1$, $16_2$ which can be used for various purposes, such as, for example, to convey the information about the track systems $16_1$, $16_2$ to a user (e.g., the operator) and/or to control the agricultural vehicle 10, for instance, by controlling a speed of the agricultural vehicle 10 depending on a state (e.g., a temperature and/or one or more other physical characteristics) of one or more of the track systems $16_1$, $16_2$. This may be useful, for example, to gain knowledge about tracks of the track systems $16_1$, $16_2$, to help prevent rapid wear or other deterioration of the tracks of the track systems $16_1$, $16_2$ (e.g., blowout), and/or to adapt how fast or slow the agricultural vehicle 10 moves in order to protect the tracks of the track systems $16_1$, $16_2$ while permitting the speed of the agricultural vehicle 10 to be greater over short periods (e.g., when travelling on or crossing roads or other particular areas).

The powertrain 15 is configured for generating motive power and transmitting motive power to the track systems $16_1$, $16_2$ to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems $16_1$, $16_2$. That is, the powertrain 15 transmits motive power generated by the prime mover 14 to one or more of the track systems $16_1$, $16_2$ in order to drive (i.e., impart motion to) these one or more of the track systems $16_1$, $16_2$. The powertrain 15 may transmit power from the prime mover 14 to the track systems $16_1$, $16_2$ in any suitable way. In this embodiment, the powertrain 15 comprises a transmission 62 between the prime mover 14 and final drive axles $56_1$, $56_1$ for transmitting motive power from the prime mover 14 to the track systems $16_1$, $16_2$. The transmission 62 may be an automatic transmission (e.g., a continuously variable transmission (CVT)) or any other suitable type of transmission.

The work implement 18 is used to perform agricultural work. For example, in some embodiments, the work implement 18 may be a combine head, a cutter, a scraper, a tiller, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator 72, a brake control 73, and a steering device 74 that are operable by the operator to control motion of the agricultural vehicle 10 on the ground and operation of the work implement 18. The user interface 70 also comprises an instrument panel 75 (e.g., a dashboard) which provides indicators (e.g., a speedometer indicator, a tachometer indicator, etc.) to convey information to the operator.

The track systems $16_1$, $16_2$ engage the ground for traction of the agricultural vehicle 10. Each track system $16_i$ comprises a track-engaging assembly 21 and a track 22 disposed around the track-engaging assembly 21. In this embodiment, the track-engaging assembly 21 comprises a plurality of wheels which, in this example, includes a drive wheel 24 and a plurality of idler wheels that includes a front idler wheel 26 and a plurality of roller wheels $28_1$-$28_6$. The track system $16_i$ also comprises a frame 13 which supports various components of the track system $16_i$, including the roller wheels $28_1$-$28_6$. The track system $16_i$ has a longitudinal direction and a first longitudinal end 57 and a second longitudinal end 59 that define a length of the track system $16_i$. The track system $16_i$ has a widthwise direction and a width that is defined by a width of the track 22. The track system $16_i$ also has a height direction that is normal to its longitudinal direction and its widthwise direction.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 2 to 5, the track 22 comprises an inner side 45, a ground-engaging outer side 47, and lateral edges $49_1$, $49_2$. The inner side 45 faces the wheels 24, 26, $28_1$-$28_6$, while the ground-engaging outer side 47 engages the ground. A top run 65 of the track 22 extends between the longitudinal ends 57, 59 of the track system $16_i$ and over the wheels 24, 26, $28_1$-$28_6$, while a bottom run 66 of the track 22 extends between the longitudinal ends 57, 59 of the track system $16_i$ and under the wheels 24, 26, $28_1$-$28_6$. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21. The carcass 36 comprises an inner surface 32 and a ground-engaging outer surface 31 that are opposite one another.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

In this embodiment, the endless track 22 is a one-piece "jointless" track such that the carcass 36 is a one-piece jointless carcass. In other embodiments, the endless track 22 may be a "jointed" track (i.e., having at least one joint connecting adjacent parts of the track 22) such that the carcass 36 is a jointed carcass (i.e., which has adjacent parts connected by the at least one joint). For example, in some embodiments, the track 22 may comprise a plurality of track sections interconnected to one another at a plurality of joints, in which case each of these track sections includes a respective part of the carcass 36. In other embodiments, the endless track 22 may be a one-piece track that can be closed like a belt with connectors at both of its longitudinal ends to form a joint.

The inner side 45 of the endless track 22 comprises an inner surface 55 of the carcass 36 and a plurality of wheel-contacting projections $48_1$-$48_N$ that project from the inner surface 55 and are positioned to contact at least some of the wheels 24, 26, $28_1$-$28_6$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the idler wheel 26 and/or the roller wheels $28_1$-$28_6$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track and (ii) interact with the idler wheel 26 and/or the roller wheels $28_1$-$28_6$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheel 26 and the roller wheels $28_1$-$28_6$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 75 of the carcass 36 and a tread pattern 40 to enhance traction on the ground. The tread pattern 40 comprises a plurality of traction projections $58_1$-$58_T$ projecting from the ground-engaging outer surface 75, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

Figure 6:
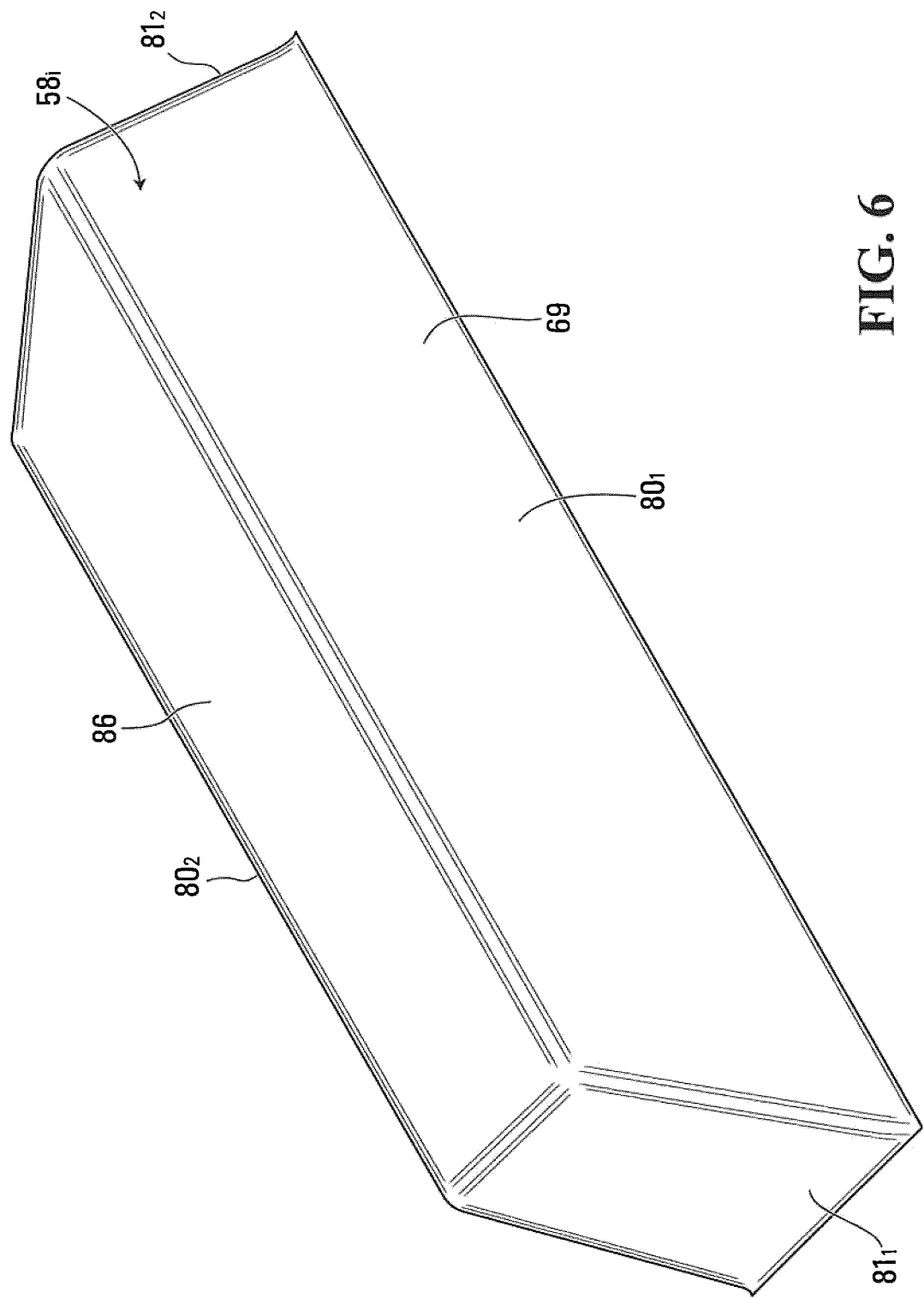
FIG. 6 shows a perspective view of a traction projection of the track.

As shown in FIG. 6, each traction lug $58_i$ has a periphery 69 which includes a front surface $80_1$, a rear surface $80_2$, two side surfaces $81_1$, $81_2$, and a top surface 86. The front surface $80_1$ and the rear surface $80_2$ are opposed to one another in the longitudinal direction of the track 22. The two side faces $81_1$, $81_2$ are opposed to one another in the widthwise direction of the track 22. In this embodiment, the front surface $80_1$, the rear surface $80_2$, and the side surfaces $81_1$, $81_2$ are substantially straight. The periphery 69 of the traction lug $58_i$ may have any other shape in other embodiments (e.g., the front surface $80_1$, the rear surface $80_2$, and/or the side surfaces $81_1$, $81_2$ may be curved). The traction lug $58_i$ has a front-to-rear dimension $L_L$ in the longitudinal direction of the track 22, a side-to-side dimension $L_W$ in the widthwise direction of the track 22, and a height H in the thickness direction of the track 22.

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 27 in various ways. For example, in this embodiment, the traction lugs $58_1$-$58_T$ are provided on the ground-engaging outer side 27 by being molded with the carcass 36.

The carcass 36 has a thickness $T_c$, measured from its inner surface 32 to its ground-engaging outer surface 31, which is relatively large in this embodiment. For example, in some embodiments, the thickness $T_c$ of the carcass 36 may be at least than 20 mm, in some cases at least 25 mm, in some cases at least 30 mm, in some cases at least 35 mm, and in some cases even more (e.g., 40 mm or more). The thickness $T_c$ of the carcass 36 may have any other suitable value in other embodiments.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate a final drive axle $56_i$, which causes rotation of the drive wheel 24, which in turn imparts motion to the track 22.

Figure 7:
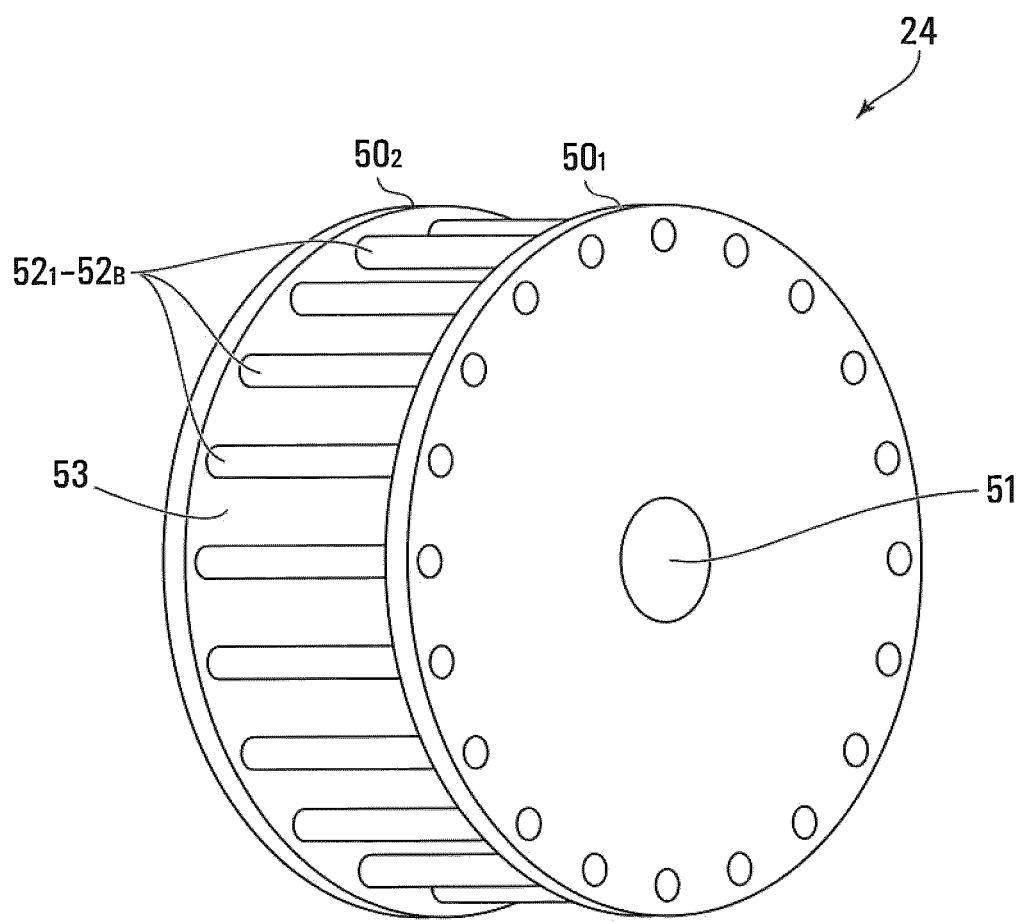
FIG. 7 shows a drive wheel of a track-engaging assembly of the track system.
Figure 8:
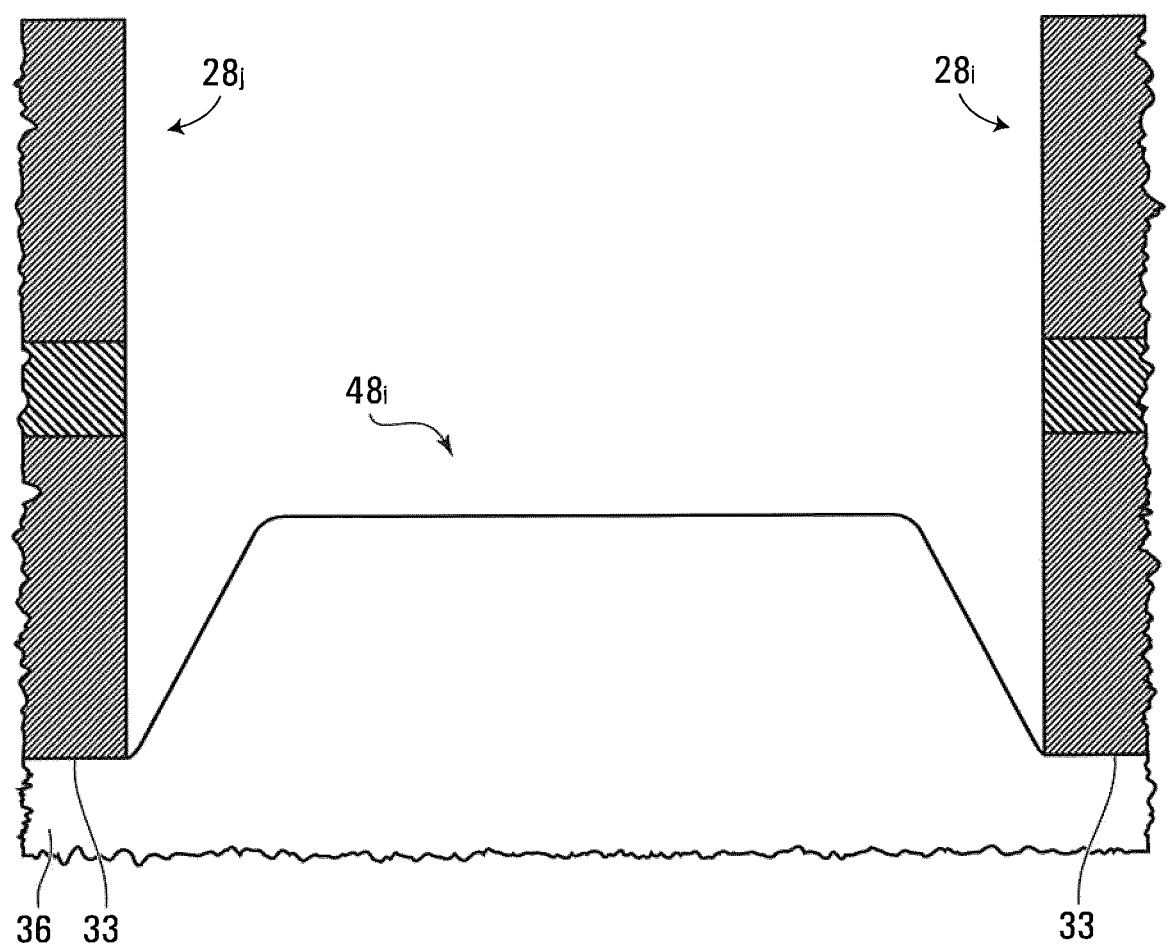
FIG. 8 shows a drive/guide projection of the track.

With additional reference to FIG. 7, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" arrangement. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

The front idler wheel 26 and the roller wheels $28_1$-$28_6$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front idler wheel 26 is a leading idler wheel which maintains the track 22 in tension and helps to support part of the weight of the agricultural vehicle 10 on the ground via the track 22. The roller wheels $28_1$-$28_6$ roll on a rolling path 33 of the inner side 45 of the track 22 along the bottom run 66 of the track 22 to apply the bottom run 66 on the ground. In this case, as they are located between frontmost and rearmost ones of the wheels of the track system $16_i$, the roller wheels $28_1$-$28_6$ can be referred to as "mid-rollers".

Figure 9:
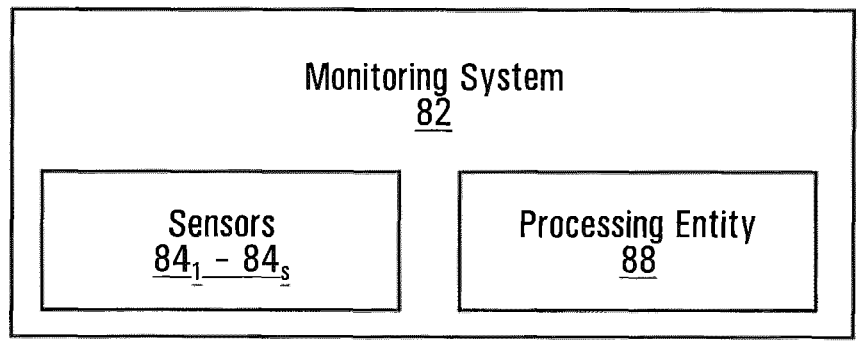
FIG. 9 shows an example of an embodiment of a monitoring system of the tracked vehicle, comprising sensors and a processing entity.

With additional reference to FIG. 9, in this embodiment, the agricultural vehicle 10 comprises a monitoring system 82 for monitoring the track systems $16_1$, $16_2$ to obtain information about the track systems $16_1$, $16_2$ which can be used for various purposes, such as, for example, to communicate the information about the track systems $16_1$, $16_2$ to a user (e.g., the operator) and/or to control the agricultural vehicle 10 based on a state (e.g., a temperature and/or one or more other physical characteristics) of one or more of the track systems $16_1$, $16_2$. This may be useful, for example, to gain knowledge about the tracks 22 of the track systems $16_1$, $16_2$, to help prevent rapid wear or other deterioration of the tracks 22 (e.g., blowout of one or more of the traction lugs $58_1$-$58_T$), and/or to adapt the speed of the agricultural vehicle 10 in order to protect the tracks 22 while permitting the agricultural vehicle 10 to travel faster for short periods (e.g., when travelling on or crossing roads or other particular areas).

In this embodiment, the monitoring system 82 comprises a plurality of sensors $84_1$-$84_s$ for monitoring each track system $16_i$ and a processing entity 88 for performing certain actions based on input from the sensors $84_1$-$84_s$. For example, in various embodiments, actions performed by the processing entity 88 based on input from the sensors $84_1$-$84_s$ may include an action to convey information about the track system $16_i$, an action to store information about the track system $16_i$, and/or an action relating to the operation of the agricultural vehicle 10, such as, for example, controlling the speed and/or another operational aspect of the agricultural vehicle 10 and/or providing information to the operator of the agricultural vehicle 10.

Each sensor $84_x$ is configured to sense a physical characteristic of the track system $16_i$ and to issue a sensor signal relating to the track system $16_i$ and derived based on the physical characteristic of the track system $16_i$ that is sensed. In this embodiment, the physical characteristic of the track system $16_i$ that is sensed by the sensor $84_x$ is a temperature of the track system $16_i$. The sensor $84_x$ is thus a temperature sensor. More particularly, in this embodiment, the temperature of the track system $16_i$ that is sensed by the temperature sensor $84_x$ is a temperature of the track 22. The sensor signal issued by the sensor $84_x$ is thus indicative of the temperature of the track 22.

Monitoring of the temperature of the track 22 may be used by the processing entity 88 to perform certain actions, such as to convey the temperature of the track 22 to a user (e.g., the operator), to store the temperature of the track 22 in memory (e.g., for future consultation), to limit and/or reduce the speed of the agricultural vehicle 10 and/or notify the operator of the agricultural vehicle 10 if the temperature of the track 22 becomes high enough (e.g., in order to prevent blowout or other accelerated wear of the track 22), and/or to allow the speed of the agricultural vehicle 10 to be increased if the temperature of the track 22 drops or remains low enough.

Figure 10:
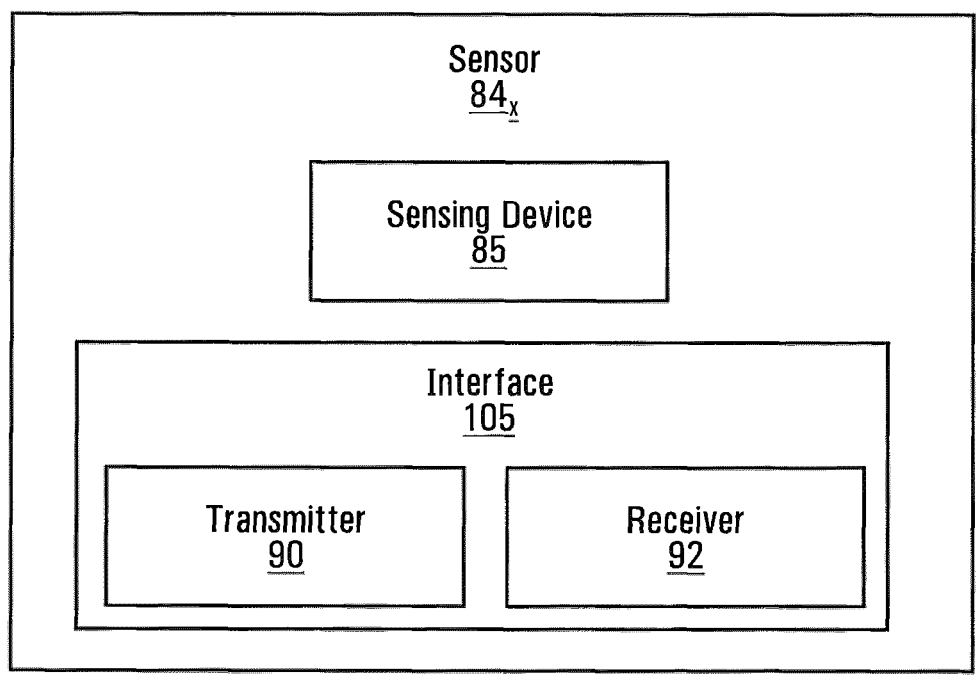
FIG. 10 shows an example of an embodiment of a sensor of the monitoring system.

As shown in FIG. 10, the temperature sensor $84_x$ comprises a sensing device 85 to sense the temperature of the track 22. The sensing device 85 may be implemented in any suitable way. For example, in various embodiments, the sensing device 85 may comprise a thermocouple, a thermistor, a resistance temperature detector, an infrared sensor, or any other type of sensing device capable of sensing temperature.

In this embodiment, the temperature sensor $84_x$ is part of the track 22. More specifically, in this embodiment, the temperature sensor $84_x$ is embedded within the elastomeric material of the track 22. This may allow the temperature to be measured inside the track 22 where it is likely to be greater than on a periphery of the track 22. For instance, the temperature sensor $84_x$ may be located to sense the temperature at a high heat area within the track 22, such as at or near a hottest area within the track 22, which is an area expected to be hottest in use.

More specifically, in this embodiment, the temperature sensor $84_x$ is disposed within the elastomeric material 41 of a traction lug $58_i$. This allows sensing the temperature at an internal (e.g., an inmost) area of the traction lug $58_i$ which is susceptible to generating high heat that could lead to blowout of the traction lug $58_i$.

Figure 11:
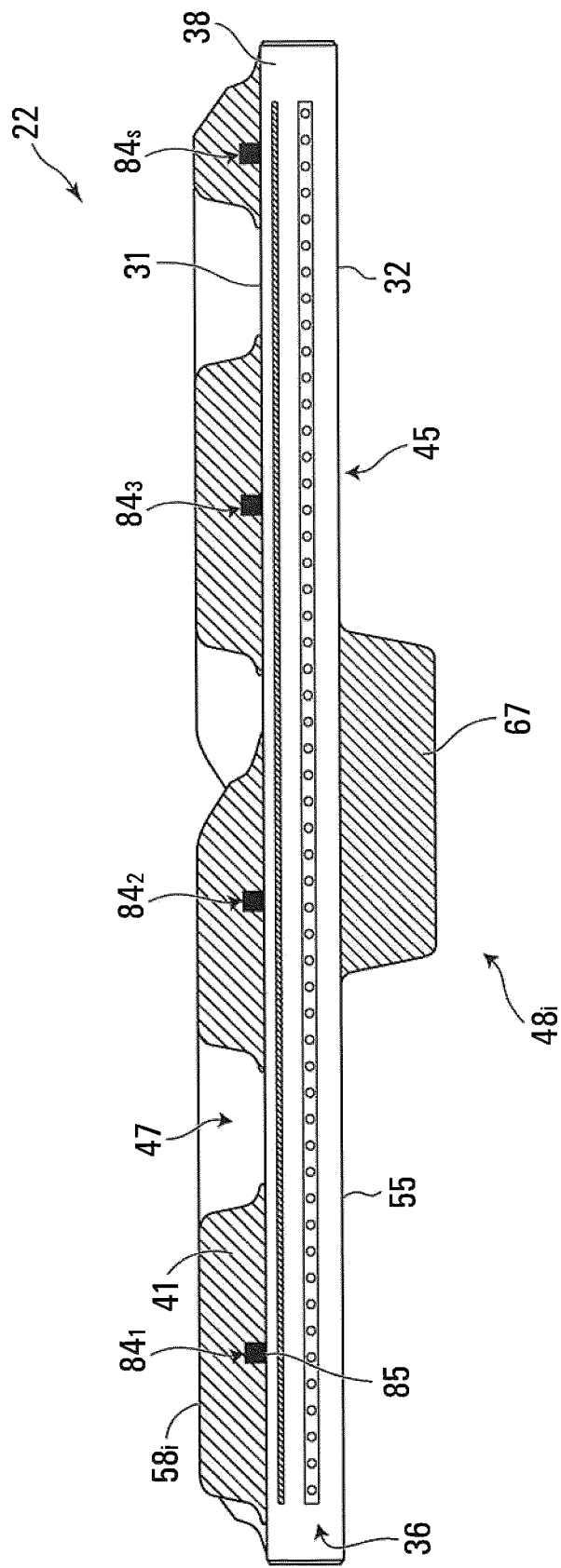
FIG. 11 shows a cross-sectional view of the track comprising the sensors embedded within traction projections of the track.

In this example, as shown in FIG. 11, respective ones of the temperature sensors $84_1$-$84_s$ are disposed in the elastomeric material 41 of respective ones of the traction lugs $58_1$-$58_7$. As such, the temperature of the track 22 may be assessed by the processing entity 88 based on temperature readings at one or more of the respective ones of the traction lugs $58_1$-$58_T$ (e.g., the temperature of the track 22 may be deemed to be a maximal one or an average of the temperature readings at one or more of the respective ones of the traction lugs $58_1$-$58_T$). Although it is possible to have a sensor $84_x$ within each traction lug $58_i$, this may not be the case in some embodiments. For example, in this embodiment, data collected by three or four of the sensors $84_1$-$84_s$ provided within respective ones of the traction lugs $58_1$-$58_T$ may enable assessment of the temperature of the track 22. In other cases, the track 22 may include only a single temperature sensor $84_x$ (e.g., in only a single one of the traction lugs $58_1$-$58_T$).

Figure 11A:
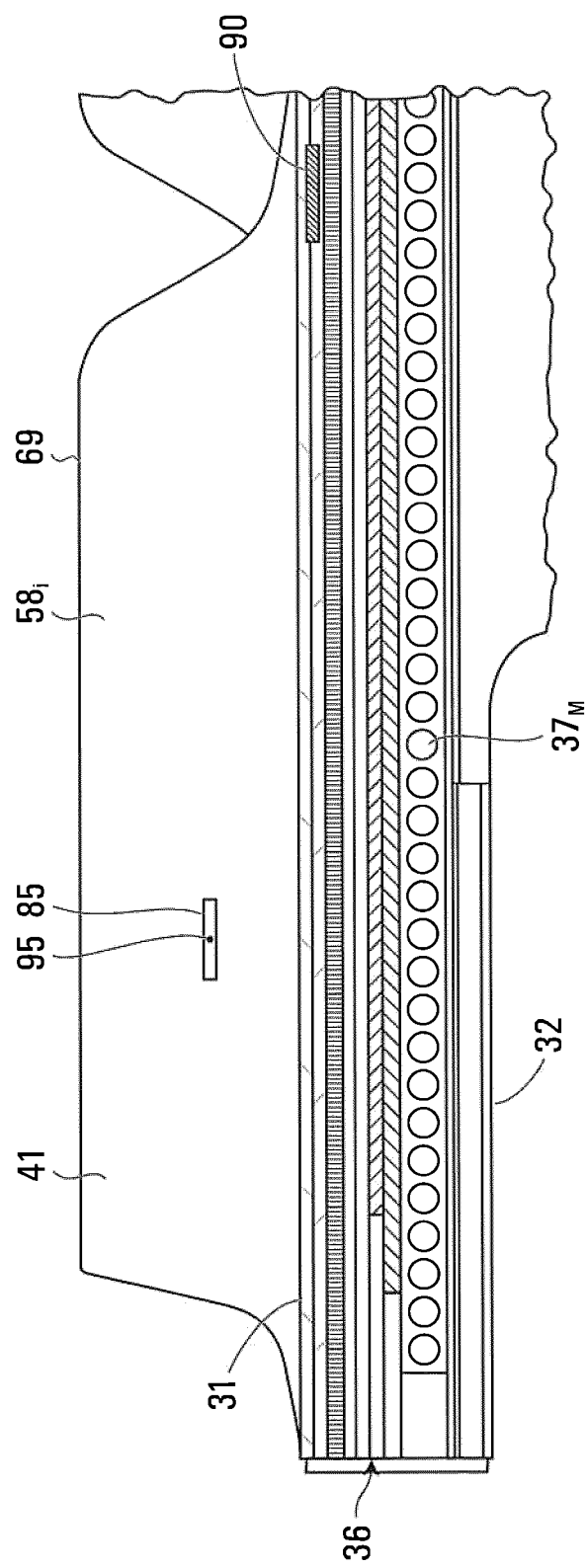
FIG. 11A shows a cross-sectional view of the track which shows a sensing device of the sensor located at a hottest point of the traction projection of the track.

In some examples of implementation, as shown in FIG. 11A, the sensing device 85 of the temperature sensor $84_x$ may be located at a hottest point 95 of a traction lug $58_i$ to measure the temperature at that hottest point 95. For instance, the hottest point 95 of the traction lug $58_i$ may be an inmost point of the traction lug $58_i$ that is farthest away from the periphery 69 of the traction lug $58_i$ (e.g., at half the height H and half the side-to-side dimension $L_W$ of the traction lug 58).

Figure 11B:
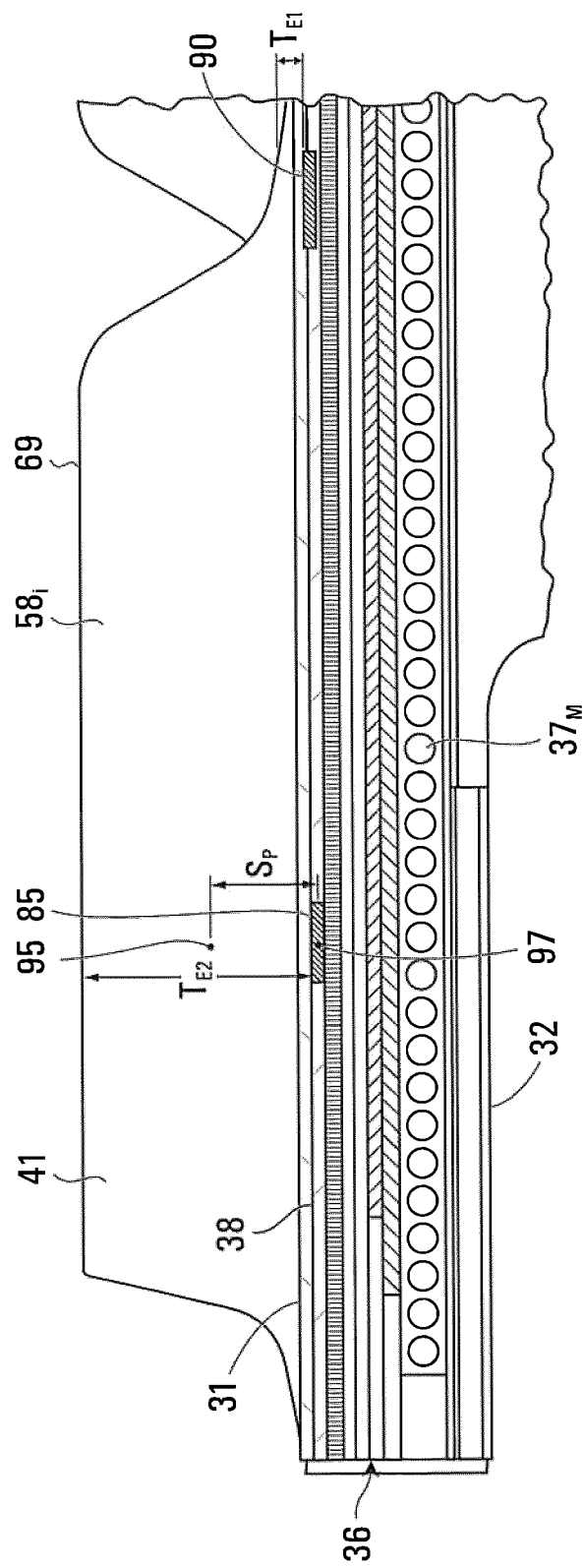
FIG. 11B shows a cross-sectional view of the track which shows the sensing device of the sensor located at a reference point spaced apart from the hottest point of the traction projection of the track.

In other examples of implementation, as shown in FIG. 11B, the sensing device 85 of the temperature sensor $84_x$ may be located at a reference point 97 spaced apart from the hottest point 95 of the traction lug $58_i$ to measure the temperature at that reference point 97. The temperature at the reference point 97 of the traction lug $58_i$ is correlated to the temperature at the hottest point 95 of the traction lug $58_i$ based on a temperature model for the traction lug $58_1$.

For instance, in some embodiments, the temperature model may define a temperature difference between the hottest point 95 and the reference point 97. To that end, the temperature model may use one or more inputs (besides the temperature at the reference point 97) to obtain the temperature at the hottest point 95 based on the temperature at the reference point 97. This may include, for example, a spacing $S_P$ between the reference point 97 and the hottest point 95 of the traction lug $58_i$, material properties (e.g., thermal conductivity) of elastomeric material of the track 22 (e.g., the elastomeric material 41 of the traction lug $58_i$, the elastomeric material 38 of the carcass 36), design parameters of the traction lug $58_i$ (e.g., dimensions such as height, width and length, heat transfer coefficient, etc.), environmental conditions (e.g., ambient temperature), a condition of the traction lug $58_i$ (e.g., a wear condition of the traction lug $58_i$). Thus, the temperature model may use these one or more inputs to determine the temperature at the hottest point 95. For instance, in a specific example of implementation, the temperature model may associate a given value of the spacing $S_P$ between the reference point 97 and the hottest point 95 with a particular temperature difference between the hottest point 95 and the reference point 97 such that the temperature model can obtain the temperature at the hottest point 95 by adding the temperature difference to the temperature at the reference point 97.

The temperature model may be implemented in various ways. For instance, in some embodiments, the temperature model may be established by calibrating the temperature sensor $84_x$ accordingly. That is, the temperature model may be established by causing the temperature sensor $84_x$ to record a temperature reading that corresponds substantially to the temperature at the hottest point 95. For instance, according to a simplified example, if it has been observed that a given spacing $S_P$ between the reference point 97 and the hottest point 95 results in a given temperature difference between the hottest point 95 and the reference point 97, then the temperature sensor $84_x$, which is located at the reference point 97, may be calibrated such as to offset its temperature readings by the given temperature difference between the hottest point 95 and the reference point 97. For example, assuming that testing shows that a given spacing $S_P$ (e.g., 1 inch) between the hottest point 95 and the reference point 97 results in a temperature difference of 20° C. between the hottest point 95 and the reference point 97, then the temperature sensor $84_x$ could be calibrated to record a temperature of 20° C. higher than the temperature at the reference point 97 (i.e., record a temperature 20° C. higher than what the temperature at the reference point 97 is in reality).

In other examples, the calibration of the temperature sensor $84_x$ may be more complex than a "fixed" offset of the temperature recorded by the temperature sensor $84_x$ (i.e., a constant offset). For instance, in some embodiments, the calibration of the temperature sensor $84_x$ may be implemented via a calibration curve (e.g., a function) which serves to calibrate (i.e., compensate) the temperature recorded at the reference point 97 by the temperature sensor $84_x$. For example, the calibration curve implemented by the temperature sensor $84_x$ may be a result of testing and plotting of various heating cycles experienced by the temperature sensor $84_x$ while it is located at the reference point 97 compared to an actual temperature recorded at the hottest point 95. Thus the calibration curve may take into account one or more factors such as those listed above (e.g., the spacing $S_P$ between the hottest point 95 and the reference point 97, material properties of elastomeric material of the track 22, design parameters of the traction lug $58_i$.)

In some embodiments, the temperature model may be established at the processing entity 88 of the monitoring system 82. For instance, in some embodiments, the temperature model may be implemented as a function that is executed at the processing entity 88. The function implemented by the temperature model may be any type of function having as a variable one or more of the inputs listed above (e.g., the spacing $S_P$ between the hottest point 95 and the reference point 97, the material properties of elastomeric material of the track 22, design parameters of the traction projection $58_i$, environmental conditions). For example, the function of the temperature model implemented at the processing entity 88 may be of the type $F(T_{rp})=A*T_{rp}+B$, where an output of the function $F(T_{rp})$ is the calculated temperature at the hottest point 95, $T_{rp}$ is the temperature recorded at the reference point 97, A is a factor of proportionality and B is a temperature offset (e.g., +30° C.). The factor of proportionality A may be determined by any of a number of inputs such as those discussed above, including the spacing $S_P$ between the hottest point 95 and the reference point 97, the material properties of the elastomeric material of the track 22 (e.g., elastomeric material 41 of the traction projection $58_i$ and/or the elastomeric material 38 of the carcass 36), design parameters of the traction projection $58_i$ and/or environmental conditions (e.g., ambient temperature).

As discussed above, the reference point 97 is spaced apart from the hottest point 95 by the spacing $S_P$. In embodiments in which the height H of the traction lug $58_i$ is relatively high, the spacing $S_P$ may be significant. For instance, in some cases, a ratio of the spacing $S_P$ over the height H of the traction lug $58_i$ may be at least 0.3, in some cases at least 0.4, in some cases at least 0.5, in some cases at least 0.6, in some cases at least 0.7, and in some cases even more. In embodiments in which the height H of the traction lug $58_i$ is relatively low, the spacing $S_P$ may not be as significant. For instance, in some cases, the ratio of the spacing $S_P$ over the height H of the traction lug $58_i$ may be no more than 0.3, in some cases no more than 0.2, in some cases no more than 0.1, and in some cases even less.

The temperature sensor $84_x$ may be provided and retained within the elastomeric material 41 of the traction lug $58_i$ in various ways. For instance, in this embodiment, the temperature sensor $84_x$ is placed in a mold used for molding of the track 22 (including the carcass 36, the drive/guide lugs $48_1$-$48_N$ and the traction lugs $58_1$-$58_T$) and the elastomeric material 41 is molded over the temperature sensor $84_x$. For example, this may involve disposing a first layer of elastomeric material (e.g., destined to form part of the elastomeric material 38 of the carcass 36 or the elastomeric material 41 of the traction lugs $58_1$-$58_T$) within a mold, positioning the sensor $84_x$ on the first layer of elastomeric material, and disposing a second layer of elastomeric material (e.g., destined to form part of the elastomeric material 41 of the traction lugs $58_1$-$58_T$) on top of the first layer of elastomeric material such as to effectively sandwich the sensor $84_x$ between the first and second layers of elastomeric material.

In some embodiments, an adhesive may be used to help retention of the sensor $84_x$ in elastomeric material (e.g., in the elastomeric material 41 of the traction projection $58_i$ and/or in the elastomeric material 38 of the carcass 36). For example, the adhesive may be a metal-to-elastomer adhesive such as Chemlok™ or any other suitable metal-to-elastomer adhesive.

In some cases, the temperature sensor $84_x$ may be inserted into the elastomeric material 41 of the traction lug $58_i$ after molding of the elastomeric material 41 of the traction lug $58_i$. For example, in a post-molding operation, the traction lug $58_i$ may be opened (e.g., via drilling a hole or making an incision) and the temperature sensor $84_x$ inserted into the elastomeric material 41 of the traction lug $58_i$. The traction lug $58_i$ may be sealed thereafter. In such cases, the temperature sensor $84_x$ may be retained in the traction lug $58_i$ by overmolding (i.e., molding a layer of elastomeric material on top of an already molded layer of elastomeric material), by friction (e.g., a press-fit), by an adhesive, or by a fastener.

Figure 12:
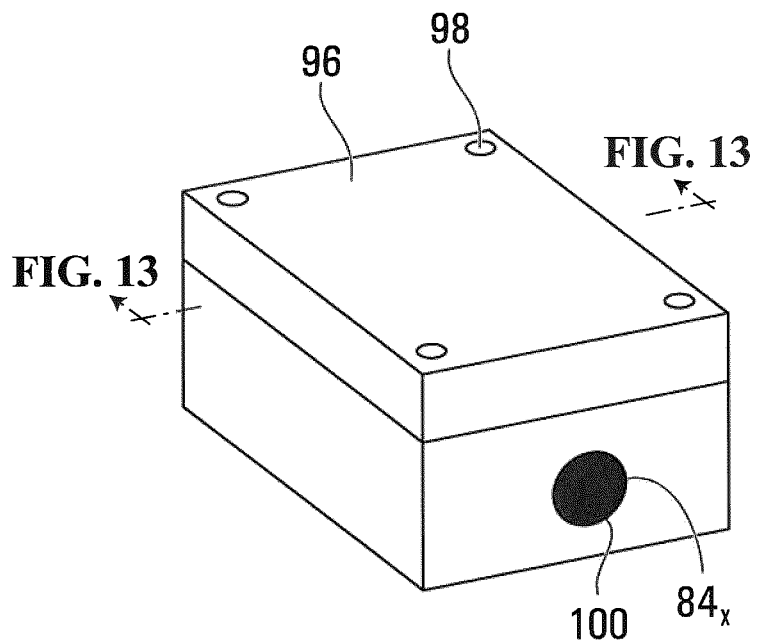
FIG. 12 shows a perspective view of a housing of the sensor of the monitoring system.
Figure 13:
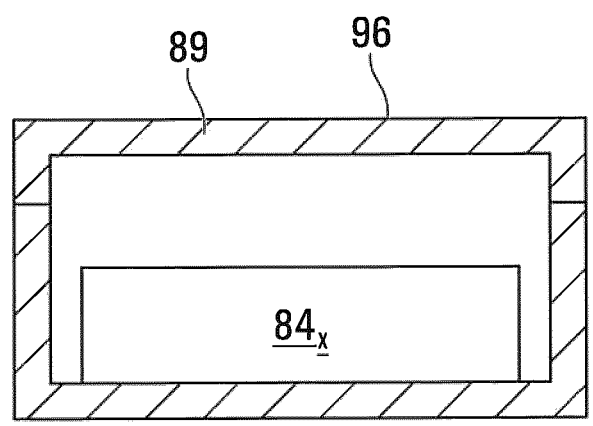
FIG. 13 shows a cross-sectional view of the housing of the sensor taken along line 13-13 in FIG. 12.

As shown in FIGS. 12 and 13, in this embodiment, the temperature sensor $84_x$ is enclosed within a housing 96. The housing 96 is configured to protect the temperature sensor $84_x$ by preventing the intrusion of particles that may be damaging to the temperature sensor $84_x$. For example, the housing 96 may be rated IP67 or IP68 according to the IP Code which classifies and rates the degree of protection provided against intrusion, dust, accidental contact, and water by mechanical casings and electrical enclosures. In this embodiment, the housing 96 comprises two halves which are secured to one another via fasteners 98, and an opening 100 for allowing the sensing device 85 of the temperature sensor $84_x$ to make a temperature reading. A periphery of the opening 100 may be provided with a sealing element for preventing the intrusion of particles into the housing 96. The housing 96 may be configured differently in other embodiments.

The housing 96 comprises a material 89 which imparts strength and protective qualities to the housing 96. For instance, the protective material 89 may be a heat resistant material such that the housing 96 is not damaged when subjected to high heat. Moreover, the protective material 89 imparts sufficient strength to the housing 96 for the housing 96 to withstand deformation of the elastomeric material 41 surrounding it. In this example of implementation, the protective material 89 comprises a thermoplastic polymer (e.g., acrylonitrile butadiene styrene (ABS) or a polycarbonate). The protective material 89 may comprise any other suitable material in other embodiments.

The temperature sensor $84_x$ comprises an interface 105 comprising a transmitter 90 for issuing the sensor signal indicative of the temperature of the track 22. In this embodiment, the transmitter 90 is configured for transmitting the sensor signal indicative of the temperature of the track 22 to the processing entity 88, which comprises a receiver 104 to receive the sensor signal from the temperature sensor 84.

The transmitter 90 of the temperature sensor $84_x$ and the receiver 104 of the processing entity 88 may be connected in any suitable way. In this embodiment, the temperature sensor $84_x$ and the processing entity 88 are connected wirelessly. Thus, in this embodiment, the transmitter 90 of the temperature sensor $84_x$ is a wireless transmitter that can wirelessly transmit the sensor signal and the receiver 104 of the processing entity 88 is a wireless receiver that can wirelessly receive the sensor signal.

The sensor $84_x$ may be disposed such that the sensor signal issued by the sensor $84_x$ has a signal strength sufficient to overcome a thickness of elastomeric material of the track 22 along a path of the sensor signal. More particularly, in this embodiment, the transmitter 90 of the sensor $84_x$ is spaced from the sensing device 85 of the sensor 84$_x$ and located beneath less elastomeric material than the sensing device 85.

For instance, in this embodiment, as shown in FIG. 11B, a thickness $T_{E1}$ of elastomeric material of the track 22 between the transmitter 90 and the periphery 69 of the traction lug 58$_i$ is less than a thickness $T_{E2}$ of elastomeric material of the track 22 between the sensing device 85 and the periphery 69 of the traction lug 58$_i$. For example, in some cases, a ratio $T_{E1}/T_{E2}$ of the thickness $T_{E1}$ of elastomeric material of the track 22 between the transmitter 90 and the periphery 69 of the traction lug 58$_i$ over the thickness $T_{E2}$ of elastomeric material of the track 22 between the sensing device 85 and the periphery 69 of the traction lug 58$_i$ may be no more than 0.5, in some cases no more than 0.4, in some cases no more than 0.3, in some cases no more than 0.2, in some cases no more than 0.1, and in some cases even less. This ratio may have any other suitable value in other embodiments.

Moreover, in this embodiment, a thickness of elastomeric material of the track 22 between the transmitter 90 and the ground-engaging outer surface 31 of the carcass 36 may be less than the thickness $T_{E2}$ of elastomeric material of the track 22 between the sensing device 85 and the periphery 69 of the traction lug 58$_i$. For instance, in some cases, a ratio of the thickness of elastomeric material of the track 22 between the transmitter 90 and the ground-engaging outer surface 31 of the carcass 36 over the thickness $T_{E2}$ of elastomeric material of the track 22 between the sensing device 85 and the periphery 69 of the traction lug 58$_i$ may be no more than 0.4, in some cases no more than 0.3, in some cases no more than 0.2, in some cases no more than 0.1, and in some cases even less. This ratio may have any other suitable value in other embodiments. In some embodiments, the transmitter 90 may be positioned such that the traction lug 58$_i$ does not overlap the transmitter 90 (i.e., such that the transmitter 90 has a different longitudinal and widthwise position in the track 22 than the traction lug 58$_i$).

The sensor signal indicative of the temperature of the track 22 may be issued by the temperature sensor 84$_x$ in any suitable manner.

Figure 16:
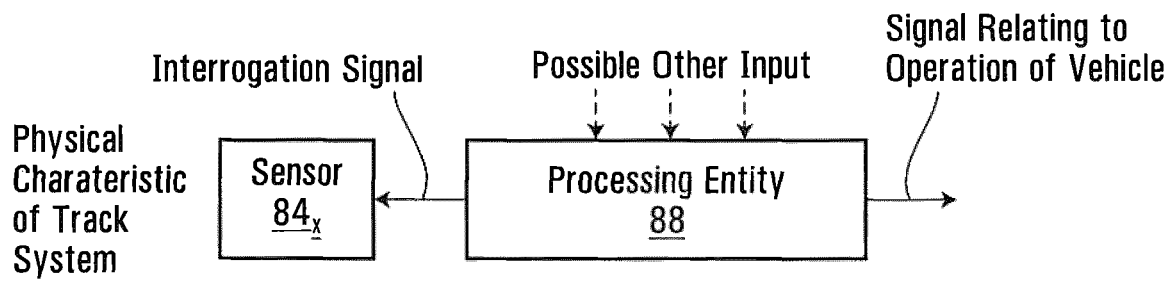
FIG. 16 is a flow diagram showing the processing entity transmitting an interrogation signal to the sensor to obtain the signal relating to the track system.

For example, in this embodiment, as shown in FIG. 16, the processing entity 88 is configured to issue an interrogation signal directed to the temperature sensor 84$_x$, which is configured to issue the sensor signal indicative of the temperature of the track 22 to the processing entity 88 in response to the interrogation signal. Thus, in this embodiment, the processing entity 88 comprises a transmitter 106 to transmit the interrogation signal to the temperature sensor 84$_x$, the interface 105 of which comprises a receiver 92 to receive the interrogation signal. In this case, the transmitter 106 of the processing entity 88 is a wireless transmitter to wirelessly transmit the interrogation signal and the receiver 92 of the interface 105 of temperature sensor 84$_x$ is a wireless receiver to wirelessly receive the interrogation signal. In some examples of implementation, the transmitter 90 and the receiver 92 of the temperature sensor 84$_x$ may be implemented by a transceiver and/or the transmitter 106 and the receiver 104 of the processing entity 88 may be implemented by a transceiver.

More particularly, in this embodiment, the temperature sensor 84$_x$ and the processing entity 88 implement radiofrequency identification (RFID) technology to communicate, including to wirelessly transmit the sensor signal indicative of the temperature of the track 22 from the temperature sensor 84$_x$ to the processing entity 88. In this case, the transmitter 90 and the receiver 92 of the temperature sensor 84$_x$ implement an RFID element (e.g., an RFID tag) and the transmitter 106 and the receiver 104 of the processing entity 88 implement an RFID element (e.g., an RFID reader).

The RFID element implemented by the transmitter 90 and the receiver 92 of the temperature sensor 84$_x$ may be a passive RFID tag that is powered by the interrogation signal of the RFID element implemented by the transmitter 106 and the receiver 104 of the processing entity 88, which may be an active RFID reader. That is, the RFID tag implemented by the transmitter 90 and the receiver 92 of the temperature sensor 84$_x$ is electromagnetically powered by the interrogation signal of the RFID reader implemented by the transmitter 106 and the receiver 104 of the processing entity 88. The power generated through this interaction may then be used by the RFID tag to issue the sensor signal indicative of the temperature of the track 22.

In this example of implementation, the RFID tag implemented by the transmitter 90 and the receiver 92 of the temperature sensor 84$_x$ enables the sensing device 85 of the temperature sensor 84$_x$ to record a temperature reading. More specifically, when the RFID tag is powered by the interrogation signal of the RFID reader, at least part of the power is routed to the sensing device 85 in order for the sensing device 85 to record a temperature reading. The transmitter 90 then issues the sensor signal indicative of the temperature of the track 22 (as recorded by the sensing device 85) to the RFID reader implemented by the transmitter 106 and the receiver 104 of the processing entity 88.

The RFID tag implemented by the transmitter 90 and the receiver 92 of the temperature sensor 84$_x$ and the RFID reader implemented by the transmitter 106 and the receiver 104 of the processing entity 88 may be off-the-shelf components. For example, an RFID tag integrating a sensing device 85 for recording temperature readings is manufactured by Farsens (e.g., the Fenix passive RFID sensor tag). Such RFID tags are compatible with commonly available RFID readers.

In other embodiments, the temperature sensor 84$_x$ may be configured to issue the input signal indicative of the temperature of the track 22 to the processing entity 88 autonomously (i.e., without receiving any interrogation signal). For instance, in some embodiments, the transmitter 94 of the temperature sensor 84$_x$ may issue the input signal indicative of the temperature of the track 22 to the processing entity 88 repeatedly (e.g., periodically or at some other predetermined instants).

For instance, in other embodiments, the RFID element implemented by the transmitter 90 and the receiver 92 of the temperature sensor 84$_x$ may be an active RFID tag or a battery-assisted passive (BAP) RFID tag.

For example, an active RFID tag implemented by the transmitter 90 and the receiver 92 of the temperature sensor 84$_x$ has its own power source (e.g., a battery) to enable the entire functionality of the active RFID tag. That is, the active RFID tag's power source enables the sensing device 85 to record a temperature reading and also enables the transmitter 94 to issue the input signal indicative of the temperature of the track 22 to the RFID reader (i.e., the processing entity 88). Thus, in this case, the active RFID tag can implement its functions independently of the RFID reader. In such a case, the power source (i.e., the battery) of the active RFID tag may be configured to provide power to the RFID tag for an amount of time at least as great, and in some cases greater, than a lifetime of the track 22 (i.e., a span of time that the track 22 is expected to last). For example, the battery of the active RFID tag may have a 10-year battery life which may be sufficient to outlast the lifetime of the track 22 which, under moderate use, may be approximately 3 to 5 years, for example.

Conversely, a BAP RFID tag's power source (e.g., a battery) only enables part of the BAP RFID tag's functions. For instance, the power source may enable the sensing device 85 to record a temperature reading. However the BAP RFID tag is dependent on the interrogation signal of the RFID reader (i.e., the processing entity 88) to power the transmitter 94 to issue the input signal indicative of the temperature of the track 22 to the processing entity 88.

Figure 27:
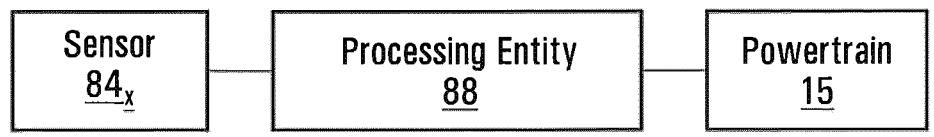
FIG. 27 shows an example of an embodiment in which the processing entity issues the signal relating to the operation of the vehicle to the powertrain of the vehicle.

The processing entity 88 is configured to perform one or more actions based on the sensor signal from the sensor $84_x$ and possibly other input and/or information. For example, in some embodiments, the processing entity 88 may issue an output signal relating to the operation of the agricultural vehicle 10 derived from the sensor signal from the sensor $84_x$. For instance, in some embodiments, as shown in FIG. 27, the output signal issued by the processing entity 88 may be directed to the powertrain 15 of the agricultural vehicle 10 to control the operation of the agricultural vehicle 10 based on the temperature of the track 22. In other embodiments, the output signal issued by the processing entity 88 may be directed to a communication device (e.g., comprising a display) for outputting information regarding the operation of the agricultural vehicle 10 to the operator of the agricultural vehicle 10. As another example, in some embodiments, the processing entity 88 may issue an output signal conveying information about the track system $16_i$, such as the temperature of the track 22. As another example in some embodiments, the processing entity 88 may store information about the track system $16_i$ in memory (e.g., for future reference), such as the temperature of the track 22 at a given moment (e.g., date and time).

Figure 14:
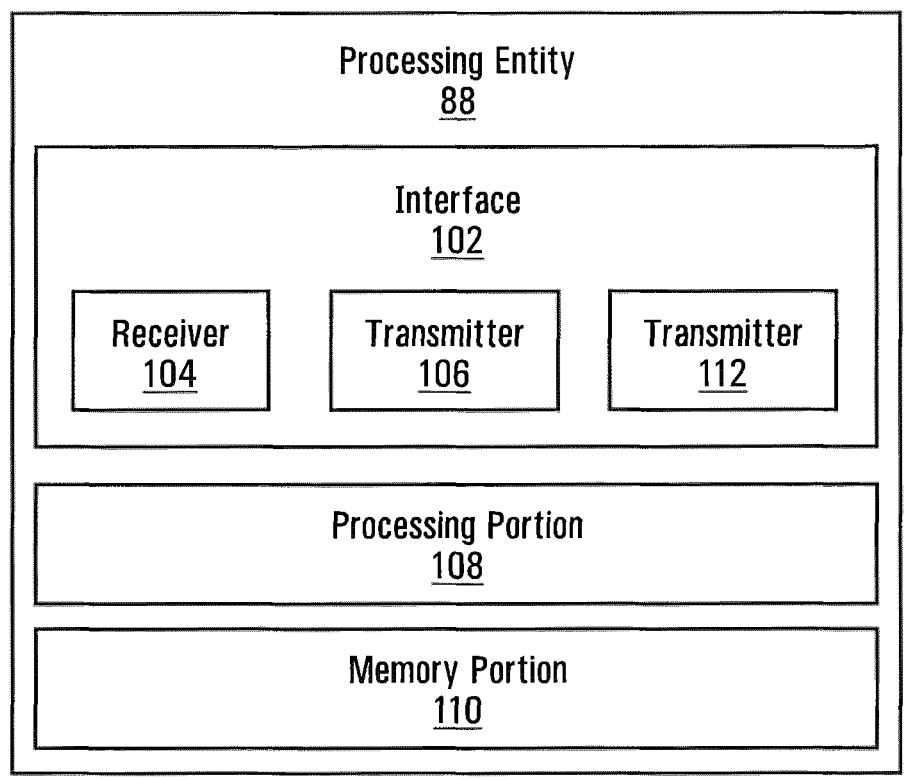
FIG. 14 shows an example of the processing entity of the monitoring system.
Figure 15:
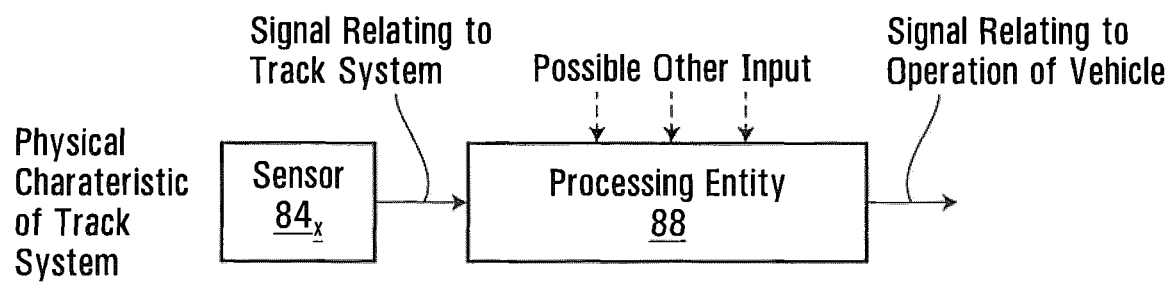
FIG. 15 is a flow diagram showing the sensor transmitting a signal relating to the track system to the processing entity and the processing entity issuing a signal relating to operation of the vehicle.

To that end, as shown in FIG. 14, in this embodiment, the processing entity 88 comprises an interface 102, a processing portion 108, and a memory portion 110, which are implemented by suitable hardware and/or software.

The interface 102 comprises one or more inputs and outputs allowing the processing entity 88 to receive input signals from and send output signals to other components to which the processing entity 88 is connected (i.e., directly or indirectly connected). For example, in this embodiment, an input of the interface 102 is implemented by the wireless receiver 104 to receive the sensor signal from the temperature sensor $84_x$. An output of the interface 102 is implemented by a transmitter 112 to transmit the output signal relating to the operation of the agricultural vehicle 10. In this case, another output of the interface 102 is implemented by the wireless transmitter 106 to transmit the interrogation signal to the temperature sensor $84_x$.

The processing portion 108 comprises one or more processors for performing processing operations that implement functionality of the processing entity 88. A processor of the processing portion 108 may be a general-purpose processor executing program code stored in the memory portion 110. Alternatively, a processor of the processing portion 108 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 110 comprises one or more memories for storing program code executed by the processing portion 108 and/or data used during operation of the processing portion 108. A memory of the memory portion 110 may be a semiconductor medium (including, e.g., a solid-state memory), a magnetic storage medium, an optical storage medium, and/or any other suitable type of memory. A memory of the memory portion 110 may be read-only memory (ROM) and/or random-access memory (RAM), for example.

In some embodiments, two or more elements of the processing entity 88 may be implemented by devices that are physically distinct from one another and may be connected to one another via a bus (e.g., one or more electrical conductors or any other suitable bus) or via a communication link which may be wired, wireless, or both. In other embodiments, two or more elements of the processing entity 88 may be implemented by a single integrated device.

The processing entity 88 may be implemented in any other suitable way in other embodiments.

In some embodiments, at least part of the temperature sensor $84_x$ and/or at least part of the processing entity 88 may be disposed relative to one another and/or the track 22 so as to facilitate communication between them.

For instance, in some embodiments, at least part of the temperature sensor $84_x$ and/or at least part of the processing entity 88 may be oriented so as to provide more time for them to communicate with one another as the track 22 moves around the track-engaging assembly 21 and/or to reduce or minimize potential interference with one or more components of the track system $16_i$ (e.g., metallic components such as the reinforcing cables $37_1$-$37_M$ or a layer of fabric 43 of the track 22). For example, an orientation of the interface 105 of the temperature sensor $84_x$ and/or an orientation of the interface 102 of the processing entity 88 may be arranged as such. That is, the interface 105 of the temperature sensor $84_x$ and/or the interface 102 of the processing entity 88 may be oriented to not be in alignment with reinforcing cables $37_1$-$37_M$ and/or fabric elements of a layer of fabric 43.

Figure 34:
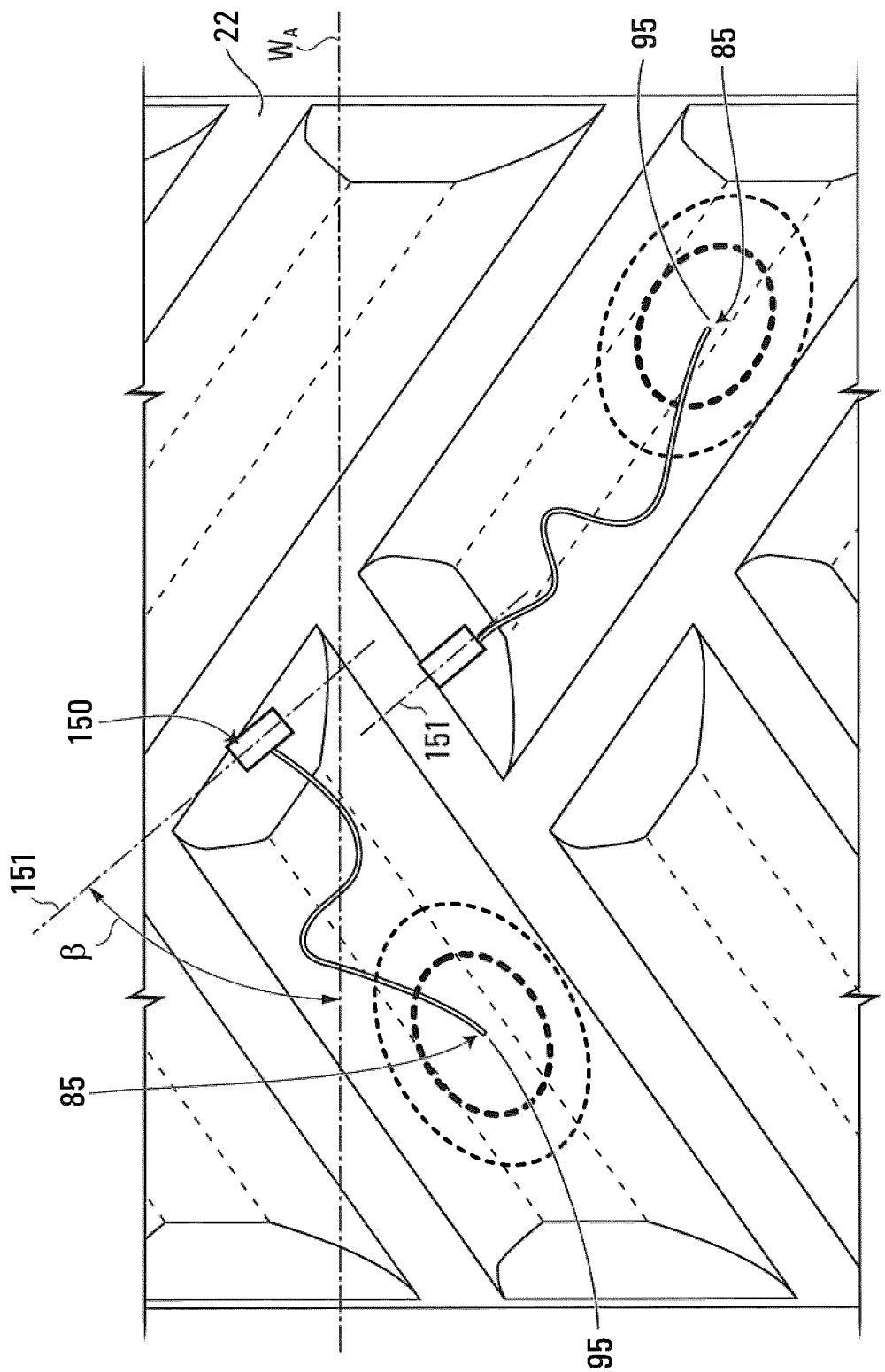
FIGS. 34 and 35 show top views of the track in accordance with embodiments in which at least part of the sensor and at least part of the processing entity are oriented so as to facilitate communication between the sensor and the processing entity.
Figure 35:
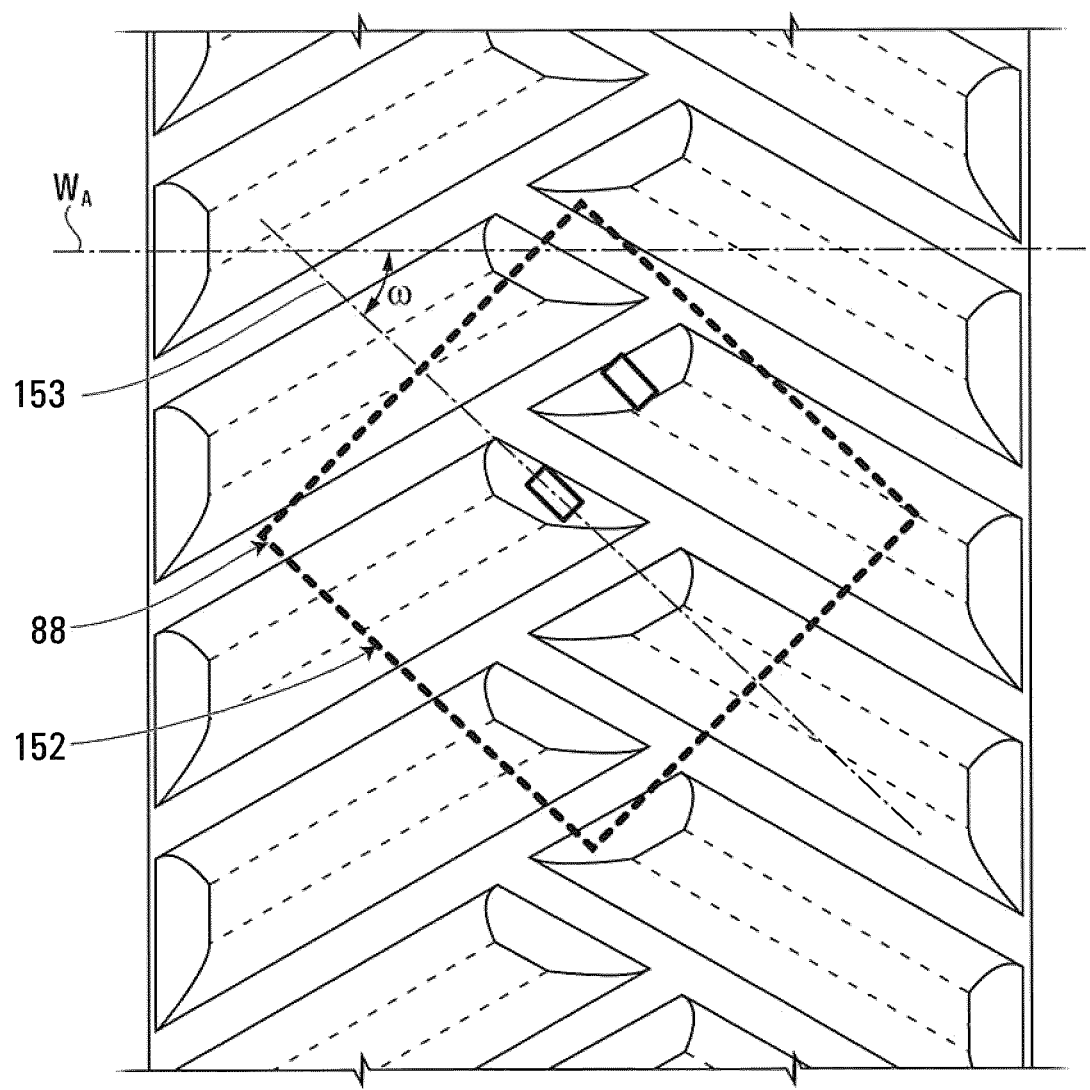

For instance, as shown in FIGS. 34 and 35, a portion 150 of the temperature sensor $84_x$ that comprises the interface 105 of the temperature sensor $84_x$ may have a longitudinal axis 151 that is oriented transversally to the widthwise direction of the track 22 and/or transversally to the longitudinal direction of the track 22 and/or a portion 152 of the processing entity 88 that comprises the interface 102 of the processing entity 88 (e.g., an antenna such as an RFID antenna) may have a longitudinal axis 153 that is oriented transversally to the widthwise direction of the track 22 and/or transversally to the longitudinal direction of the track 22. For example, an angle β between the longitudinal axis 151 of the portion 150 of the temperature sensor $84_x$ and an axis $W_A$ extending along the widthwise direction of the track 22 may be at least 15°, in some cases at least 30°, in some cases at least 45°, and in some cases even more. Moreover, an angle ω between the longitudinal axis 153 of the portion 152 of the processing entity 88 and the axis $W_A$ extending along the widthwise direction of the track 22 may be at least 15°, in some cases at least 30°, in some cases at least 45°, and in some cases even more. For example, in some embodiments, the longitudinal axis 151 of the portion 150 of the temperature sensor $84_x$ may be parallel to the longitudinal axis 153 of the portion 152 of the processing entity 88.

The output signal relating to the operation of the agricultural vehicle 10 that may be issued by the processing entity 88 in some embodiments may be used in various ways.

For example, with additional reference to FIG. 27, in some embodiments, the output signal issued by the processing entity 88 may be directed to the powertrain 15 of the agricultural vehicle 10 to control the operation of the vehicle based on the temperature of the track 22. For instance, the output signal issued by the processing entity 88 may be directed to the powertrain 15 of the agricultural vehicle 10 to control the speed of the agricultural vehicle 10, such as by limiting and/or reducing the speed of the vehicle 10 or by allowing the speed of the vehicle 10 to be increased, based on the temperature of the track 22.

Figure 17:
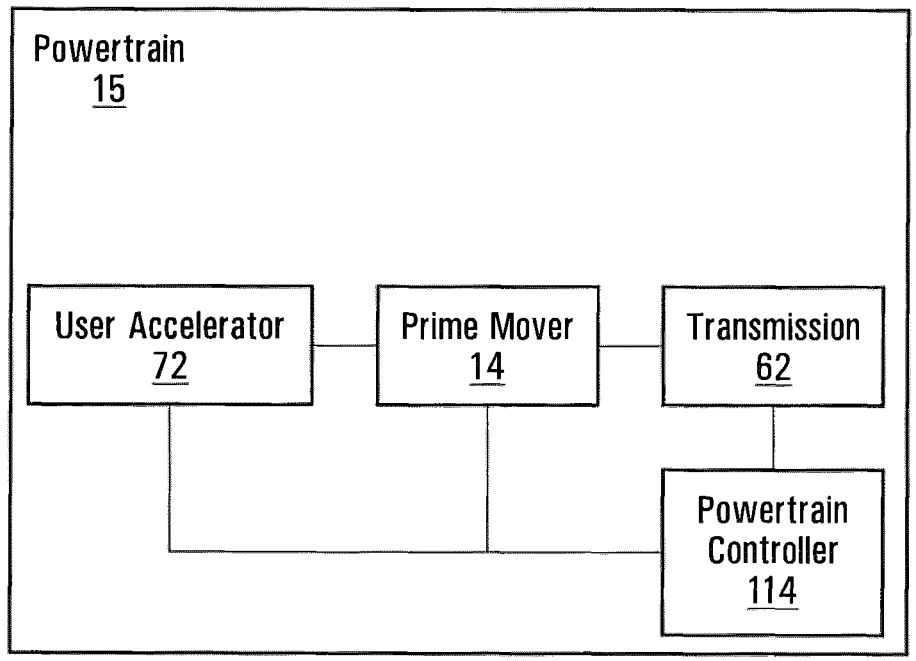
FIG. 17 shows an example of an embodiment of a powertrain of the tracked vehicle.

In some embodiments, as shown in FIG. 17, the output signal issued by the processing entity 88 may be directed to a powertrain controller 114 of the powertrain 15. The powertrain controller 114 is configured for controlling operation of the powertrain 15.

Figure 18:
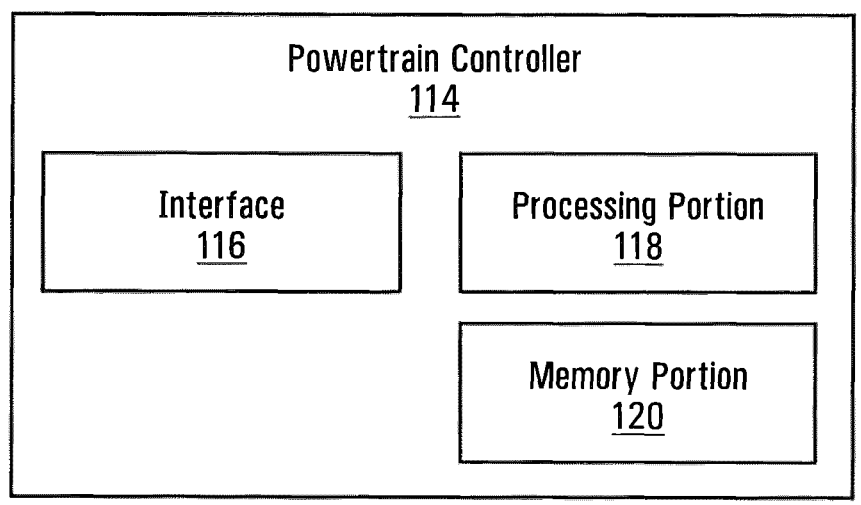
FIG. 18 shows an example of an embodiment of a powertrain controller of the powertrain.

More particularly, in this embodiment, the powertrain controller 114 is an electronic controller that comprises suitable hardware and/or software (e.g., firmware) configured to implement its functionality. With additional reference to FIG. 18, the powertrain controller 114 comprises an interface 116, a processing portion 118 and a memory portion 120.

The interface 116 allows the powertrain controller 114 to receive inputs from and release outputs to other components of the agricultural vehicle 10 to which the powertrain controller 114 is connected (i.e., directly or indirectly connected to), including, in this embodiment, the prime mover 14, the transmission 62, the accelerator 72 and/or other components of the user interface 70, and one or more sensors (e.g., a throttle position sensor; a prime mover speed sensor, i.e., a sensor sensing a speed of the prime mover 14; a vehicle speed sensor, i.e., a sensor sensing a speed of the agricultural vehicle 10 on the ground; a prime mover temperature sensor; an outside environment temperature sensor; etc.). In this example, the interface 116 of the powertrain controller 114 allows the powertrain controller 114 to receive the output signal of the processing entity 88.

The processing portion 118 comprises one or more processors for performing processing operations that implement functionality of the powertrain controller 114. A processor of the processing portion 118 may be a general-purpose processor executing program code stored in the memory portion 120. Alternatively, a processor of the processing portion 118 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 120 comprises one or more memories for storing program code executed by the processing portion 118 and/or data used during operation of the processing portion 118. A memory of the memory portion 120 may be a semiconductor memory (e.g., read-only memory (ROM) and/or random-access memory (RAM)), a magnetic storage medium, an optical storage medium, and/or any other suitable type of memory.

Figure 19:
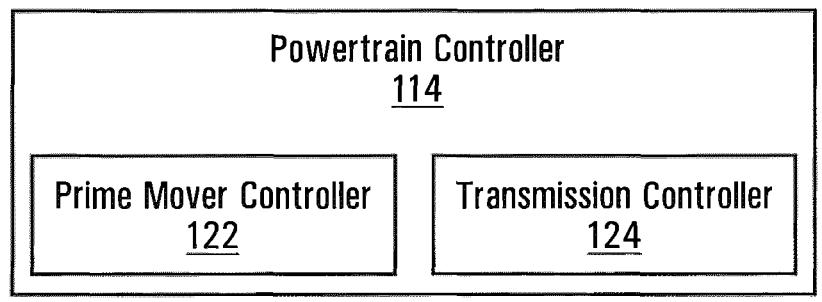
FIG. 19 shows an example of an embodiment of components of the powertrain controller.

More particularly, in this embodiment, as shown in FIG. 19, the powertrain controller 114 comprises a prime mover controller 122 and a transmission controller 124. For instance, in this embodiment in which the prime mover 14 is an internal combustion engine and the transmission 62 is an automatic transmission, the prime mover controller 122 may be an engine control unit (ECU) and the transmission controller 124 may be a transmission control unit (TCU). Such ECUs and TCUs are well understood by those skilled in the art. In some cases, the powertrain controller 114 may be a distributed controller in which the prime mover controller 122 and the transmission controller 124 are physically distinct from one another and may be connected to one another via a bus (e.g., a controller-area network (CAN) bus or other suitable bus). In other cases, the prime mover controller 122 and the transmission controller 124 may be functional entities of a single physical control module (e.g., a powertrain control module (PCM)).

The prime mover controller 122 is configured to control operation of the prime mover 14. Specifically, the prime mover controller 122 is configured to control one or more prime mover characteristics.

For example, in this embodiment, one prime mover characteristic controlled by the prime mover controller 122 is a power output of the prime mover 14. The power output of the prime mover 14 refers to the power currently generated by the prime mover 14. It can be evaluated as a torque produced by the prime mover 14 multiplied by a speed (i.e., a rotational speed) of the prime mover 14 (e.g., revolutions per minute (RPM)) at a given instant.

The prime mover controller 122 controls the power output of the prime mover 14 based on inputs from various entities, such as: the accelerator 72 and/or one or more other components of the user interface 70; one or more sensors (e.g., a throttle position sensor, an air-fuel ratio sensor, a prime mover speed sensor, a vehicle speed sensor, a temperature sensor, a pressure sensor, etc.); one or more other controllers (e.g., the transmission controller 124); and/or other entities. In this example, the prime mover controller 122 may control the power output of the prime mover 14 based on the output signal issued by the processing entity 88.

To control prime mover characteristics such as the power output of the prime mover 14 and the temperature of the prime mover 14, in this embodiment, the prime mover controller 122 comprises a program stored in the memory portion 120 and executed by the processing portion 118. For example, the program may determine the power output of the prime mover 14 by performing computations based on inputs from a throttle position sensor, an air-fuel ratio sensor, a prime mover speed sensor, the accelerator 72, and/or the transmission controller 124. In this example, the program may determine the power output of the prime mover 14 based on the output signal issued by the processing entity 88. In some cases, certain operations of the program may refer to reference data stored in the memory portion 120. This reference data comprises data representative of one or more maps, tables, curves or other sets of reference values that are used during execution of the program of the prime mover controller 122. For instance, the reference data may associate different values of certain parameters of the prime mover 14 (e.g., the speed, temperature, air-fuel ratio, pressure, etc. of the prime mover 14) to corresponding values of fuel injection, ignition timing, valve timing, and/or other parameters of the prime mover 14 (e.g., a fuel map, an injection map, a boost map, and/or other performance map). Such programs and reference data are well-understood by those skilled in the art and will therefore not be discussed in further detail.

The transmission controller 124 is configured to control operation of the transmission 62. Specifically, the transmission controller 124 is configured to control one or more transmission characteristics. For example, in this embodiment, the transmission controller 124 controls a transmission state of the transmission 62. The transmission state of the transmission 62 can be defined in terms of (i) a transmission ratio of the transmission 62, which is the ratio that the transmission 62 currently applies between its input and its output, and/or (ii) an output direction of the transmission 62, which refers to a direction of motion (i.e., forward or reverse) of the output of the transmission 62 that allows the agricultural vehicle 10 to advance or back up. At a given instant, the transmission state of the transmission 62 is one of a set of available transmission states. The set of available transmission states can comprise a number of available transmission ratios that can be applied by the transmission 62. This number may be a finite number (e.g., two, three, four or any other finite number) of available transmission ratios, or an infinite number of available transmission ratios (e.g., in embodiments where the transmission 20 comprises a CVT).

The transmission controller 124 controls the transmission state of the transmission 62 based on inputs from various entities, such as: the accelerator 72 and/or one or more other components (e.g., a gear shift stick or pedal) of the user interface 70; one or more sensors (e.g., a throttle position sensor, a shift lever sensor, a prime mover speed sensor, a vehicle speed sensor, a temperature sensor, etc.); one or more other controllers (e.g., the prime mover controller 122); and/or other entities. In this example, the transmission controller 124 may control the transmission state of the transmission 62 based on the output signal issued by the processing entity 88.

To control the state of the transmission 62, in this embodiment, the transmission controller 124 comprises a program stored in the memory portion 120 and executed by the processing portion 118. For example, the program may determine when and how to shift between different transmission ratios of the transmission 62 by performing certain computations based on inputs from a throttle position sensor, a prime mover speed sensor, a vehicle speed sensor, the accelerator 72 and/or other components of the user interface 70, and/or the prime mover controller 122. In this example, the program may determine the power output of the prime mover 14 based on the output signal issued by the processing entity 88. In some cases, certain operations of the program may refer to reference data stored in the memory portion 120. This reference data comprises data representative of one or more maps, tables, curves or other sets of reference values that are used during execution of the program of the transmission controller 124. For instance, the reference data may associate different values of the speed of the prime mover 14 and of the speed of the agricultural vehicle 10 to corresponding transmission ratios of the transmission 62. Such programs are well-understood by those skilled in the art and will therefore not be discussed in further detail.

In this embodiment, the powertrain controller 114 controls the speed of the agricultural vehicle 10 at least in part based on the temperature of the track 22. That is, the powertrain controller 114 controls the speed of the agricultural vehicle 10 at least in part based on the output signal issued by the processing entity 88 to the powertrain controller 114.

More specifically, in this embodiment, the powertrain controller 114 is operable to limit the speed of the agricultural vehicle 10 at least in part based on the temperature of the track 22. For instance, in response to the output signal issued by the processing entity 88, the powertrain controller 114 may control the prime mover 14 and/or the transmission 12 to limit the speed of the agricultural vehicle 10 in order to regulate the temperature of the track 22. For example, when the sensor signal indicates that the temperature of the track 22 is close to a threshold temperature at which continued operation or further increase of the temperature of the track 22 may damage or otherwise cause deterioration of the track 22, the output signal issued by the processing entity 88 may cause the powertrain controller 114 to limit the speed of the agricultural vehicle 10 to a certain speed by limiting the power output of the prime mover 14 through the prime mover controller 122 and/or by controlling the transmission state of the transmission 12 through the transmission controller 124. The threshold temperature may have any suitable value and may vary according to the construction of the track 22. For example, in some cases, the threshold temperature may be at least 130° C., in some cases at least 140° C., in some cases at least 150° C., in some cases at least 160° C., in some cases at least 170° C., in some cases at least 180° C. and in some cases even greater than 180° C. (e.g., 190° C.).

In some embodiments, the powertrain controller 114 may be operable to reduce the speed of the agricultural vehicle 10 at least in part based on the temperature of the track 22. For instance, in response to the output signal issued by the processing entity 88, the powertrain controller 114 may control the prime mover 14 and/or the transmission 12 to reduce the speed of the agricultural vehicle 10 in order to regulate the temperature of the track 22. For example, when the sensor signal indicates that the temperature of the track 22 is close to or higher than the threshold temperature of the track 22, the output signal issued by the processing entity 88 may cause the powertrain controller 114 to reduce the speed of the agricultural vehicle 10 to a certain lower speed by reducing the power output of the prime mover 14 through the prime mover controller 122 and/or by modifying the transmission state of the transmission 12 through the transmission controller 124 (e.g., reducing a transmission ratio thereof). The lower speed at which the agricultural vehicle 10 is reduced may have any suitable value and may depend on the temperature of the track 22. For instance, if the temperature is higher than the threshold temperature of the track 22, the reduction in speed may be more significant (i.e., the speed may be reduced to a significantly lower value) than if the temperature of the track 22 is close to but not above the threshold temperature of the track 22. In some cases, the temperature of the track 22 at which the powertrain controller 114 causes a reduction in the speed of the agricultural vehicle 10 may be at least 130° C., in some cases at least 140° C., in some cases at least 150° C., in some cases at least 160° C., in some cases at least 170° C., in some cases at least 180° C. and in some cases even greater than 180° C. (e.g., 190° C.).

Moreover, in some embodiments, the powertrain controller 114 may be operable to determine whether to allow the speed of the agricultural vehicle 10 to be increased at least in part based on the temperature of the track 22. For instance, when the operator of the agricultural vehicle 10 acts upon the accelerator 72 in order to increase the speed of the agricultural vehicle 10, the powertrain controller 114 may determine whether or not to allow the speed of the agricultural vehicle 10 to be increased based on the output signal of the processing entity 88. For example, when the sensor signal indicates that the temperature of the track 22 is close to or higher than the threshold temperature of the track 22, the output signal issued by the processing entity 88 may cause the powertrain controller 114 to not allow (i.e., to prevent) the speed of the agricultural vehicle 10 to be increased in accordance to the operator input at the accelerator 72. Conversely, when the sensor signal indicates that the temperature of the track 22 is lower than the threshold temperature of the track 22 and does not pose a risk of deterioration of the track 22, the output signal issued by the processing entity 88 may cause the powertrain controller 114 to allow the speed of the agricultural vehicle 10 to be increased in accordance to the operator input at the accelerator 72. For example, in some cases, the temperature of the track 22 at which the powertrain controller 114 may determine to allow the speed of the track 22 to be increased may be up to 110° C., in some cases up to 120° C., in some cases up to 130° C., in some cases up to 140° C., in some cases up to 150° C. and in some cases even more than 150° C. (e.g., 155° C.). In some cases, the temperature of the track 22 above which the powertrain controller 114 may determine not to allow the speed of the track 22 to be increased may be between 130° C. to 190° C., in some cases between 140° C. to 180° C., in some cases between 150° C. to 170° C. and in some cases between 155° C. to 165° C.

In this embodiment, the output signal of the processing entity 88 is determined through a control loop feedback mechanism. For instance, in this embodiment, the processing entity 88 implements a proportional-integral-derivative (PID) controller to determine the output signal. For example, the PID controller may cause the output signal directed to the powertrain controller 114 to adjust the speed of the agricultural vehicle 10 based on iterative readings of the temperature of the track 22 to obtain a desired temperature of the track 22 (e.g., a temperature below the threshold temperature of the track 22). More specifically, in some embodiments, the PID controller causes the output signal to adjust the speed of the agricultural vehicle 10 by iteratively minimizing an error between the iterative readings of the temperature of the track 22 and the desired temperature of the track 22. To that end, the PID controller may be tuned to have an overdamped response (i.e., a response characterized by an exponential decay towards a set point value (e.g., the desired temperature of the track 22) without oscillation) such as to prevent or reduce overshoot of the temperature of the track 22. This may be useful to prevent the temperature of the track 22 from reaching or exceeding the threshold temperature of the track 22 above which the track 22 is susceptible to damage or deterioration. Such PID processes are generally known and thus will not be further discussed here.

In a variant, in some embodiments, the monitoring system 82 of the agricultural vehicle 10 may implement an option to selectively enable and disable control of the powertrain 15 based on the output signal of the processing entity 88. For instance, the agricultural vehicle 10 may implement a "manual override" option that can be activated by a user, such as the operator of the agricultural vehicle 10, to selectively enable and disable control of the powertrain 15 based on the output signal of the processing entity 88. Such a manual override may be useful when greater speeds are necessary (e.g., for safety reasons) but the output signal of the processing entity 88 might otherwise prevent attaining such speeds.

Figure 28:
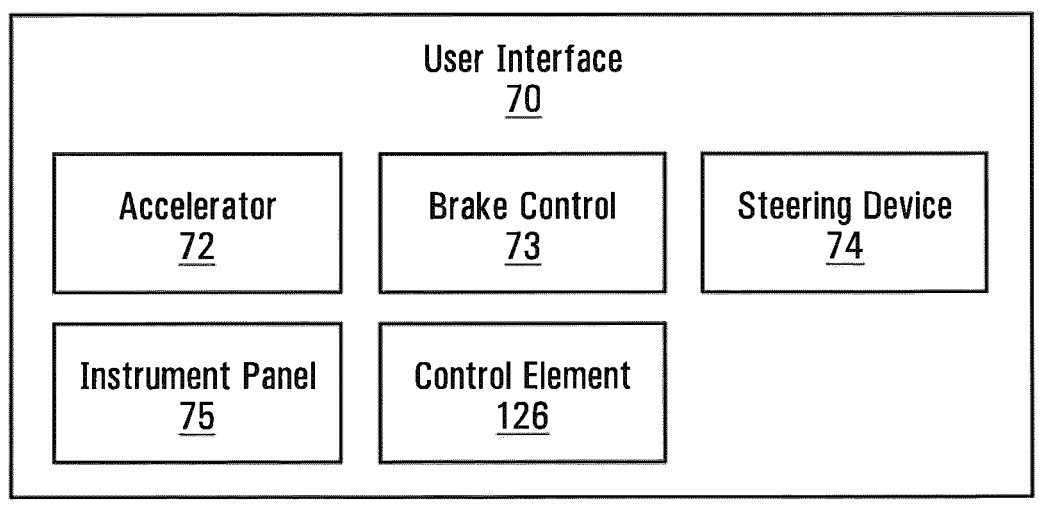
FIG. 28 shows an example of an embodiment of components of a user interface of an operator cabin of the vehicle.
Figure 29:
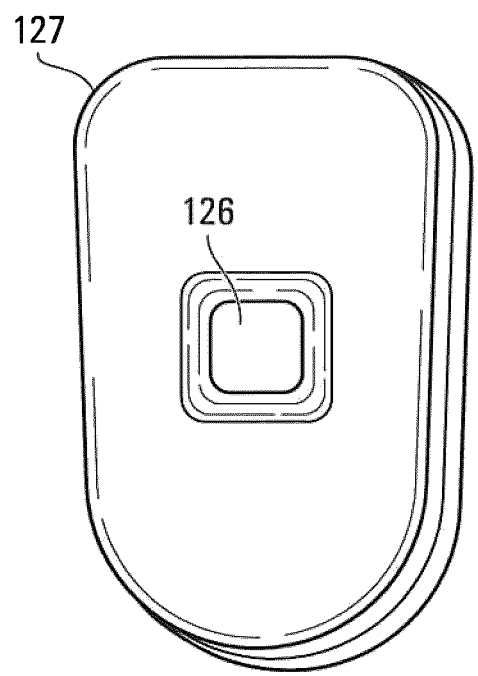
FIG. 29 shows an example of an embodiment in which a remote control comprises the control element of FIGS. 20 and 21.
Figure 30:
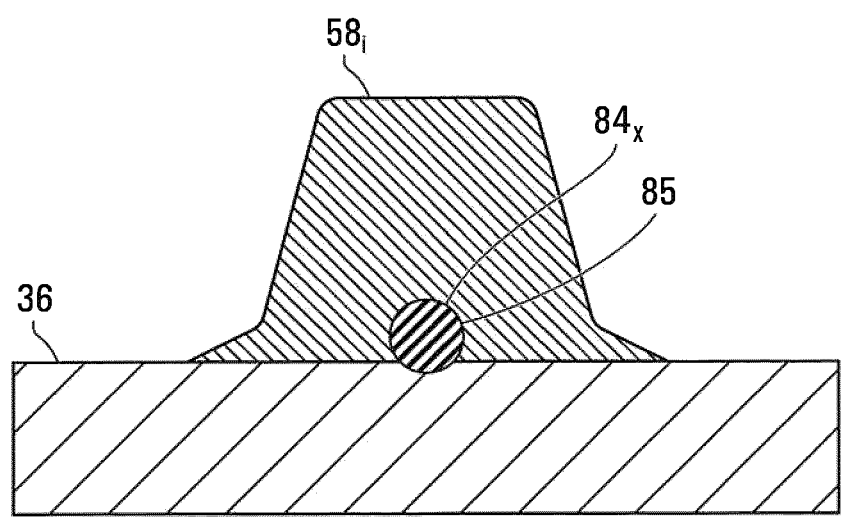
FIG. 30 shows a cross-sectional view of a given traction projection of the track in which the sensor is embedded.
Figure 31:
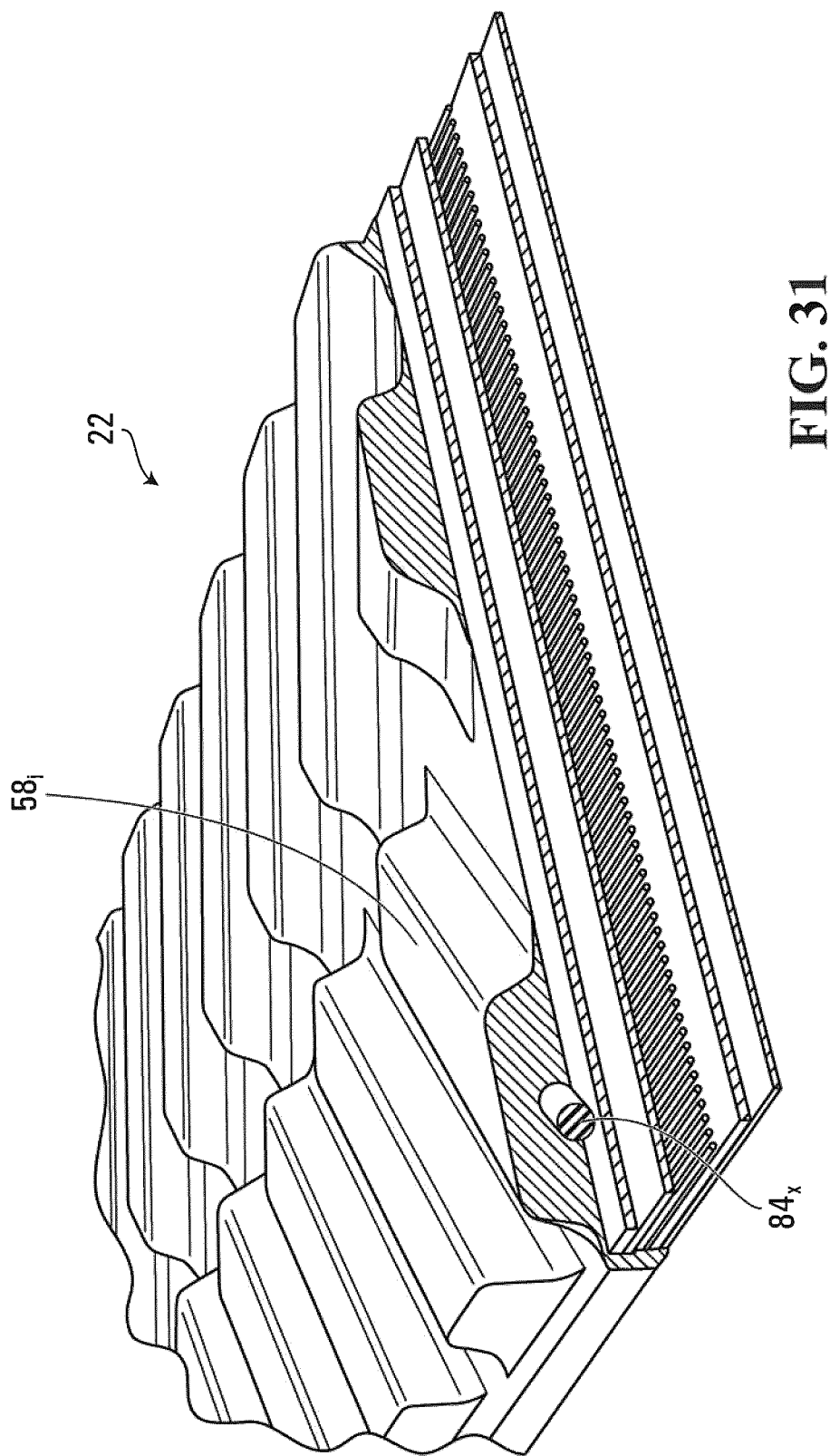
FIG. 31 shows a sectional view of the track including the sensor embedded in a given traction projection of the track.

To that end, the monitoring system 82 may comprise a control element 126 (e.g., a button, a switch, etc.) that is configured to send a command 128 to enable or disable control of the powertrain 15 of the agricultural vehicle 10 based on the output signal of the processing entity 88 in response to being acted upon by the user. For example, in some embodiments, as shown in FIG. 28, the control element 126 may be part of the user interface 70 of the agricultural vehicle 10 such as to be within reach of the operator when he/she is seated in the operator cabin 20. In other embodiments, the control element 126 may be located elsewhere (e.g., on a remote control). For example, as shown in FIG. 29, in some embodiments, the control element 126 may be located on a remote control 127. This may allow the user to remotely send the command 128 to enable or disable control of the powertrain 15 of the agricultural vehicle 10 based on the output signal of the processing entity 88. In such an embodiment, the command 128 is conveyed wirelessly over a wireless communication link. The wireless communication link may be established in any suitable way. For instance, the wireless communication link may be established via a transmitter/receiver arrangement, where the remote control 127 comprises a transmitter for sending the command 128 and where an element operable to receive the command 128 (e.g., the processing entity 88 or the powertrain 15) comprises the receiver.

Figure 20:
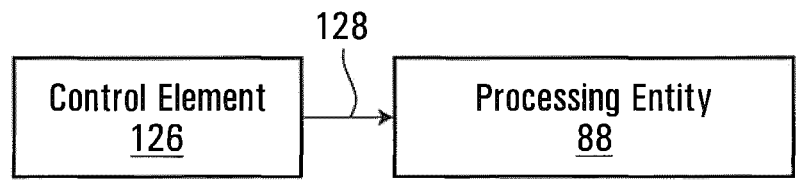
FIGS. 20 and 21 are flow diagrams of variants in which the tracked vehicle comprises a control element sending a command to the processing entity and to the powertrain controller respectively.
Figure 21:
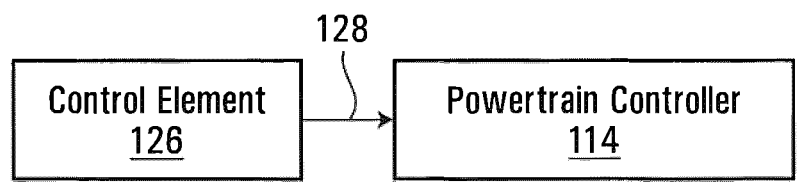

The command 128 generated by the control element 126 may be directed to different entities in different cases. For example, in some cases, as shown in FIG. 20, the command 128 may be transmitted to the processing entity 88. In such cases, the command 128 is configured to prevent the processing entity 88 from sending its output signal to the powertrain controller 114. In other cases, as shown in FIG. 21, the command 128 generated by the control element 126 may be transmitted to the powertrain controller 114. In such cases, the command 128 is configured to cause the powertrain controller 114 to ignore the output signal of the processing entity 88.

While in the embodiment considered above, the command 128 is generated by the control element 126 in response to the control element 126 being acted upon by the user, in some embodiments, a similar command to enable or disable control of the powertrain 15 of the agricultural vehicle 10 based on the output signal of the processing entity 88 may be generated automatically. As such, the monitoring system 82 may be subject to an "automatic override" function which overrides some or all the functions of the monitoring system 82.

For instance, in some embodiments, the powertrain controller 114 may be configured to ignore the output signal of the processing entity 88 when the output signal is deemed to be erroneous or otherwise flawed. That is, the powertrain controller 114 may be configured to determine when the output signal of the processing entity 88 is erroneous and to either accept or ignore the output signal of the processing entity 88 based on its determination on whether the output signal of the processing entity 88 is erroneous or not. More specifically, as an example of implementation, the powertrain controller 114 may store in its memory portion 120 a range of input values that are expected to be received in the output signal of the processing entity 88. Any input value that is outside of the expected range of input values can thus be deemed to be "erroneous". For example, if the output signal of the processing entity 88 contains the temperature recorded by the sensor $84_x$, but that this temperature is outside of a range of expected temperatures stored in the memory portion 120 of the powertrain controller 114, then the processing portion 118 of the powertrain controller 114 may compare the temperature communicated by the output signal to the range of expected temperatures, determine that it is outside of the range of expected temperatures, and choose to ignore the output signal of the processing entity 88 based on the determination that the temperature is outside of the range of expected temperatures. This may be useful for example to ignore faulty readings made by the temperature sensor $84_x$ which may be caused by various factors (e.g., damage to the sensor $84_x$, uncalibrated sensor $84_x$, faulty processing entity 88, or other anomaly).

Moreover, in some embodiments, the processing entity 88 itself may be configured to enable or disable sending of its output signal in order to enable or disable control of the powertrain 15 of the agricultural vehicle 10 based on the output signal. For example, in some embodiments, the processing entity 88 may be configured to determine when its output signal is erroneous and to either send or not send the output signal based on its determination on whether the output signal is erroneous or not. More specifically, as an example of implementation, the processing entity 88 may store in its memory portion 110 a range of input values that are expected to be found in the output signal. Any input value that is outside of the expected range of input values can thus be deemed to be "erroneous". For example, if the output signal of the processing entity 88 contains a given parameter (e.g., a speed of the agricultural vehicle 10) related to operation of the agricultural vehicle 10 that was derived by the processing portion 108 of the processing entity 88 based on the input signal from the temperature sensor $84_x$, the processing portion 108 may compare the given parameter to an expected range of values of the given parameter stored in the memory portion 110 of the processing entity 88. If the processing portion 108 determines that the value of the given parameter is outside of the expected range of values of the given parameter, the processing entity 88 may cancel sending its output signal to the powertrain controller 114 or other entity of the agricultural vehicle 10.

In other examples, the processing entity 88 may disable generating its output signal based on the input signal received from the temperature sensor $84_x$. For example, if the input signal received from the temperature sensor $84_x$ indicates a temperature that is outside of a range of expected temperatures stored in the memory portion 110 of the processing entity 88, the processing entity 88 may ignore the input signal received from the temperature sensor $84_x$ and disable generation of its output signal. In some cases, the processing entity 88 may still generate its output signal in order to communicate that there is a problem with the monitoring system 82 causing faulty readings.

Figure 22:
FIG. 22 shows an example of implementation in which the processing entity interacts with a communication device to convey information.

In other embodiments, with additional reference to FIG. 22, the output signal issued by the processing entity 88 may be directed to an output communication device 130 for communicating information regarding the operation of the agricultural vehicle 10 to a user, such as the operator of the agricultural vehicle 10.

The communication device 130 may be implemented in various ways in various embodiments.

Figure 23:
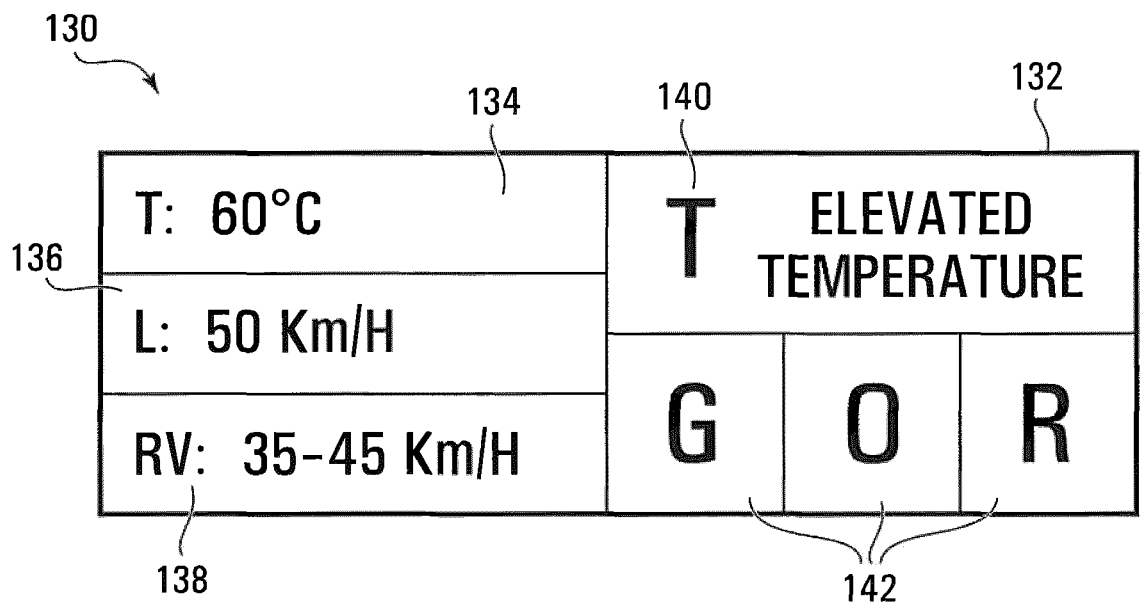
FIG. 23 shows an example of an embodiment in which the communication device comprises a display.

For example, with additional reference to FIG. 23, in some embodiments, the communication device 130 may be part of the user interface 70 of the operator cabin 20 in order to convey information to the operator. For instance, the communication device 130 may comprise a display 132 that is part of the user interface 70 of the operator cabin 20. The information regarding the operation of the agricultural vehicle 10 may thus be outputted as visual information on the display 132.

In some embodiments, the display 132 may comprise visual information that is continually provided. For instance, the display 132 may comprise a parameter reading 134 for indicating a physical quantity related to the operation of the agricultural vehicle 10. The parameter reading 134 is continually provided in that it is repeatedly updated to reflect a new parameter reading. In this example, the parameter reading 134 is a temperature reading 134 which indicates a temperature of the track 22. The temperature reading 134 may alternatively or additionally indicate a temperature of respective ones of the traction lugs $58_1$-$58_T$.

Moreover, in some embodiments, the display 132 may be operable to display a speed limit reading 136 comprising an indication of a limit of the speed of the agricultural vehicle 10. For example, the speed limit reading 136 may correspond to the speed at which the powertrain controller 114 may limit the agricultural vehicle 10 based on the temperature of the track 22 as described above. In addition, in some embodiments, the display 132 may be operable to display a recommended speed variation 138 corresponding to a speed of the agricultural vehicle 10 at which the agricultural vehicle 10 may be operated without elevating the temperature of the track 22 to levels that are detrimental to the track 22.

Furthermore, in some embodiments, the display 132 may be operable to display a notification 140 to notify the operator of information regarding the operation of the agricultural vehicle 10. For instance, in this embodiment, the notification 140 is configured to notify the operator when the temperature of the track 22 has reached or is reaching levels that are detrimental to the track 22. In some embodiments, the display 132 may also be operable to display textual information to inform the operator that the temperature of the track 22 is elevated. For example, the textual information may read drable to display textual information to inform the operator of information regarding the operation of the agricultural vehicle 122 or it may simply read "OK" to indicate that the temperature of the track 22 is at an acceptable level.

In some embodiments, the display 132 may also convey graphical information 142 for notifying the operator of the status of the temperature of the track 22. For instance, the graphical information 142 may include a color coded indicator with different colors attributed different meanings. For instance, the graphical information 142 may be capable of displaying a green color, an orange color and a red color, each of which is indicative of the temperature of the track 22. In this case, the green color indicates that the temperature of the track 22 is at an acceptable level, the orange color indicates that the temperature of the track 22 is reaching elevated levels and the red color indicates that the temperature of the track 22 has reached a level that is detrimental to the track 22.

Figure 24:
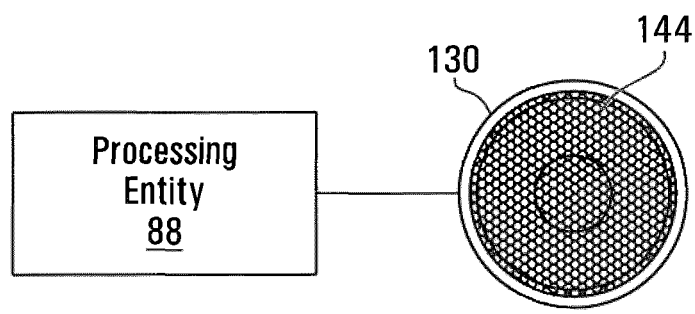
FIG. 24 shows an example of an embodiment in which the communication device comprises a speaker.

In addition or alternatively to providing visual information, in some embodiments, the communication device 130 may be operable to provide audible information to the operator of the agricultural vehicle 10. For instance, with additional reference to FIG. 24, in some embodiments, the communication device 130 may comprise a speaker 144 for emitting sound (e.g., an alarm, an utterance, etc.) indicative of information regarding the operation of the agricultural vehicle 10. For example, the speaker 144 may sound an alarm indicative of the temperature of the track 22 is elevated to levels that are detrimental to the track 22.

Figure 36:
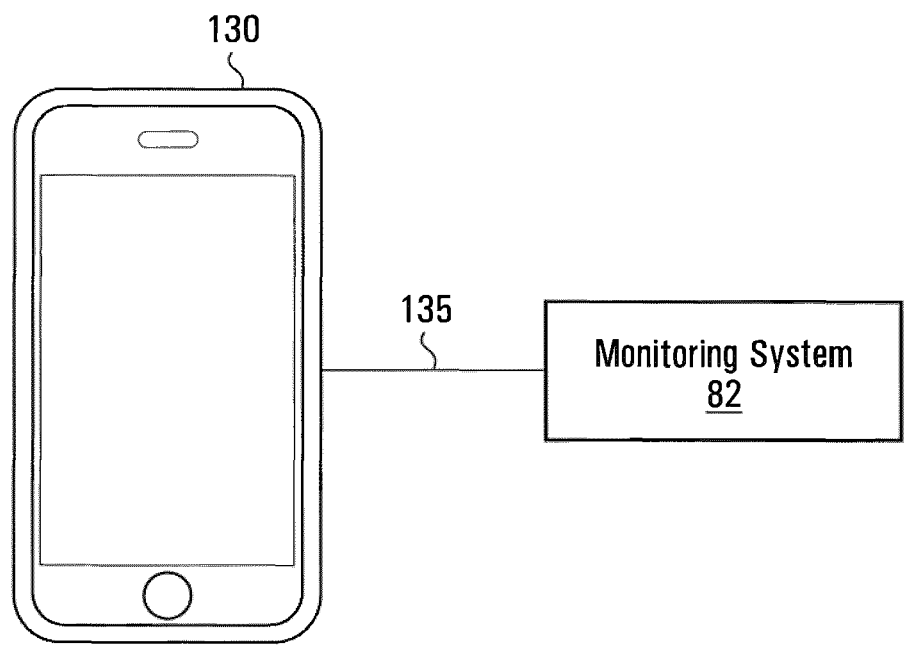
FIG. 36 shows an embodiment in which the communication device is a personal communication device.

As another example, in some embodiments, as shown in FIG. 36, the communication device 130 may be a personal communication device (e.g., a smartphone, a computer, etc.) or other device that is usable by a user (e.g., the operator) and distinct from and not built into the user interface 70 of the operator cabin 20 of the vehicle 10. This may be useful, for instance, in situations where the vehicle 10 was not originally manufactured with the track system $16_i$ and/or is not readily modifiable to allow interaction between the monitoring system 82 and the user interface 70 and/or other original components of the vehicle 10.

The communication device 130 may interact with the monitoring system 82 over a communication link 135, which may be wireless, wired, or partly wireless and partly wired (e.g., Bluetooth or other short-range or near-field wireless connection, WiFi or other wireless LAN, WiMAX or other wireless WAN, cellular, Universal Serial Bus (USB), etc.). For example, in some embodiments, the communication device 130 may be:

a smartphone or other wireless phone; a tablet computer; a head-mounted display, smartwatch or other wearable device; or any other communication device carried, worn or otherwise associated with the user (e.g., the operator);

a server or other computing entity (e.g., implementing a website) associated with: the user (e.g., the operator); an organization associated with the user (e.g., the operator); a manufacturer of the track 22, the track system 16$_i$, and/or of the vehicle 10; a retailer, distributor, or other vendor of the track 22, the track system 16$_i$, and/or of the vehicle 10; or any other party who may have an interest in the track 22, the track system 16$_i$, and/or of the vehicle 10;

etc.

In some cases, such as where the communication device 130 is a smartphone, tablet, head-mounted display, smartwatch, or other communication device carried or worn by the user (e.g., the operator), communication between the communication device 130 and the monitoring system 82 may be direct, i.e., without any intermediate device. For instance, in some embodiments, this can be achieved by pairing (e.g., Bluetooth pairing) the communication device 130 and the monitoring system 82.

In other cases, such as where the communication device 130 is remote from the monitoring system 82, communication between the communication device 130 and the monitoring system 82 may be indirect, e.g., through one or more networks and/or one or more additional communication devices. For example, in some embodiments, the monitoring system 82 may communicate (e.g., via the transmitter 112 and/or the receiver 104 of the processing entity 88 or the transmitter 90 and/or the receiver 92 of the sensor 84$_x$) with a WiFi hotspot or cellular base station, which may provide access to a service provider and ultimately the Internet or another network, thereby allowing the monitoring system 82 and the communication device 130 to communicate. As another example, in some embodiments, communication between the communication device 130 and the monitoring system 82 may take place through a smartphone, tablet, head-mounted display, smartwatch, or other communication device which is carried or worn by the user of the communication device 130 and which itself may have established communication with a WiFi hotspot or cellular base station.

For example: in some embodiments, the communication device 130 may be a smartphone or other mobile phone, a tablet, a smart watch, head-mounted display or other wearable device, or any other communication device that may be carried by the user, and the communication link 135 may be a short-range wireless link (e.g., Bluetooth) or a wired link (e.g., USB); in other embodiments, the communication device 130 may be a server or other computing entity or a smartphone or other mobile phone, a tablet, a smart watch, head-mounted display or other wearable device, or any other communication device that may be carried by the user and the communication link 135 may be implemented by a data network such as the Internet over a wired connection and/or a wireless connection (e.g., WiFi, WiMAX, cellular, etc.); and, in other embodiments, the communication device 130 may be a server or other computing entity and the communication link 135 may be implemented over a wireless connection using, for instance, dedicated short-range communication (DSRC), IEEE 802.11, Bluetooth and CALM (Communications Access for Land Mobiles), RFID, etc.

In some embodiments, an application ("app", i.e., software) may be installed on the communication device 130 to interact with the monitoring system 82 of the vehicle 10. For example, in some embodiments, such as where the communication device 130 is a smartphone, a tablet, a computer, etc., the user (e.g., the operator) may download the app from a repository (e.g., Apple's App Store, iTunes, Google Play, Android Market, etc.) or any other website onto the communication device 130. Upon activation of the app on the communication device 130, the user may access certain features relating to the monitoring system 82 of the vehicle 10 locally on the communication device 130. In addition, a data connection can be established over the Internet with a server of which executes a complementary server-side application interacting with the app on the communication device 130.

For example, in some embodiments, the communication device 130 may be a smartphone of the operator of the vehicle 10, onto which an app to interact with the monitoring system 82 of the vehicle 10 has been installed (e.g., downloaded).

Describe examples of what can be done here in that case, based on what was described earlier for the communication device that is part of the user interface of the vehicle (e.g., info/notification, visual, audible, etc.)

Figure 37:
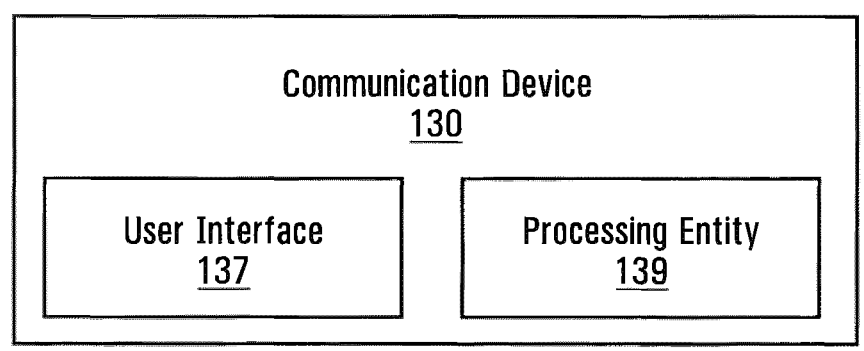
FIG. 37 shows an example of the communication device of FIG. 36.
Figure 38:
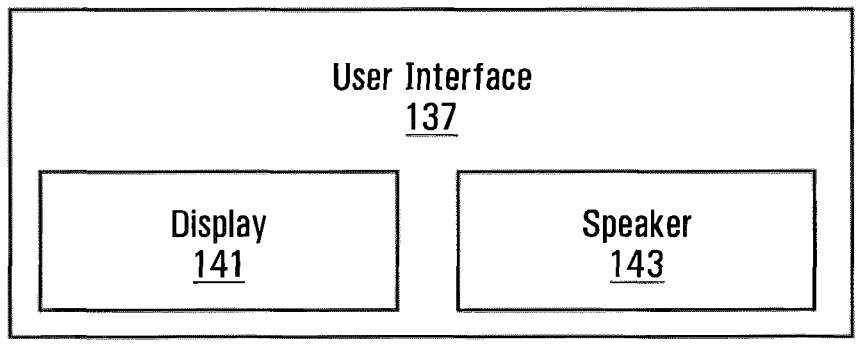
FIG. 38 shows an example of a user interface of the communication device of FIG. 36.
Figure 39:
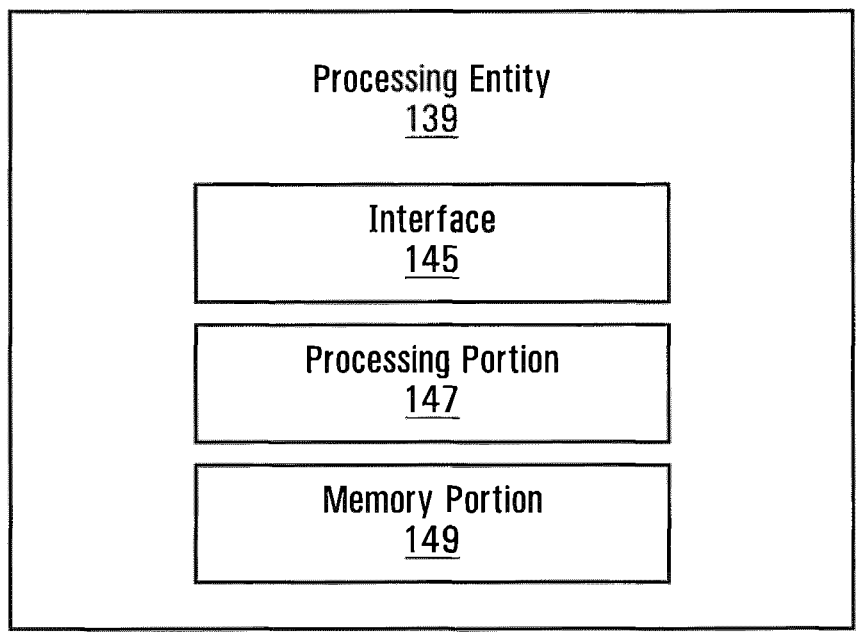
FIG. 39 shows an example of a processing entity of the communication device of FIG. 36.

In various embodiments, as shown in FIGS. 37 to 39, the communication device 130 (e.g., whether part of the user interface 70 of the operator cabin 20, or a personal communication device such as a smartphone, tablet, computer, etc.) may comprise a user interface 137 and a processing entity 139. The user interface 137 may comprise a display 141, a speaker 143, and/or any other output device, such as the display 132 of the operator cabin 20, a display of a smartphone, etc. The processing entity 139 comprises an interface 145, a processing portion 147, and a memory portion 149, which are implemented by suitable hardware and/or software.

The interface 145 comprises one or more inputs and outputs allowing the processing entity 139 to receive input signals from and send output signals to other components to which the processing entity 139 is connected (i.e., directly or indirectly connected). For example, in this embodiment, an input of the interface 145 is implemented by a wireless receiver to receive a signal from the monitoring system 82. An output of the interface 145 is implemented by a transmitter.

The processing portion 147 comprises one or more processors for performing processing operations that implement functionality of the processing entity 139. A processor of the processing portion 147 may be a general-purpose processor executing program code stored in the memory portion 149. Alternatively, a processor of the processing portion 147 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 149 comprises one or more memories for storing program code executed by the processing portion 147 and/or data used during operation of the processing portion 147. A memory of the memory portion 149 may be a semiconductor medium (including, e.g., a solid-state memory), a magnetic storage medium, an optical storage medium, and/or any other suitable type of memory. A memory of the memory portion 149 may be read-only memory (ROM) and/or random-access memory (RAM), for example.

In some embodiments, two or more elements of the processing entity 139 may be implemented by devices that are physically distinct from one another and may be connected to one another via a bus (e.g., one or more electrical conductors or any other suitable bus) or via a communication link which may be wired. In other embodiments, two or more elements of the processing entity 139 may be implemented by a single integrated device.

The processing entity 139 may be implemented in any other suitable way in other embodiments.

Although the output signal issued by the processing entity 88 was described in embodiments considered above as being directed to the powertrain 15 of the agricultural vehicle 10 or the communication device 130, in some embodiments, both of these actions can be performed by the processing entity 88. That is, an output signal may be issued by the processing entity 88 and directed to the powertrain 15 of the agricultural vehicle 10 to control the powertrain 15 of the vehicle 10 and another output signal may be issued by the processing entity 88 and directed to the communication device 130 for communicating information regarding the operation of the vehicle 10 to a user such as the operator of the vehicle 10.

Figure 32A:
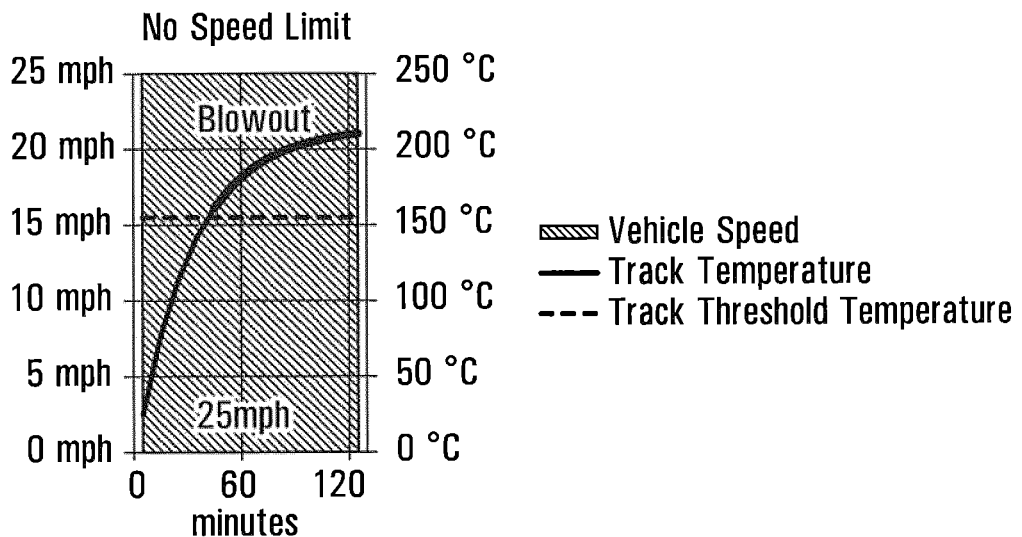
FIGS. 32A, 32B and 32C respectively show a graph representing an example of a temperature of a track as a function of a speed of the vehicle when 1) the vehicle is driven at full speed; 2) the vehicle is driven at a constant speed to in accordance with a load carried by the vehicle; and 3) the vehicle is driven using the track and the monitoring system.
Figure 32B:
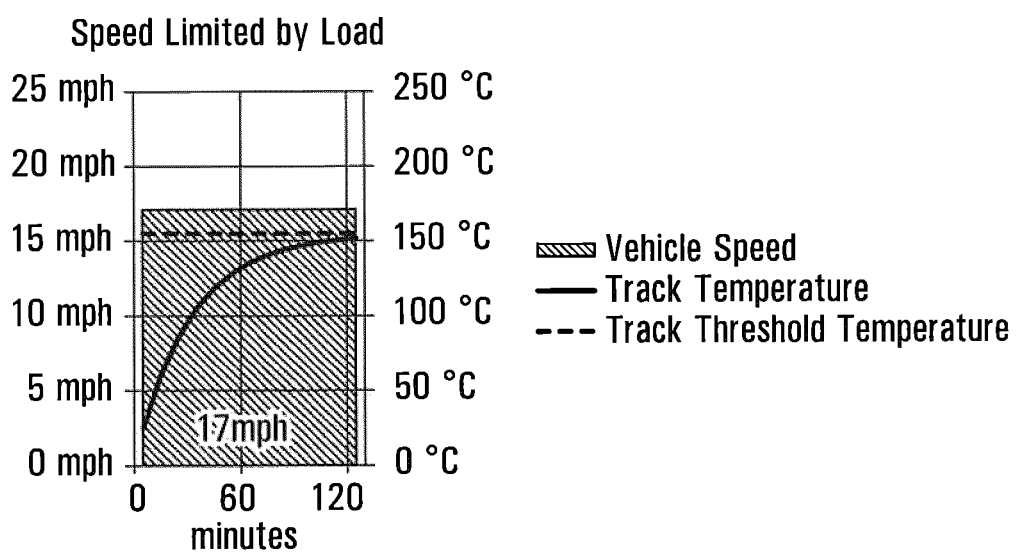
Figure 32C:
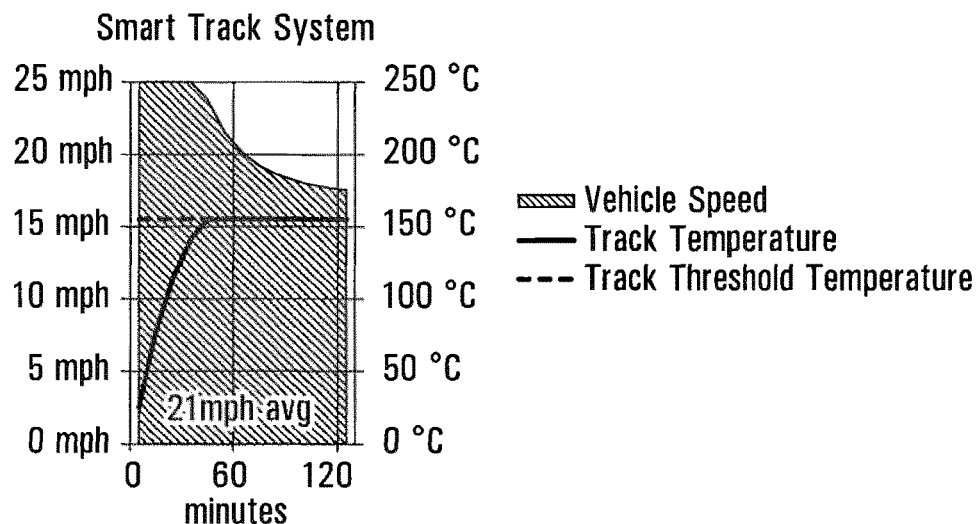

FIGS. 32A to 32C are graphs representing different examples of operation of an agricultural vehicle roading for two hours with a 45,000 lbs load. For instance, FIG. 32A shows an example where the agricultural vehicle is driven at full speed (e.g., 25 mph or 40 km/h) with disregard for a threshold temperature of a track of the vehicle. As shown, in such a case, the threshold temperature of the track is exceeded before even one hour of travel. This can result in blowout of traction projections of the track or other damage and/or deterioration of the track.

FIG. 32B shows an example where the agricultural vehicle is driven more conservatively by managing the speed of the agricultural in accordance to the load of the vehicle. More specifically, in this example, the speed of the agricultural vehicle is maintained at 17 mph (i.e., 27 km/h) such that the temperature of the track does not exceed its threshold temperature. As shown, in such a case, contrary to the example of FIG. 32A, damage and/or deterioration of the track is avoided. However, the average speed of the agricultural vehicle (i.e., 17 mph) is relatively low.

FIG. 32C shows an example where the speed of the agricultural vehicle 10 is managed by the monitoring system 82 as described above. As shown, in this case, the speed of the agricultural vehicle 10 is controlled to have an average of 21 mph (i.e., 34 km/h) while preventing the temperature of the track 22 from exceeding its threshold temperature. Thus, in this case, contrary to the example of FIG. 32A, damage and/or deterioration of the track 22 is avoided. Moreover, the average speed of the agricultural vehicle 10 is increased relative to the example of FIG. 32B.

Figure 33A:
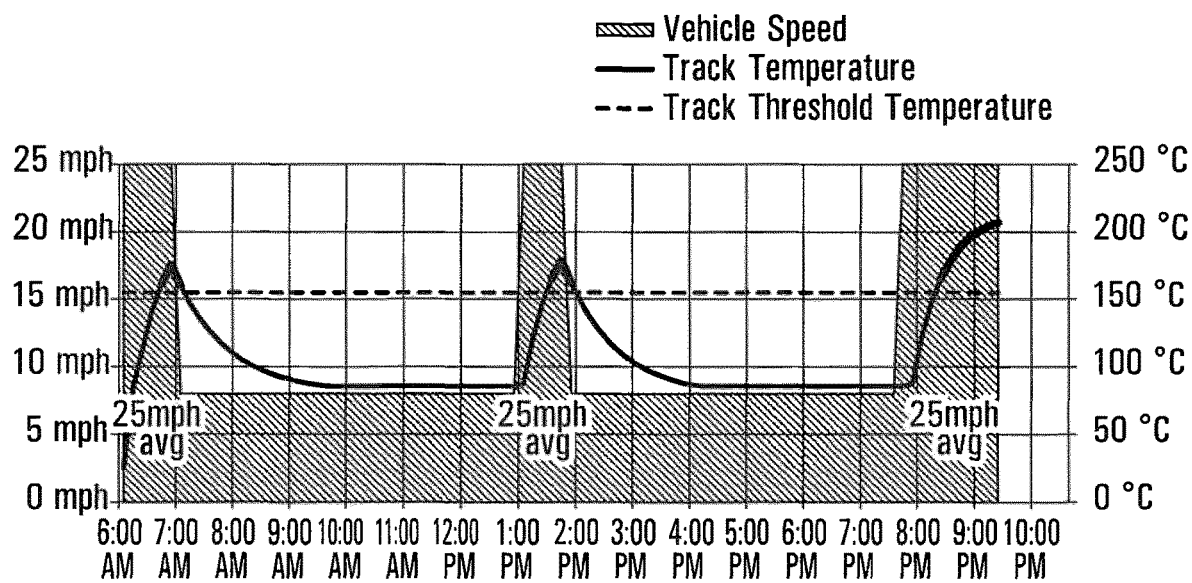
FIGS. 33A, 33B and 33C respectively show a graph representing an example of a temperature of a track as a function of a speed of the vehicle in an example of a work day when 1) the vehicle is driven at full speed; 2) the vehicle is driven at a constant speed in accordance to the load carried by the vehicle; and 3) the vehicle is driven using the track and the monitoring system.
Figure 33B:
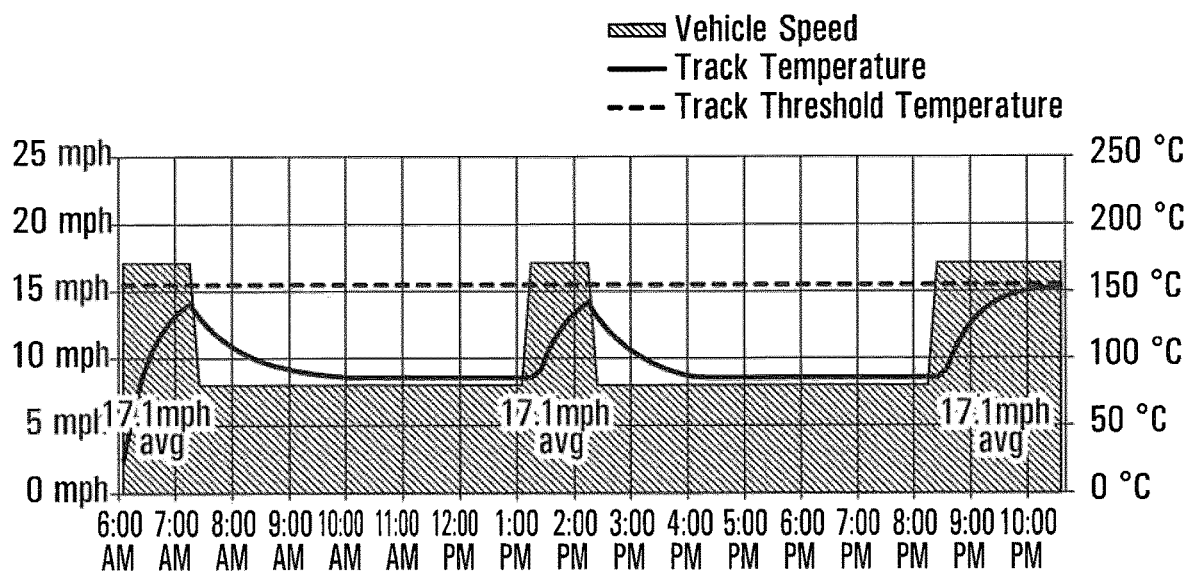
Figure 33C:
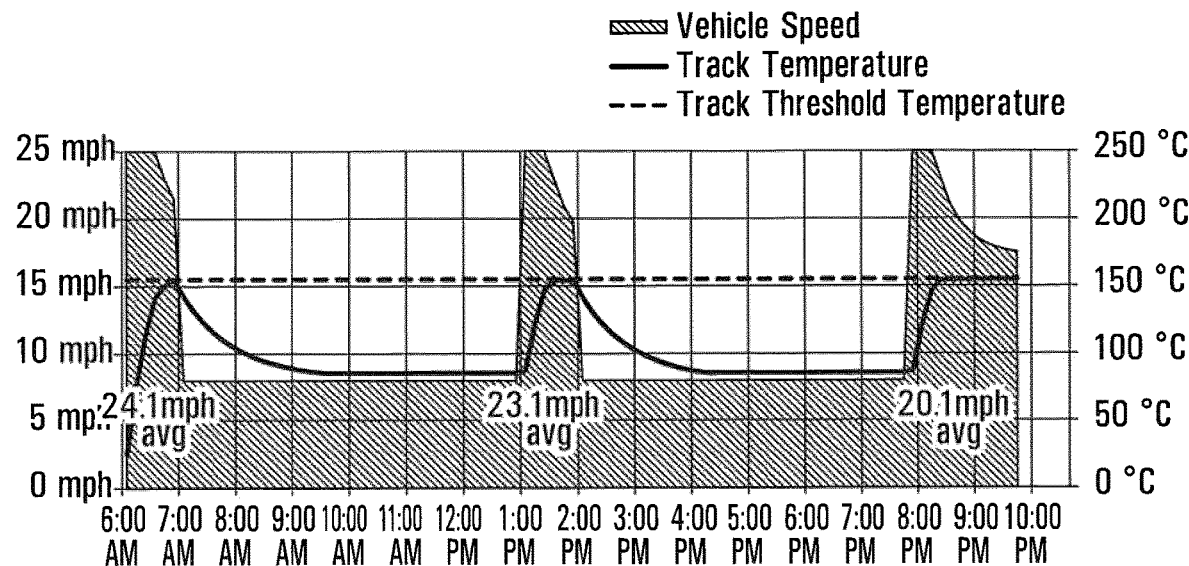

FIGS. 33A to 33C are graphs representing different examples of operation of an agricultural vehicle carrying a 45,000 lbs load in the context of a work day. More particularly, in this example, the agricultural vehicle departs from a farm at 6:00 AM and roads for 20 miles to a first field where it plants 250 acres. The agricultural vehicle then roads another 20 miles to a second field where it plants another 250 acres. Finally, the agricultural vehicle roads 40 miles back to the farm from which it departed originally.

In the example of FIG. 33A, the agricultural vehicle is driven at full speed when roading with disregard for the threshold temperature of the track of the vehicle. The agricultural vehicle slows down to approximately 8 mph (i.e., 13 km/h) when planting the field. As shown, the threshold temperature of the track is exceeded when the agricultural vehicle is roading but the track cools down when the agricultural vehicle is planting. However, when roading for 40 miles back to the farm, the temperature of the track exceeds its threshold temperature significantly. In such a case, the agricultural vehicle arrives at the farm at around 9:15 PM. However, the tracks of the agricultural vehicle may show signs of bulging and would likely require replacement after the planting season. Moreover, the agricultural vehicle would have to decrease its speed for the next few days to prevent further damage and/or deterioration of the track.

In the example of FIG. 33B, the speed agricultural vehicle while roading is managed in accordance to the load carried by the agricultural vehicle. More particularly, in this example, the speed of the agricultural vehicle is maintained at an average of 17.1 mph when roading. As shown, this results in the temperature of the track not exceeding its threshold temperature. In such a case, damage and/or deterioration of the track is avoided. However, the agricultural vehicle arrives at the farm at around 10:40 PM.

In the example of FIG. 33C, shows an example where the speed of the agricultural vehicle 10 is managed by the monitoring system 82 as described above. In this example, the speed of the agricultural vehicle 10 is maximized while the track 22 is cooler and reduced and/or limited to prevent the temperature of the track 22 from exceeding its threshold temperature. In such a case, the agricultural vehicle 10 arrives at the farm around 9:40 PM. Thus, contrary to the example of FIG. 33A, damage and/or deterioration of the track 22 is avoided. Moreover, the work day of the operator of the agricultural vehicle 10 ends one hour earlier than in the example of FIG. 33B, thus saving non-productive time of the agricultural vehicle 10 (i.e., time spent travelling).

Although in the example of FIG. 33C, the agricultural vehicle 10 carries a 45,000 lbs load, the load may be greater in other examples. As will be appreciated, a greater load generally translates to more heat generation in the track 22. Consequently, if a constant speed of the vehicle were chosen in accordance to the load carried by the vehicle (as in the examples of FIGS. 32B and 33B), a greater load would translate to an even lower constant speed of the vehicle. Thus, a greater load carried by the agricultural vehicle 10 translates to additional time saved by managing the speed of the agricultural vehicle 10 via the monitoring system 82 as described above.

The monitoring system 82 may be implemented in any other suitable way in other embodiments.

Figure 25:
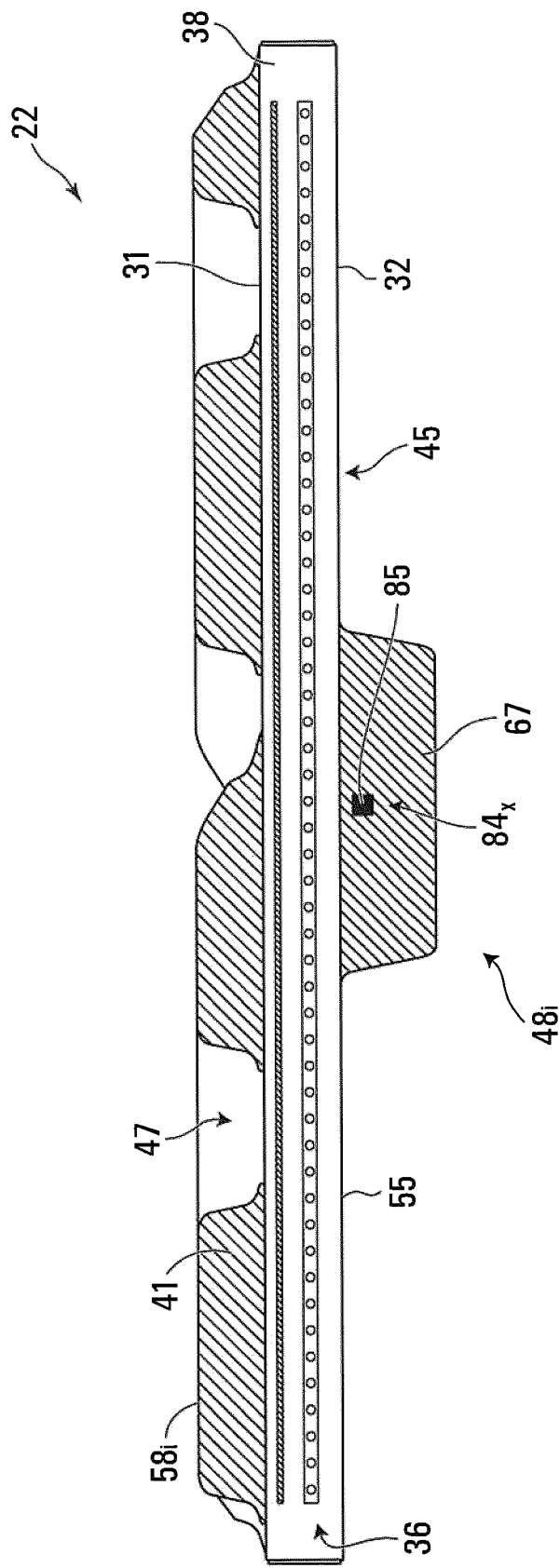
FIG. 25 shows an example of an embodiment in which the sensors are incorporated in drive/guide lugs of the track.

For example, in other embodiments, in addition to or instead of being disposed within the elastomeric material 41 of one or more of the traction lugs $58_1$-$58_T$, the temperature sensor $84_x$ may be disposed elsewhere on the track 22. For instance, in some embodiments, as shown in FIG. 25, the temperature sensor $84_x$ may be disposed in the elastomeric material 67 or one or more of the drive/guide lugs $48_1$-$48_N$. This may be useful to prevent rapid wear or other deterioration (e.g., blowout) of one or more of the drive/guide lugs $48_1$-$48_N$. In such embodiments, the sensor $84_x$ may be disposed near the inner surface 32 of the carcass 36 as this may be a region of the drive/guide lugs $48_1$-$48_N$ that is expected to be hottest in use (i.e., having a most elevated temperature).

Figure 26:
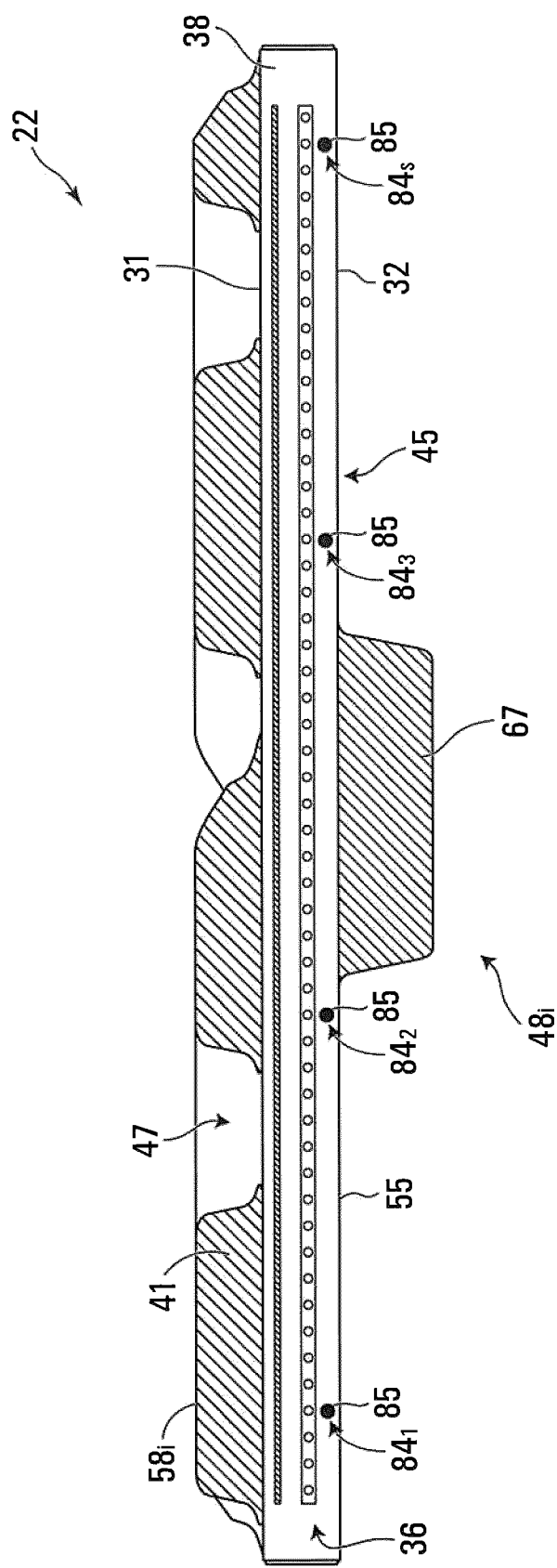
FIG. 26 shows an example of an embodiment in which the sensors are incorporated in a carcass of the track.

In other embodiments, as shown in FIGS. 11B and 26, the temperature sensor $84_x$ may be disposed in the elastomeric material 38 of the carcass 36. This may be useful to shield the sensing device 85 from the elevated heat that is generated at the traction lugs $58_1$-$58_T$ and/or to prevent or otherwise minimize a risk of delamination of the traction lugs $58_1$-$58_T$ at an interface between the traction lugs $58_1$-$58_T$ and the carcass 36. Moreover, as shown in FIG. 11B, in some embodiments, when the temperature sensor $84_x$ is disposed in the elastomeric material 38 of the carcass 36, the sensing device 85 of the temperature sensor 84$_x$ may be located closer to the ground-engaging outer surface 31 of the carcass 36 than to the inner surface 32 of the carcass 36. In such embodiments, the thickness of the elastomeric material 38 of the carcass 36 between the sensing device 85 and the ground-engaging outer surface 32 of the carcass 36 may be relatively small. For instance, in some cases, a ratio of the distance between the sensing device 85 and the ground-engaging outer surface 32 of the carcass 36 over the thickness $T_C$ of the carcass 36 may be no more than 0.3, in some cases no more than 0.2, in some cases no more than 0.1, and in some cases even less.

In other embodiments, the temperature sensor 84$_x$ may be external to the track 22 and in some cases external to the track system 16$_i$. For example, in some embodiments, the temperature sensor 84$_x$ may be an infrared sensor configured to measure infrared light radiating from the track 22 in order to sense the temperature of the track 22. For instance, in some examples of implementation, the infrared sensor 84$_x$ may be installed on the track-engaging assembly 21 or on the frame 12 or another part of the agricultural vehicle 10 adjacent to the track system 16$_i$ such that it is able to measure the infrared light, and thus heat energy, emitted by the track 22.

In other embodiments, instead of the temperature of the track 22, the temperature of the track system 16$_i$ sensed by the temperature sensor 84$_x$ may be a temperature of another component of the track system 16$_i$. For instance, in some embodiments, the temperature sensor 84$_x$ may be disposed to sense a temperature of a given one of the roller wheels 28$_1$-28$_6$. For example, the temperature sensor 84$_x$ may be embedded in a covering (e.g., an elastomeric covering) of a roller wheel 28$_i$ that contacts the inner side 45 of the track 22. This may be useful in cases where the covering of the roller wheels 28$_1$-28$_6$ wears out more rapidly at certain temperatures. In other embodiments, the temperature sensor 84$_x$ may be disposed in the drive wheel 24 (e.g., in the drive members 52$_1$-52$_B$) to sense a temperature of the drive wheel 24. This may be useful to detect elevated temperature levels at the drive wheel 24 in embodiments where the drive wheel 24 frictionally engages the track 22.

In some embodiments, the track system 16$_i$ may comprise a plurality of temperature sensors such as the temperature sensor 84$_x$ to sense the temperature of different components of the track system 16$_i$. For example, in some embodiments, while the track 22 may have an associated temperature sensor 84$_x$ implemented as described above, one or more of the roller wheels 28$_1$-28$_6$ may also have an associated temperature sensor 84$_r$ (e.g., embedded in its elastomeric covering). In such embodiments, the processing entity 88 may receive a sensor signal from each temperature sensor 84$_i$ of the track system 16$_i$ and determine a corresponding output signal related to the operation of the agricultural vehicle 10 based on the sensor signals from the temperature sensors 84$_1$-84$_S$ and possibly other input and/or information. The processing entity 88 may be operable to identify a source of the sensor signal based on an identifier associated with each temperature sensor 84$_x$ (e.g., a manufacturer's identification number) such that the processing entity 88 is aware from which temperature sensor 84$_x$ a sensor signal is being received.

In such embodiments, the output signal of the processing entity 88 may be determined in various ways. For instance, in some cases, the output signal may be determined by the processing entity 88 based on a temperature of a component of the track system 16$_i$ that is closest to its corresponding threshold temperature. For example, if a difference between the temperature of the track 22 and the threshold temperature of the track 22 is smaller than a difference between the temperature of the roller wheel 28$_i$ and the threshold temperature of the roller wheel 28$_i$ (i.e., if the track 22 is closer to its corresponding threshold temperature than the roller wheel 28$_i$), then the processing entity 88 may determine its output signal based solely on the temperature of the track 22. The output signal may then be directed to the powertrain 15 of the agricultural vehicle 10 to control the operation of the agricultural vehicle 10 based on the temperature of the track 22 and/or it may be directed to an output device for outputting information to the operator of the agricultural vehicle 10. As described above, the output signal issued by the processing entity 88 may be directed to the powertrain 15 to control the speed of the agricultural vehicle 10 (e.g., via the powertrain controller 114).

In other cases, the output signal may be determined by the processing entity 88 based on the temperature of each component of the track system 16$_i$ whose temperature is sensed by a temperature sensor 84$_x$. For example, this may be the case when the output signal is directed to the communication device 130. In such a case, the temperature of each component of the track system 16$_i$ whose temperature is sensed by a temperature sensor 84$_x$ may be outputted to the operator of the agricultural vehicle 10. This may allow the operator to adjust the speed of the agricultural vehicle 10 accordingly in order to avoid reaching or exceeding the threshold temperature of a given component of the track system 16$_i$.

Instead of being configured to sense temperature, in other embodiments, the sensor 84$_x$ may be any other suitable type of sensor to sense another physical characteristic of the track system 16$_i$.

For example, in some embodiments, the sensor 84$_x$ may be a pressure sensor (e.g., a pressure transducer) to sense a pressure within the track 22, such as within one or more of the traction lugs 58$_1$-58$_T$.

As another example, the sensor 84$_x$ may be a strain sensor to sense a strain within the track 22, such as within one or more of the traction lugs 58$_1$-58$_T$.

As another example, the sensor 84$_x$ may be a position sensor to sense a position (e.g., a geo-location) of the track 22 or track system 16$_i$. For example, the position sensor may be part of a global positioning system (GPS).

As another example, the sensor 84$_x$ may be an accelerometer for sensing an acceleration of the track 22.

As yet another example, the sensor 84$_x$ may be a tread wear sensor for sensing the height H of the traction lugs 58$_1$-58$_T$. Such tread wear sensors are known and thus will not described further here.

In some embodiments, the monitoring system 82 may comprise sensors of various types. For instance, the sensors 84$_1$-84$_S$ of the monitoring system 82 may include various types of sensors including those mentioned above (e.g., pressure sensors, strain sensors, position sensors, etc.).

The monitoring system 82 may be configured to provide other information and/or inputs depending on the types of sensors that are used in the track system 16$_i$.

For instance, in embodiments where the sensor 84$_x$ is a pressure sensor, the monitoring system 82 may be configured to determine characteristics related to the ground on which the track system 16$_i$ travels (e.g., a compactness of the ground). More specifically, the pressure sensor 84$_x$ of the monitoring system 82 may send as an input signal to the processing entity 88 the pressure recorded by the pressure sensor 84$_x$ as the track system 16$_i$ travels on the ground. This may allow the processing entity 88 to calculate a trend of the pressure experienced at the pressure sensor $84_x$ as the track 22 is driven by the track-engaging assembly 21 of the track system $16_i$. As a peak pressure is expected to be recorded when the pressure sensor $84_x$ is disposed between any of the drive wheel 24, the front idler wheel 26 and the roller wheels $28_1$-$28_6$ and the ground, the pressure recorded at these points can be determinative of characteristics related to the ground on which the track system $16_i$ travels. For example, when the peak pressure is recorded as being particularly elevated, the processing entity 88 of the monitoring system 82 may determine that the ground is hard (e.g., a compact soil, a paved road), whereas when the pressure is recorded as being particularly low, the processing entity 88 of the monitoring system 82 may determine that the ground is soft (e.g., loose soil). For instance, the memory portion 110 of the processing entity 88 may store a range of values of pressures that can be expected to be recorded and an associated characteristic of the ground (e.g., hard, soft, etc.). In such embodiments, the output signal of the processing entity 88 may thus be received by the powertrain 15, the powertrain controller 114 or the communication device 130 and used to control the operation of the agricultural vehicle 10 based on the recorded pressure and/or outputting information regarding the operation of the agricultural vehicle 10 to the operator of the agricultural vehicle 10.

Moreover, in some embodiments where the sensor $84_x$ is a pressure sensor, the monitoring system 82 may be configured to determine a load distribution of the vehicle 10 and, optionally, propose an improved load distribution of the vehicle 10. For instance, in some embodiments, based on the pressure values recorded by the pressure sensor $84_x$, the processing entity 88 of the monitoring system 82 may be configured to determine a load distribution on the track system $16_i$. For example, if the pressure readings from the pressure sensor $84_x$ indicate a significantly higher pressure when the pressure sensor $84_x$ records the pressure at a front portion of the track system $16_i$ (e.g., when the pressure sensor $84_x$ is disposed between the front idler wheel 26 and the ground) than when the pressure sensor $84_x$ records the pressure at a rear portion of the track system $16_i$ (e.g., when the pressure sensor $84_x$ is disposed between the drive wheel 24 and the ground), then the processing entity 88 may determine that the track system $16_i$ is unevenly loaded. The pressure difference may be considered significant for example if the difference is greater than a certain percentage (e.g., 10%, 20%, 30%, 40%, etc.). In such embodiments, the output signal of the processing entity 88 may signal to the powertrain 15, to the powertrain controller 114 or to the communication device 130 that the track system $16_i$ is unevenly loaded. Moreover, in some embodiments, the processing entity 88 may be configured to derive an improved load distribution of the vehicle 10. For instance, in some embodiments, based at least in part on its determination of whether or not the track system $16_i$ is unevenly loaded, the processing entity 88 may derive a load distribution adjustment that can be implemented to the vehicle 10 and/or track system $16_i$ to correct or otherwise minimize the unevenly loaded condition of the track system $16_i$. In some cases, the processing entity 88 may derive the load distribution adjustment based in part on additional inputs such as the type of vehicle 10 and/or its use. For example, the processing entity 88 may derive a weight that can be applied at a front or rear of the vehicle 10 and/or track system $16_i$ to improve the load distribution of the track system $16_i$. This derived information may be contained in the output signal of the processing entity 88 to the communication device 130 or other entity of the vehicle 10. For example, the display 132 of the communication device 130 may display this information for the user to consider implementing the load distribution adjustment suggested by the processing entity 88. As a specific example of implementation, the information displayed by the display 132 of the communication device 130 may suggest adding or removing a certain amount of weight forwardly or rearwardly of a given point of the track system $16_i$ (e.g., forwardly or rearwardly of a midpoint of the length of the track system $16_i$).

In some embodiments, based on the determination of whether the track system $16_i$ is unevenly loaded, the monitoring system 82 may be configured to issue a notification to the user of the vehicle 10. For instance, the notification 140 displayed on the display 132 may relate to a loading condition of the track system $16_i$ such as to make the user of the vehicle 10 aware of the loading condition of the track system $16_i$. For example, the notification 140 may convey that the track system $16_i$ and/or vehicle 10 is overly loaded (e.g., a load carried by the vehicle 10 is too big), unevenly loaded, or that the load distribution of the track system $16_i$ and/or vehicle 10 is adequate.

Furthermore, in some embodiments, the plurality of sensors $84_1$-$84_S$ of the monitoring system 82 may include different types of sensors (e.g., temperature sensors, pressure sensors, strain sensors, etc.) such that the processing entity 88 of the monitoring system 82 is actionable on more than one type of parameter regarding the track 22 or other component of the track system $16_i$ (e.g., the roller wheels $28_1$-$28_6$). Using more than one variety of sensor may allow the monitoring system 82 to detect situations that may be more difficult to detect with a single type of sensor (e.g., solely temperature sensors). For instance, in some embodiments, the plurality of sensors $84_1$-$84_S$ may include at least one pressure sensor and at least one temperature sensor. In one example of implementation, the pressure recorded by the pressure sensor $84_x$ in combination with the temperature recorded by the temperature sensor $84_x$ may allow the processing entity 88 of the monitoring system 82 to determine that the track 22 is misaligned. For example, the pressure sensor $84_x$ and the temperature sensor $84_x$ may be positioned in a drive/guide lug $48_i$ and thus the input signals from the pressure sensor $84_x$ and the temperature sensor $84_x$ convey to the processing entity $84x$ the pressure and the temperature recorded at the drive/guide lug $48_i$. If the recorded pressure and temperature are higher than a threshold value of each of the pressure and temperature, then the processing entity 88 may determine that the track 22 is misaligned. Similarly, the pressure and temperature sensors may be provided in the roller wheels $28_1$-$28_6$ to determine if the track 22 is misaligned. Thus the notification 140 issued to the user may relate to the alignment of the track 22.

In other embodiments, the sensor $84_x$ and the processing entity 88 may be connected by a wire (e.g., the sensor $84_x$ and the processing entity 88 may be separate devices connected by a cable or other wire or may be components of a common device connected by a wire within the common device).

In some embodiments, the sensor $84_x$ and the processing entity 88 may be integrated together into the track 22. As such, in these embodiments, the track 22 can communicate directly with the powertrain 15 or user interface of the agricultural vehicle 10 and/or with the communication device 130.

Although in embodiments considered above the monitoring system 82 is used to monitor the track system $16_i$ during the operation of the vehicle 10, in other embodiments, the monitoring system 82 may be used for monitoring the track system $16_i$ or a component thereof such as the track 22 outside of the operation of the vehicle 10.

For instance, in some embodiments, the monitoring system 82 may be used to assess a use of the track system $16_i$. That is, the monitoring system 82 may be configured to assess parameters that relate to a usage of the track system $16_i$. This may be useful to obtain general information regarding the use of the track system $16_i$ such as, for example, a level of usage of the track system $16_i$ (i.e., its progress in its overall life cycle) and/or conditions under which the track system $16_i$ has been used.

In accordance with an example of implementation, the monitoring system 82 may assess an amount of time (e.g., hours) in which the track system $16_i$ has been in use. For instance, information provided by the sensor $84_x$ may be used to gauge when the track 22 is in driving contact with the ground. For example, in cases where the sensor $84_x$ is a temperature sensor, the monitoring system 82 may determine that the track 22 is in driving contact with the ground when the temperature recorded by the temperature sensor $84_x$ is greater than a certain value. By calculating the amount of time that the temperature sensed by the temperature sensor $84_x$ is greater than the certain value, the monitoring system 82 may thus calculate the amount of time that the track 22 or track system $16_i$ has been in use.

Additionally or alternatively, the monitoring system 82 may assess a usage condition associated with the track system $16_i$. For instance, this may include the temperatures at which the track 22 has operated over a period of time. For example, the monitoring system 82 may be configured to assess a temperature trend over time during use of the track system $16_i$. This may allow the user or any other person to assess, for example, whether the track system $16_i$ or track 22 has been operated at an elevated temperature for extended amounts of time or whether the track system $16_i$ or track 22 has been operated at an adequate temperature most of the time during its use.

Additionally or alternatively, the monitoring system 82 system may assess a geographical location at which the track system $16_i$ has been used. This may be a general geographical location (e.g., a city, a province/state, a country, etc.) and/or a more precise geographical location (e.g., an agricultural field, a road, etc.). The assessment of the geographical location may be useful in various ways. For example, it may be useful for warranty considerations, such as in cases where a warranty covers use of the track system $16_i$ in certain territories (e.g., a province/state), or in certain terrains (e.g., agricultural fields) but only a limited amount of use on other terrains (e.g., paved roads). The assessment of the geographical location by the monitoring system 82 may thus allow to gauge whether the track system $16_i$ meets certain conditions of the warranty, such as, for example, limited travel over paved roads. As another example, this may be useful to keep a travel log of the vehicle 10 to which the track system $16_i$ is mounted and enable the user to gauge the efficiency of the vehicle's displacements and adjust its travelling patterns accordingly.

Additionally or alternatively, the monitoring system 82 system may be configured to predict an end-of-life of the track 22. For instance, in some embodiments, the sensors $84_1$-$84_S$ of the monitoring system 82 may include at least one accelerometer and at least one tread wear sensor which provides the processing entity 88 with an amount of cycles (e.g., rotations) of the track 22 (provided by the accelerometer) and the height H of the traction lug $58_i$ to which the tread wear sensor is installed (provided by the tread wear sensor). Thus, the processing entity 88 may derive, based on data collected by the accelerometer and the tread wear sensor, an estimated an amount of time in which the track 22 may need to be replaced and/or repaired. For example, the processing entity 88 may establish a pattern of use of the track 22 during certain time periods (e.g., during a week, during a month, during a season) based on a previous year's use of the track 22. Based on the pattern of use of the track 22, the processing entity 88 may thus derive the estimated amount of in which the track 22 may need to be replaced and/or repaired.

Each track system $16_i$ of the agricultural vehicle 10, including its track 22, may be configured in various other ways in other embodiments.

For example, each track system $16_i$ may comprise different and/or additional components in other embodiments. For example, in some embodiments, the track system $16_i$ may comprise a front drive wheel (e.g., the idler wheel 26 may be replaced by a drive wheel) instead of or in addition to the drive wheel 24. As another example, in some embodiments, the track system $16_i$ may comprise more or less roller wheels such as the roller wheels $28_1$-$28_6$. As yet another example, rather than have a generally linear configuration as in this embodiment, in other embodiments, the track system $16_i$ may have various other configurations (e.g., a generally triangular configuration with the axis of rotation of the drive wheel 24 located between the axes of rotations of leading and trailing idler wheels).

Figure 40:
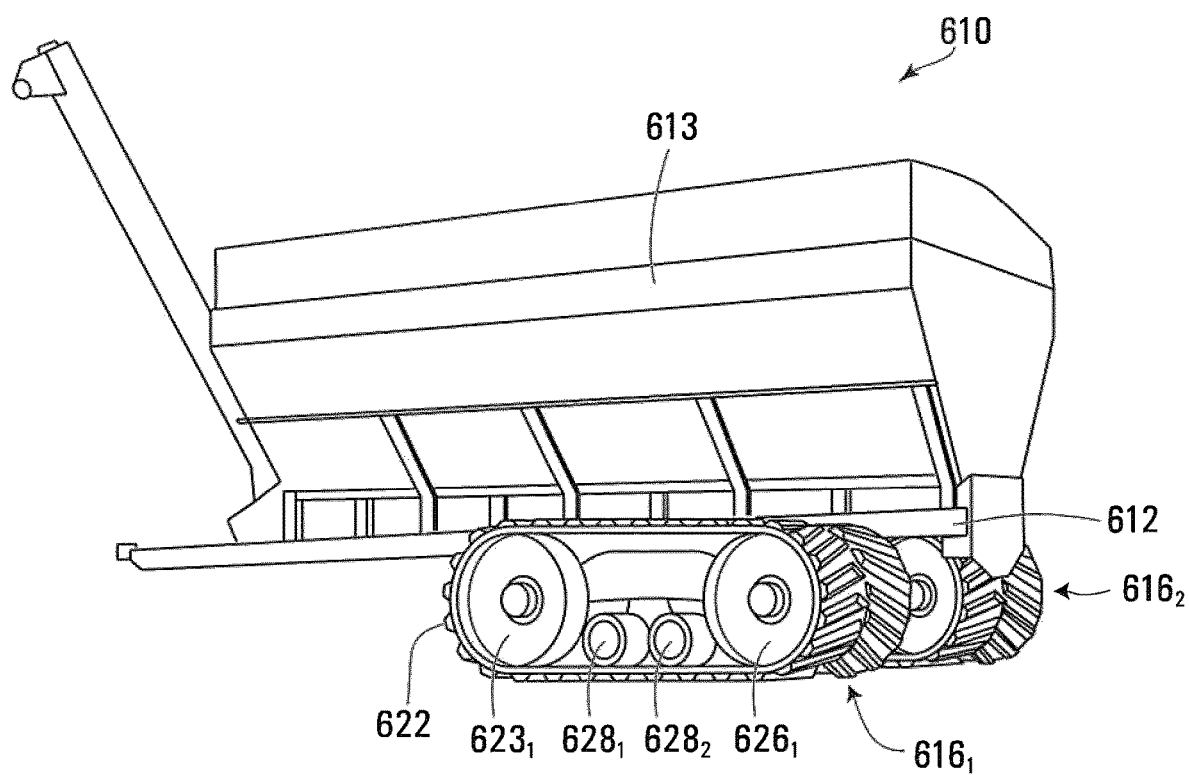
FIG. 40 shows an example of an embodiment in which a work implement of the tracked vehicle implements the monitoring system.

In some embodiments, the work implement 18 that is drawn by the agricultural vehicle 10 may implement the improvements disclosed herein. For instance, with additional reference to FIG. 40, the work implement 18 may comprise a trailed vehicle 610 comprising a frame 612, a body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system $616_1$ of the trailed vehicle 610 comprises front (i.e., leading) idler wheels $623_1$, $623_2$ at a first longitudinal end portion of the track system $616_1$, rear (i.e., trailing) idler wheels $626_1$, $626_2$ at a second longitudinal end portion of the track system $616_1$ opposite the first longitudinal end portion, and a plurality of roller wheels $628_1$-$628_4$ intermediate the front idler wheels $623_1$, $623_2$ and the rear idler wheels $626_1$, $626_2$. The track system $616_1$ further comprises a track 622 disposed around the wheels $626_1$, $626_2$, $626_1$, $626_2$, $628_1$-$628_4$. The track system $616_1$ may implement the monitoring system 82 as described above. Additionally or alternatively, the track 622 may be configured in a manner similar to the track 22 as described above.

In this example, the trailed vehicle 610 is not motorized in that it does not comprise a prime mover for driving the track systems $616_1$, $616_2$. Rather, the trailed vehicle 610 is displaced by the agricultural vehicle 10 to which the trailed vehicle 610 is attached. However, in some examples, the trailed vehicle 610 may be motorized. That is, the trailed vehicle 610 may comprise a prime mover for driving a drive wheel of each track system $616_1$. For example, instead of comprising rear idler wheels $626_1$, $626_2$, the track system $616_1$ may comprise a drive wheel for driving the track 622.

While in embodiments considered above the off-road vehicle 10 is an agricultural vehicle, in other embodiments, the vehicle 10 may be an industrial vehicle such as a construction vehicle (e.g., a loader, a bulldozer, an excavator, etc.) for performing construction work or a forestry vehicle (e.g., a feller-buncher, a tree chipper, a knuckleboom loader, etc.) for performing forestry work, a military vehicle (e.g., a combat engineering vehicle (CEV), etc.) for performing military work, an all-terrain vehicle (ATV), a snowmobile, or any other vehicle operable off paved roads. Although operable off paved roads, the vehicle 10 may also be operable on paved roads in some cases. Also, while in the embodiment considered above the vehicle 10 is driven by a human operator in the vehicle 10, in other embodiments, the vehicle 10 may be an unmanned ground vehicle (e.g., a teleoperated or autonomous unmanned ground vehicle).

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

In case of any discrepancy, inconsistency, or other difference between terms used herein and terms used in any document referenced or incorporated by reference herein, meanings of the terms used herein are to prevail and be used.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track for a vehicle, the track being mountable around a track-engaging assembly configured to move the track around the track-engaging assembly, the track-engaging assembly comprising a plurality of wheels for engaging the track, the track being elastomeric to flex around the track-engaging assembly, the track comprising:
    a ground-engaging outer surface;
    an inner surface opposite to the ground-engaging outer surface; and
    a sensor configured to sense a temperature of the track during use of the track and integrated in the track during molding of the track such that an elastomeric portion of the track is disposed over the sensor.

2. The track of claim 1, wherein the sensor is configured to cause a processing apparatus to perform an operation relating to the vehicle based on the temperature of the track.

3. The track of claim 1, wherein: the track comprises a plurality of projections projecting from a given one of the ground-engaging outer surface and the inner surface; and at least part of the sensor is located in a given one of the projections.

4. The track of claim 3, wherein: the projections include traction projections projecting from the ground-engaging outer surface and wheel-contacting projections projecting from the inner surface; and the given one of the projections is a given one of the traction projections.

5. The track of claim 1, wherein the sensor comprises a wireless transmitter configured to wirelessly communicate with a processing apparatus external to the track.

6. The track of claim 1, wherein the sensor is a first sensor and the track comprises a second sensor configured to sense the temperature of the track.

7. The track of claim 1, wherein the sensor is a first sensor, the temperature of the track is a first characteristic of the track, and the track comprises a second sensor configured to sense a second characteristic of the track different from the first characteristic of the track.

8. The track of claim 6, wherein: the track comprises a plurality of projections projecting from a given one of the ground-engaging outer surface and the inner surface; at least part of the first sensor is located in a first one of the projections; and at least part of the second sensor is located in a second one of the projections.

9. The track of claim 8, wherein: the projections include traction projections projecting from the ground-engaging outer surface; the first one of the projections is a first one of the traction projections; and the second one of the projections is a second one of the traction projections.

10. The track of claim 1, wherein the sensor is configured to interact with a processing apparatus configured to issue a signal relating to the vehicle based on the temperature of the track.

11. The track of claim 10, wherein the signal relating to the vehicle is directed to a powertrain of the vehicle to control the powertrain of the vehicle.

12. The track of claim 11, wherein the signal relating to the vehicle is directed to the powertrain of the vehicle to control a speed of the vehicle.

13. The track of claim 12, wherein the signal relating to the vehicle is directed to the powertrain of the vehicle to limit the speed of the vehicle.

14. The track of claim 13, wherein the signal relating to the vehicle is directed to the powertrain of the vehicle to reduce the speed of the vehicle.

15. The track of claim 10, wherein the signal relating to the vehicle is directed to a prime mover of the powertrain of the vehicle to control the prime mover.

16. The track of claim 10, wherein the signal relating to the vehicle is directed to a communication device for communicating information related to the temperature of the track to a user of the communication device.

17. The track of claim 16, wherein the communication device comprises a display for displaying the information related to the temperature of the track.

18. The track of claim 16, wherein the information related to the temperature of the track includes an indication of the temperature of the track.

19. The track of claim 16, wherein the information related to the temperature of the track comprises a notification based on the temperature of the track.

20. The track of claim 19, wherein the notification notifies of potential damage to the track.

21. The track of claim 20, wherein the potential damage to the track is potential blowout of the track.

22. The track of claim 16, wherein the communication device is part of a user interface of an operator cabin of the vehicle.

23. The track of claim 1, wherein the signal relating to the vehicle relates to a speed of the vehicle.

24. The track of claim 23, wherein the signal relating to the vehicle relates to a reduction of the speed of the vehicle.

25. The track of claim 23, wherein the signal relating to the vehicle relates to a limit on the speed of the vehicle.

26. The track of claim 23, wherein the signal relating to the vehicle is directed to a powertrain of the vehicle to control the speed of the vehicle.

27. The track of claim 26, wherein the signal relating to the vehicle is directed to a prime mover of the powertrain of the vehicle to control the prime mover.

28. The track of claim 23, wherein the processing apparatus is configured to issue the signal relating to the vehicle based on comparison of the temperature of the track to reference data.

29. The track of claim 28, wherein the processing apparatus is configured to issue the signal relating to the vehicle when the temperature of the track at least reaches a reference value.

30. The track of claim 10, wherein the sensor is configured to interact with the processing apparatus via a wireless link.

31. The track of claim 1, wherein the sensor is located to sense the temperature of the track at an expected hottest point of the track.

32. The track of claim 1, wherein the sensor comprises a sensing device and a transmitter that is spaced from the sensing device and located beneath less elastomeric material of the track than the sensing device.

33. The track of claim 32, wherein: the track comprises a plurality of projections projecting from a given one of the ground-engaging outer surface and the inner surface; at least part of the sensing device and the transmitter is located in a given one of the projections; and a thickness of elastomeric material of the track between the transmitter and a periphery of the projection is less than a thickness of elastomeric material of the track between the sensing device and the periphery of the projection.

34. The track of claim 33, wherein a ratio of the thickness of elastomeric material of the track between the transmitter and the periphery of the projection over the thickness of elastomeric material of the track between the sensing device and the periphery of the projection is no more than 0.5.

35. The track of claim 1, wherein the sensor is responsive to an interrogation signal.

36. The track of claim 35, wherein the sensor comprises radio-frequency identification (RFID) technology.

37. A vehicle comprising the track of claim 1.

38. A track system for a vehicle, the track system comprising:
 a track comprising a ground-engaging outer surface and an inner surface opposite to the ground-engaging outer surface; and
 a track-engaging assembly to move the track around the track-engaging assembly, the track-engaging assembly comprising a plurality of wheels for engaging the track;
wherein: the track is elastomeric to flex around the track-engaging assembly; and the track comprises a sensor configured to sense a temperature of the track during use of the track and integrated in the track during molding of the track such that an elastomeric portion of the track is disposed over the sensor.

39. A system for use in respect of a vehicle comprising a track, the track comprising a ground-engaging outer surface and an inner surface opposite to the ground-engaging outer surface and being mounted around a track-engaging assembly configured to move the track around the track-engaging assembly, the track-engaging assembly comprising a plurality of wheels for engaging the track, the track being elastomeric to flex around the track-engaging assembly, the system comprising:
 a sensor configured to sense a temperature of the track during use of the track and integrated in the track during molding of the track such that an elastomeric portion of the track is disposed over the sensor; and
 a processing apparatus configured to issue a signal relating to the vehicle based on the temperature of the track.

40. A computer-readable storage medium storing a program executable by a processing apparatus for use in respect of a vehicle comprising a track, the track comprising a ground-engaging outer surface and an inner surface opposite to the ground-engaging outer surface and being mounted around a track-engaging assembly configured to move the track around the track-engaging assembly, the track-engaging assembly comprising a plurality of wheels for engaging the track, the track being elastomeric to flex around the track-engaging assembly, the track comprising a sensor configured to sense a temperature of the track during use of the track and integrated in the track during molding of the track such that an elastomeric portion of the track is disposed over the sensor, the program comprising instructions executable by the processing apparatus to cause the processing apparatus to:
 receive data derived from the sensor; and
 issue a signal relating to the vehicle based on the temperature of the track.

\* \* \* \* \*